(12) United States Patent
Saunders et al.

(10) Patent No.: US 7,266,501 B2
(45) Date of Patent: Sep. 4, 2007

(54) METHOD AND APPARATUS FOR ACCOMMODATING PRIMARY CONTENT AUDIO AND SECONDARY CONTENT REMAINING AUDIO CAPABILITY IN THE DIGITAL AUDIO PRODUCTION PROCESS

(75) Inventors: William R. Saunders, Blacksburg, VA (US); Michael A. Vaudrey, Blacksburg, VA (US)

(73) Assignee: Akiba Electronics Institute LLC, Wilmington, DE (US)

( * ) Notice: Subject to any disclaimer, the term of this patent is extended or adjusted under 35 U.S.C. 154(b) by 732 days.

(21) Appl. No.: 10/314,998

(22) Filed: Dec. 10, 2002

(65) Prior Publication Data
US 2003/0125933 A1    Jul. 3, 2003

Related U.S. Application Data

(63) Continuation-in-part of application No. 10/006,894, filed on Dec. 10, 2001, now Pat. No. 6,772,127, which is a continuation of application No. 09/580, 205, filed on May 26, 2000, now Pat. No. 6,351,733.

(60) Provisional application No. 60/186,357, filed on Mar. 2, 2000.

(51) Int. Cl.
*G10L 15/00* (2006.01)
*H04R 3/00* (2006.01)

(52) U.S. Cl. ......................... 704/500; 381/10
(58) Field of Classification Search ............... 704/500; 381/10
See application file for complete search history.

(56) References Cited

U.S. PATENT DOCUMENTS 2,783,677 A    3/1957   Becker (Continued)

FOREIGN PATENT DOCUMENTS

JP    5342762    12/1993

(Continued)

OTHER PUBLICATIONS

ATSC Digital Television Standard, ATSC, Sep. 16, 1995, Annex B. Available on-line at www.atsc.org/Standards/A53/.

(Continued)

*Primary Examiner*—Daniel Abebe
(74) *Attorney, Agent, or Firm*—Perkins Coie LLP

(57) ABSTRACT

The invention enables the inclusion of voice and remaining audio information at different parts of the audio production process. In particular, the invention embodies special techniques for VRA-capable digital mastering, accommodation of PCPV/PCA and/or SCRA signals in audio CODECs, VRA-capable encoders and decoders, and VRA in DVD and other digital audio file formats. The invention facilitates an end-listener's voice-to-remaining audio (VRA) adjustment upon the playback of digital audio media formats by focusing on new configurations of multiple parts of the entire digital audio system, thereby enabling a new technique intended to benefit audio end-users (end-listeners) who wish to control the ratio of the primary vocal/dialog content of an audio program relative to the remaining portion of the audio content in that program. The invention facilitates storage of VRA audio programs on optical storage media, authoring systems for VRA-capable DVDs, playback hardware integrated into VRA-capable optical disc apparatus, and VRA playback hardware for use with non-VRA capable optical disc playback apparatus.

31 Claims, 20 Drawing Sheets

U.S. PATENT DOCUMENTS

| | | |
|---|---|---|
| 3,046,337 A | 7/1962 | Hornyak |
| 3,110,769 A | 11/1963 | Bertram |
| 4,024,344 A | 5/1977 | Dolby et al. |
| 4,051,331 A | 9/1977 | Strong et al. |
| 4,052,559 A | 10/1977 | Paul et al. |
| 4,074,084 A | 2/1978 | van den Berg |
| 4,150,253 A | 4/1979 | Knoppel |
| 4,405,831 A | 9/1983 | Michelson |
| 4,406,001 A | 9/1983 | Klasco et al. |
| 4,454,609 A | 6/1984 | Kates |
| 4,484,345 A | 11/1984 | Stearns |
| 4,516,257 A | 5/1985 | Torick |
| 4,622,440 A | 11/1986 | Slavin |
| 4,776,016 A | 10/1988 | Hansen |
| 4,809,337 A | 2/1989 | Scholz et al. |
| 4,816,905 A | 3/1989 | Tweedy et al. |
| 4,868,881 A | 9/1989 | Zwicker et al. |
| 4,890,170 A | 12/1989 | Inohana et al. |
| 4,941,179 A | 7/1990 | Bergenstoff et al. |
| 5,003,605 A | 3/1991 | Phillipps et al. |
| 5,033,036 A | 7/1991 | Ohmori et al. |
| 5,131,311 A | 7/1992 | Murakami et al. |
| 5,138,498 A | 8/1992 | Takigami |
| 5,144,454 A | 9/1992 | Cury |
| 5,146,504 A | 9/1992 | Pinckley |
| 5,155,510 A | 10/1992 | Beard |
| 5,155,770 A | 10/1992 | Maejima |
| 5,197,100 A * | 3/1993 | Shiraki ..................... 381/27 |
| 5,210,366 A | 5/1993 | Sykes, Jr. |
| 5,212,764 A | 5/1993 | Ariyoshi |
| 5,216,718 A | 6/1993 | Fukuda |
| 5,228,088 A | 7/1993 | Kane et al. |
| 5,294,746 A | 3/1994 | Tsumura et al. |
| 5,297,209 A | 3/1994 | Kowaki |
| 5,319,713 A | 6/1994 | Waller, Jr. et al. |
| 5,323,467 A | 6/1994 | Hermes |
| 5,341,253 A | 8/1994 | Liao et al. |
| 5,384,599 A | 1/1995 | Casavant et al. |
| 5,395,123 A | 3/1995 | Kondo |
| 5,396,560 A | 3/1995 | Arcos et al. |
| 5,400,409 A | 3/1995 | Linhard |
| 5,408,686 A | 4/1995 | Mankovitz |
| 5,434,922 A | 7/1995 | Miller et al. |
| 5,450,146 A | 9/1995 | Chedeville et al. |
| 5,466,883 A | 11/1995 | Miyashita et al. |
| 5,469,370 A | 11/1995 | Ostrover et al. |
| 5,485,522 A | 1/1996 | Solve et al. |
| 5,530,760 A | 6/1996 | Paisley |
| 5,541,999 A | 7/1996 | Hirai |
| 5,564,001 A | 10/1996 | Lewis |
| 5,569,038 A | 10/1996 | Tubman et al. |
| 5,569,869 A | 10/1996 | Sone |
| 5,572,591 A | 11/1996 | Numazu et al. |
| 5,576,843 A | 11/1996 | Cookson et al. |
| 5,594,800 A * | 1/1997 | Gerzon ..................... 381/20 |
| 5,619,383 A | 4/1997 | Ngai |
| 5,621,182 A | 4/1997 | Matsumoto |
| 5,621,850 A | 4/1997 | Kane et al. |
| 5,631,712 A | 5/1997 | Suh et al. |
| 5,644,677 A | 7/1997 | Park et al. |
| 5,666,350 A | 9/1997 | Huang et al. |
| 5,668,339 A * | 9/1997 | Shin ........................ 84/634 |
| 5,671,320 A | 9/1997 | Cookson et al. |
| 5,684,714 A | 11/1997 | Yogeshwar et al. |
| 5,698,804 A | 12/1997 | Mizuno |
| 5,703,308 A | 12/1997 | Tashiro et al. |
| 5,706,145 A | 1/1998 | Hindman et al. |
| 5,712,950 A | 1/1998 | Cookson et al. |
| 5,717,763 A | 2/1998 | Choi et al. |
| 5,732,390 A | 3/1998 | Katayanagi et al. |
| 5,751,903 A | 5/1998 | Swaminathan et al. |
| 5,808,569 A | 9/1998 | Wuppermann et al. |
| 5,809,472 A * | 9/1998 | Morrison ................... 704/500 |
| 5,812,688 A | 9/1998 | Gibson |
| 5,820,384 A | 10/1998 | Tubman et al. |
| 5,822,370 A | 10/1998 | Graupe |
| 5,852,800 A | 12/1998 | Modeste et al. |
| 5,872,851 A | 2/1999 | Petroff |
| 5,902,115 A * | 5/1999 | Katayama ............... 434/307 A |
| 5,991,313 A | 11/1999 | Tanaka et al. |
| 6,311,155 B1 | 10/2001 | Vaudrey et al. ............. 704/225 |
| 6,351,733 B1 | 2/2002 | Saunders et al. ........... 704/500 |
| 6,356,312 B1 | 3/2002 | Lyu .......................... 348/512 |

FOREIGN PATENT DOCUMENTS

| | | |
|---|---|---|
| JP | 10276163 | 10/1998 |
| WO | WO97/37449 | 10/1997 |

OTHER PUBLICATIONS

Guide to the Use of ATSC Digital Television Standard, ATSC, Oct. 4, 1995, pp. 54-59. Available on-line at www.atsc.org/Standards/A54/.

Digital Audio Compression Standard (AC-3), ATSC, Annex C "AC-3 Karaoke Mode", pp. 127-133. Available on-line at www.atsc.org/Standards/A52/.

Shure Incorporated homepage, available on-line at www.shure.com. The Examiner is encouraged to review the entire website for any relevant subject matter.

Digidesign's web page listing of their Aphex Aural Exciter. Available on-line at www.digidesign.com/products/all_prods.php3?location=main&product_id=8. The Examiner is encouraged to review the entire website for any relevant subject matter.

* cited by examiner

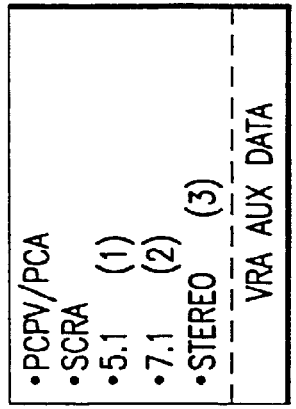
FIG. 4D
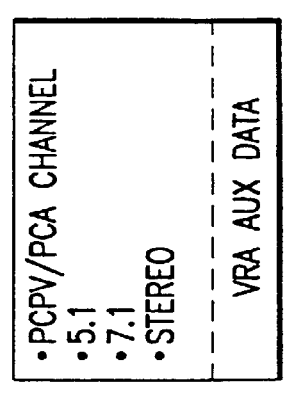
FIG. 4E
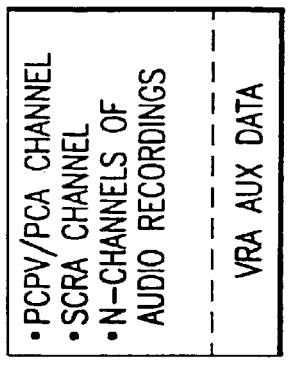
FIG. 4B
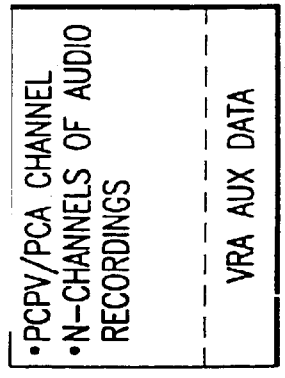
FIG. 4C
FIG. 4A

METHOD AND APPARATUS FOR ACCOMMODATING PRIMARY CONTENT AUDIO AND SECONDARY CONTENT REMAINING AUDIO CAPABILITY IN THE DIGITAL AUDIO PRODUCTION PROCESS

This application is a continuation-in-part of application Ser. No. 10/006,894, filed Dec. 10, 2001 now U.S. Pat. No. 6,772,127, which is a continuation of application Ser. No. 09/580,205, filed May 26, 2000 now U.S. Pat. No. 6,351,733, both of which are entitled "Method and Apparatus for Accommodating Primary Content Audio and Secondary Content Remaining Audio Capability in the Digital Audio Production Process" and claims benefit to Provisional Application Ser. No. 60/186,357, filed Mar. 2, 2000 and entitled "Techniques for Accommodating Primary Content (Pure Voice) Audio and Secondary Content Remaining Audio Capability in the Digital Audio Production Process," each of the above-referenced applications being incorporated herein by reference in their entireties.

FIELD OF THE INVENTION

The invention relates to the audio signal processing, and more particularly, to the enhancement of a desired portion of the audio signal for individual listeners. The invention further relates to post-production authoring of movie titles with Voice-to-Remaining (VRA) soundtracks and hardware for playback of VRA soundtracks.

BACKGROUND OF THE INVENTION

Recent widespread incorporation of digital audio file archiving, compression, encoding, transmission, decoding, and playback has led to the possibility of new opportunities at virtually every stage of the digital audio process. It was recently shown that the preferred ratio of voice-to-remaining audio (VRA) differs significantly for different people and differs for different types of media programs (sports programs versus music, etc.). See, "A Study of Listener Preferences Using Pre-Recorded Voice-to-Remaining Audio," Blum et al., HEC Technical Report No. 1, January 2000.

Specifically, VRA refers to the personalized adjustment of an audio program's voice-to-remaining audio ratio by separately adjusting the vocal (speech) volume independently of the separate adjustment of the remaining audio volume. The independently user-adjusted voice audio information is then combined with the independently user-adjusted remaining audio information and sent to a playback device where a further total volume adjustment may be applied. This technique was motivated by the discovery that each individual's hearing capabilities are as distinctly different as their vision capabilities, thereby leading to individual preferences with which they wish (or even need) to hear the vocal versus background content of an audio program. The conclusion is that the need for VRA capability in audio programs is as fundamental as the need for a broad range of prescription lenses in order to provide optimal vision characteristics to each and every person.

SUMMARY OF THE INVENTION

The invention enables the inclusion of voice and remaining audio information at different parts of the audio production process. In particular, the invention embodies special techniques for VRA-capable digital mastering and accommodation of VRA by those classes of audio compression formats that sustain less losses of audio data as compared to any CODECs that sustain comparable net losses equal or greater than the AC3 compression format.

The invention facilitates an end-listener's voice-to-remaining audio (VRA) adjustment upon the playback of digital audio media formats by focusing on new configurations of multiple parts of the entire digital audio system, thereby enabling a new technique intended to benefit audio end-users (end-listeners) who wish to control the ratio of the primary vocal/dialog content of an audio program relative to the remaining portion of the audio content in that program. The problems that motivate the specific invention described herein are twofold. First, it is recognized that there will be differing opinions on the best location in the audio program production path for construction of the two signals that enable VRA adjustments. Second, there are tradeoffs between the optimal audio compression formats, audio file storage requirements, audio broadcast transmission bit rates, audio streaming bit rates, and the perceived listening quality of both vocal and remaining audio content finally delivered to the end-listener. Various solutions to those two problems, for the ultimate purpose of providing VRA to the end-listener, are offered by this invention through new embodiments that may incorporate new or existing digital mastering, audio compression, encoding, file storage, transmission, and decoding techniques.

In addition, the invention may adaptive to the various ways that an audio program may be produced so that the so-called pure voice audio content and the remaining audio content is readily fabricated for storage and/or transmission. In this manner, the recording process is considered to be an integral component of the audio production process. The new audio content may be delivered to the end-listener in a transparent manner, irrespective of specific audio compression algorithms that may be used in the digital storage and/or transmission of the audio signal. This will require the inclusion of the voice and remaining audio information in virtually any CODEC. Therefore, this invention defines a unique digital mastering process and uncompressed storage format that will be compatible with lossless and minimally lossy compression algorithms used in many situations.

The embodiments of the invention may also focus on required features for VRA encoding and VRA decoding. Because of the commonality among audio CODECs, all descriptions provided below can be considered to provide VRA functionality equally well for broadcast media (such as television or webcasting), streaming audio, CD audio, or DVD audio. The invention may also be intended for all forms of audio programs, including films, documentaries, videos, music, and sporting events.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The invention is described below with reference to the following drawings, wherein:

FIGS. 4A–E are diagrams illustrating various embodiments of VRA-capable digital master tapes or files.

DESCRIPTION OF THE PREFERRED EMBODIMENTS

Figure 1:
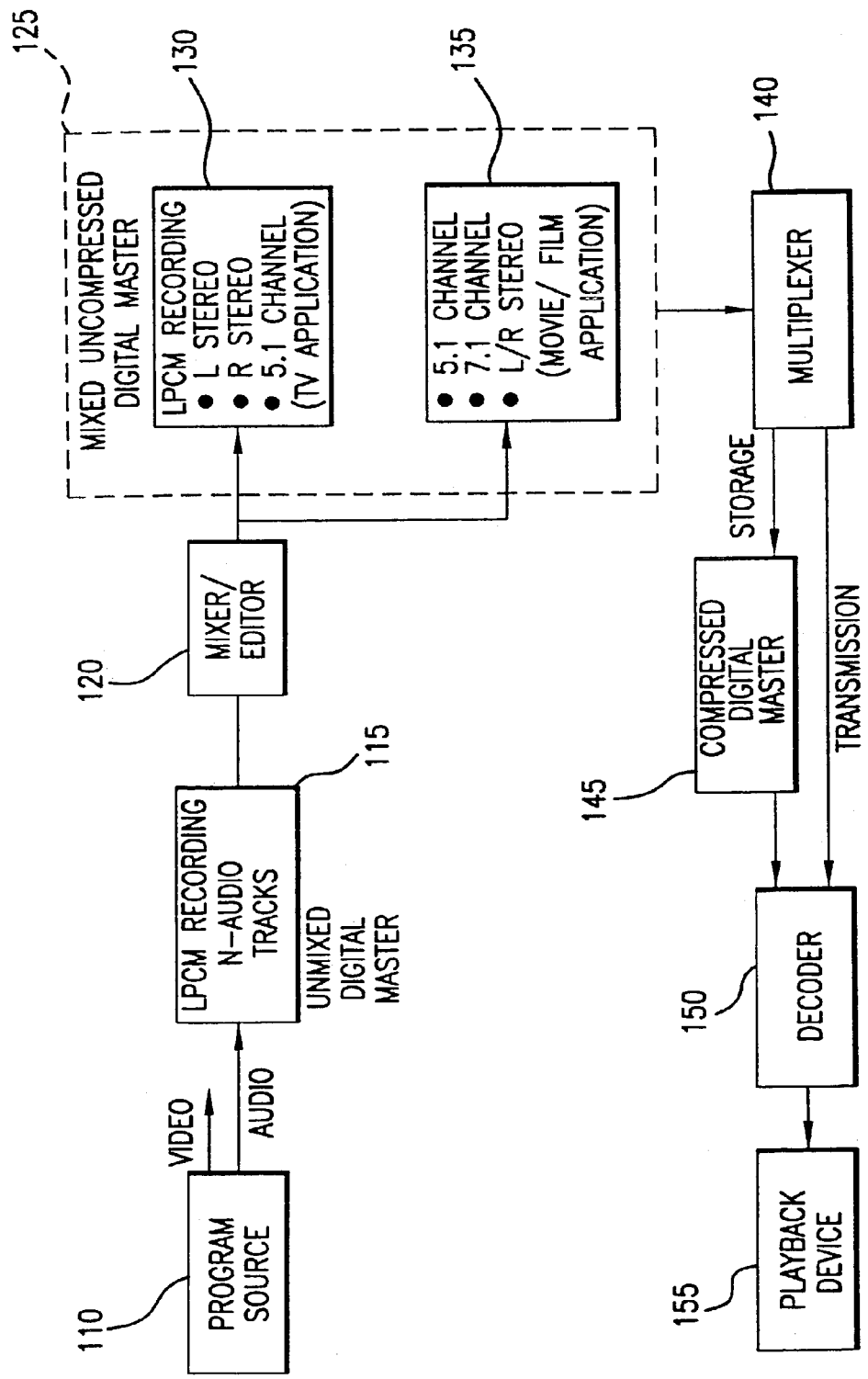
FIG. 1 is a diagram illustrating a conventional digital mastering structure.

A VRA adjustment may be used as a remedy for various forms of hearing impairments. Audiology experts will quickly point out that the optimum solution for nearly all forms of hearing impairments is to allow the hearing impaired listener to receive the aural signal of interest (usually voice) without "contamination" of background sounds. Therefore, the VRA feature can be expected to enhance the lives of hearing impaired individuals. Recent investigations, however, have identified a significant variance in the optimal mix of a preferred signal (a sports announcer's voice, for example) and a remaining audio signal (background noise of the crowd, for example) in virtually all segments of the population. Proof of this need for "diversity in listening" to audio information is consistent with the overall diversity of the millions of human beings over the entire earth.

This discovery comes at a time when the advent of digital audio has made it possible to send large amounts of high quality audio information, as well as audio control information (or metadata), to the listener. Unfortunately, the incorporation of VRA features in digital audio has not been provided in any media form to date. Work in this area has been limited to the mention of a so-called "Hearing Impaired Associated Service" that is configured as an optional part of the ATSC AC3 digital audio standard. See, "A-54: A Guide to the Use of the AC3," ATSC report, 1995, which contains a short paragraph that describes how a hearing impaired user might wish to receive a specially prepared signal of vocal content only, as part of the AC3 bitstream, and to blend that vocal content, with adjusted volume, with the other audio channels (main audio service) normally transmitted as part of the ATSC-specified bitstream. It is well-known that the AC3 audio format mentioned in the A-54 document is based on a Dolby Labs compression algorithm referred to by digital audio experts as a "perceptual coding" compression format. The perceptual coding algorithms are designed to discard some percentage of the original audio signal content in order to reduce the storage size requirements of archived files and to reduce the amount of information that must be transmitted in a real-time broadcast such as HDTV. The discarded audio data is supposed to go unnoticed by the listener because the algorithm attempts to eliminate only those data that the ear could not bear anyway. Unfortunately, perceptual coding algorithms have been subject to long-standing debate about the ultimate listening quality that is retained after certain audio content has been discarded.

One of the fundamental reasons for providing VRA capabilities in any audio program is to enhance the understanding and listening pleasure for end-users who are currently forced to try to understand or enjoy the provided mix-down ratios of voice and remaining audio. When pure voice is offered using very lossy compression algorithms, such as AC3, the voice quality is necessarily reduced. The AC3 perceptual coding algorithm is associated with compression ratios of approximately 12:1, which means that the original audio content has retained only 1 bit for every 12 original bits of information. This means that the primary purpose for inclusion of VRA features is arguably defeated by the extent of perceptible loss in audio quality that is associated with such lossy compression algorithms.

Therefore, there is an overwhelming need for VRA inclusion techniques in all lossless, or relatively lossless, digital audio CODECs so that the end-user can be the one to make the final decision about the voice quality they are willing to accept in the VRA adjustment.

Before a discussion of embodiments that will ensure transparent delivery of VRA capability to the consumer (as end-listener) in any digital audio setting, it will be helpful to discuss the framework whereby the new "pure voice" content can be made accessible by content providers in a standardized manner. A transparent delivery refers to the act of providing end-listeners with VRA capability, regardless of the specific audio format (e.g., MP3, DTS®, Real Audio, etc.) that is used to store/transmit the audio program to the end-listeners' playback devices.

This framework seeks to ensure that the process takes place with minimal loss of artistic merit by all parties who originate the audio program. This may include actors, musicians, sports broadcasters, directors, and producers of the audio content in films, music recordings, sports programs, radio programs, and others. To provide an enabling framework, it will be helpful to introduce new terminology that further clarifies and supports the previously discussed voice-to-remaining audio description.

The new terminology, used in the remainder of this document, is not intended to refute or negate the previous designations of "pure voice" and "remaining audio." Instead, the new designations are being introduced in order to facilitate the framework whereby producers of various audio programs can identify these signals appropriately for encoding, compression, and decoding processes. Additionally, this discussion clarifies several possibilities that producers or secondary content providers may use to fabricate the "pure voice" signals and the "remaining audio signals."

One of the embodiments of the pure voice/remaining audio content is defined to include the "primary-content pure voice audio" and the "secondary content remaining audio" content. The reason for these two labels is related to the intended use of the VRA function for the end-listener, as well as the desire for the originators of the audio program to retain some artistic freedom in creating the two signals that will be mixed by the end-listener upon playback. First, consider the end-listeners' intended uses of the VRA function. They wish to be able to adjust the essential part of the audio program so that they enjoy the program better or understand the program better. In some cases, the adjustment will be obvious. For example, the sports announcer's voice, or the referee's announcements, is very arguably the essential information in a sports program's audio content. The background, or remaining audio, is the crowd noise that is also present in the audio content. Some listeners may wish to adjust the crowd noise to higher levels in order to feel more involved in the game, while others may be annoyed by the crowd noise. Therefore, it seems straightforward to state that the primary-content pure voice audio information is identical to the announcers' or referee's voices and the secondary-content remaining audio signal is the crowd noise.

A distinction between primary-content pure voice and secondary-content remaining audio is not as easy to make for numerous other situations. Taking a film soundtrack as an example, there may be times in the film where there are several people talking at once. Sometimes when this happens, the viewer may be able to move through that scene with complete understanding and appreciation of the plot even if he/she hears only one of the voices. There will likely be other scenes when it is imperative to hear all of the voices at once in order to retain the essence of the film's plot. In the latter case, the blend of all voices would have to be deemed the primary content pure voice content in order for the viewer to appreciate the entire art of the film in that scene. Therefore, there will be a large degree of artistic license retained by those who produce the audio program as they decide what part of the program is to be provided to the listener for the ultimate VRA adjustment.

It is even possible that the primary content pure voice signal may be constructed with non-vocal audio sounds if the producer/artist feels that the non-vocal audio is essential at that point in the program. For example, the sound of an alarm going off may be essential to the viewer understanding why the actor/actress is leaving an area very suddenly. Therefore, the primary content pure voice signal is not to be construed as strictly voice information at all instants in an audio program but it is understood that this signal may also contain brief segments of other sounds.

This motivates a third definition that will be referred to as the "primary content audio (PCA)" information. This is important for purposes of transmission, as well. It is well known by those versed in the art that it is possible to compress speech-only audio content using more efficient compression algorithms than are used for general audio. This is related to the reduced bandwidth of speech-only audio content. Therefore, it will be important to the efficiency and quality of the encoding process that the producers define whether the signal is "primary content pure voice (PCPV/PCA)" or "primary content audio (PCA)." This could even be provided to the encoder as a parameter that changes as the audio program evolves, allowing speech-only encoding when the signal is defined to be PCPV/PCA and switching to a more general encoder algorithm during those instants when the program is flagged as PCA.

Another important feature of the PCPV/PCA/SCRA signal fabrications is the potential need for spatial information in any or all of those signals at various points in the program. There will almost certainly be scenes where it is essential that the listener hear information coming from a surround location, versus the normally centered vocal content in films. If that capability is not provided, the program loses some artistic merit and possibly appreciation of the plot. Inclusion of any essential spatial information can be accommodated by multi-channel playback of the signals. Therefore, this invention also seeks to describe methods that also enable those situations where there is a need for storage, compression, and decoding of multiple channels of primary content pure voice. Thus, PCPV/PCA/SCRA signals provide contextual audio differentiation for the end-user, as compared to merely providing spatial orientation audio differentiation now found in conventional stereo or surround sound formats. Of course, as stated above, the PCPV/PCA/SCRA signals can be fabricated to maintain spatial orientation within the framework of providing contextual audio signal differentiation for the end-user.

The development of digital audio technologies over the past fifteen years has led to numerous methods in the production, encoding, and decoding processes that underlie "digital sound." It is most important to point out that creation, storage, processing, delivery, and playback of multiple channels of digital audio signals has been practiced for many years now. In fact, the recent trend in digital audio is towards ever-increasing numbers of audio channels that can be delivered to a playback device. For example, one of the major new features woven into the most recent MPEG-4 digital audio standard (ISO ###) was the capability to accommodate up to 64 channels of digital audio in the encoding, bitstreaming, and decoding processes.

This push towards higher numbers of digital audio channels are not presupposed by this issue. A very important distinguishing feature of the embodiments is the recognition that a wide variety of listeners will want (non-hearing impaired listeners) or need (hearing impaired listeners) to be provided with the new VRA adjustment. Therefore, this recognition leads to a need for descriptions of how the formats of digital masters be compatible with new encoding techniques that have been programmed to maintain the integrity of the PCPV/PCA and SCRA signals throughout the entire digital audio production process.

Maintaining this integrity is essential to ensure that the listener will ultimately by able to adjust only two signals—the voice and remaining audio—upon playback. This act of constructing the PCPV/PCA/SCRA signals may possibly be viewed as mixing at some level. However, the invention facilitates maintaining a PCPV/PCA signal throughout the production process and thereby gives a listener the ability to understand the dialogue information from that signal alone.

The other equally important observation is that the precise enabling technologies required to get the PCPV/PCA/SCRA signals all the way through the digital audio production process do not presently exist. Therefore, some of the most important embodiments discussed below are associated with the method of maintaining the integrity of those signals. This will be accomplished by the use of special header data and auxiliary data channel(s) that: i) "inform" any encoder that the incoming signal has PCPV/PCA/SCRA information (i.e., is VRA-capable); ii) instruct the encoder how to develop the bitstream such that the PCPV/PCA/SCRA content is delivered from the VRA-capable digital master tape/file to the decoder in a known manner; iii) and provide information to the decoder about how construct, reconstruct, and/or playback the PCPV/PCA/SCRA signals at the playback device.

Prior to describing the embodiments of the invention, it may also be helpful to clarify the original intent of the VRA adjustment using the newly described terminology provided above. Recall that one of the solutions offered by this invention is to create two unique audio signals, referred to as either pure voice and remaining audio or PCPV/PCA/SCRA, and facilitate delivery to an end-listener who may independently adjust the volume of each signal. Therefore, this invention seeks to define new production processes whereby the end-listener ultimately is given access to the volume adjustments of only those two signals.

From the preceding examples, it is clear that there will be times when the PCPV/PCA signals are constructed by mixing together audio content from multiple channels (primarily, if not exclusively, voice content audio) of recorded information. However, it is very important for the reader to appreciate that the end-result is the creation of only two individual signals—the PCPV/PCA signal and the SCRA signal. As the embodiments shown later in this document illustrate, there are various locations in the production path where those two signals may be finally constructed for the end-listener. For example, the producer may wish to combine them during the recording process so that they are on the first mastering tape.

Another method may be to record numerous voice tracks from different singers/actors on the program and then combine them to create a PCPV/PCA signal during a post-recording mixing session. Another possibility might be to create a digital tape with a large number of channels and then send along a data channel that instructs the decoder how to downmix any certain blend of those channels in order to create the single PCPV/PCA or SCRA signals at any instant during playback of the program. But the end-result of all these inventive methods is that the end-listener is given only two signals that enable the VRA adjustment.

So, it is very apparent that there is a need for the PCPV/PCA/SCRA signals to be dealt with in a particular manner by audio program sound engineers. At this time, there are no industry-defined methods built into digital mastering, encoding algorithms, or decoding algorithms, that will specifically enable the transparent delivery of the primary content (pure voice) audio and secondary content remaining audio simultaneously, yet completely separately, to the end-user for VRA adjustment. The following embodiments describe methods that have been developed in order to make sure that the content providers, secondary providers, and end-listeners can take full-advantage of VRA adjustment for a multitude of audio CODECs that are utilized at any stage between recording and speaker playback. Numerous archiving forms that enable the VRA process are also described in detail below.

A description of the exemplary embodiments that enable an ultimate VRA adjustment by the end-listener is given below. In order to better appreciate these embodiments, the first step will be to clarify the existing state of digital audio delivery to illustrate the obvious omission of PCPV/PCA/SCRA signals at the eventual playback device, no matter whether for televisions, VCR players, DVD players, CD players or any other audio playback device. Schematically, this is shown in FIG. 1. The figure depicts the typical audio production process beginning with the program source 110 components that should make up the audio program. The various elements are then recorded, typically on a DAT recorder 115, using a linear, uncompressed audio format. This will be called the uncompressed, unmixed, digital master.

Next, at some time, there is a mixer/editor 120 the performs the mixing and editing process in order to create the audio channels that are to be delivered to the television viewer 130 or the movie viewer 135 or numerous other audio applications. For example, that audio content will consist of left and right stereo channels, or so-called 5.1 channels including L, R, C, LS, and RS, or 7.1 channels which adds two additional surround speakers. Recent standards such as MPEG-4 have provided for the capability of even higher numbers of audio channels but there are no other applications greater than 7.1 in widespread practice at this time. The format of 130 and 135 will be called the mixed, uncompressed digital master 125.

The next step is to play the uncompressed audio into an audio CODEC 150 where the audio will likely go through some amount of compression and then bitstream syntaxing. At this point, it will be possible to construct a compressed, mixed, digital master 145. The production process will most typically make copies of the compressed, mixed, digital master 145 and distribute that version of copies versus the other two master tape versions illustrated in the figure. The playback device 155 then plays back the stereo, 5.1, 7.1 channels, etc. depending on the decoder 150 settings.

For the understanding the embodiments of this invention presented below, it is important to notice that current practice does not provide means for the storage or creation of the PCPV/PCA/SCRA signals using any of the digital mastering tape configurations. Therefore, the following section of embodiments presents various methods to construct digital masters that accommodate production of those signals for ultimate VRA purposes.

VRA-Capable Digital Mastering Embodiments

Figure 2A:
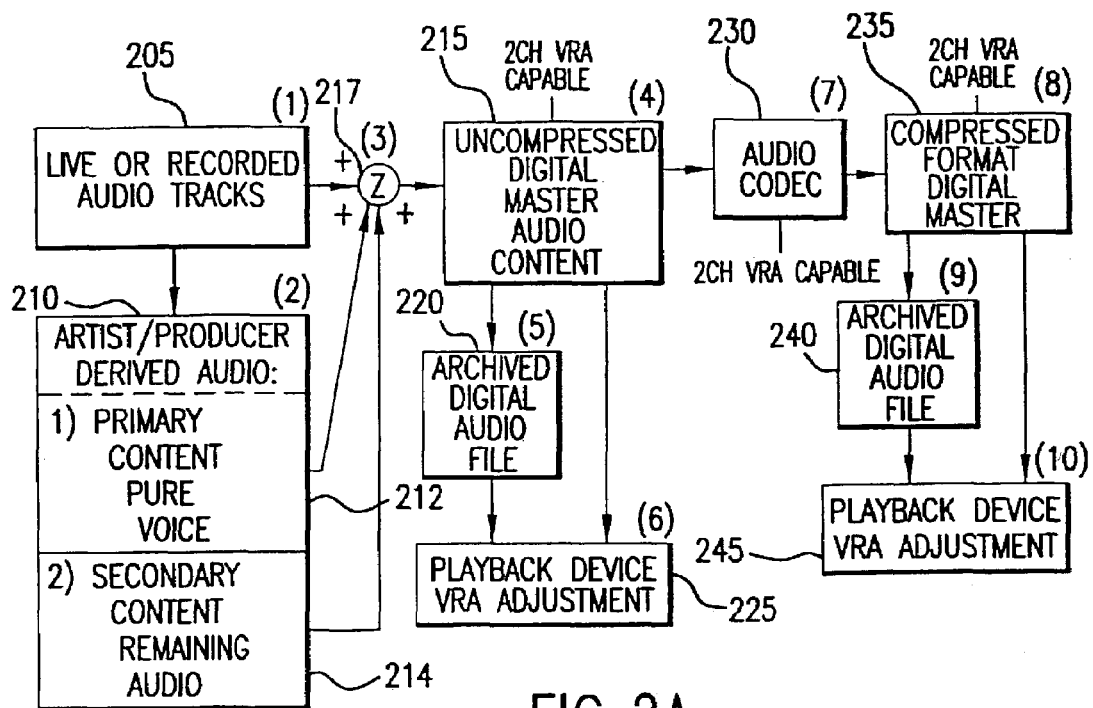
FIG. 2A is a diagram illustrating a pre-mix embodiment for two channel VRA-capable digital master audio tapes.
Figure 2B:
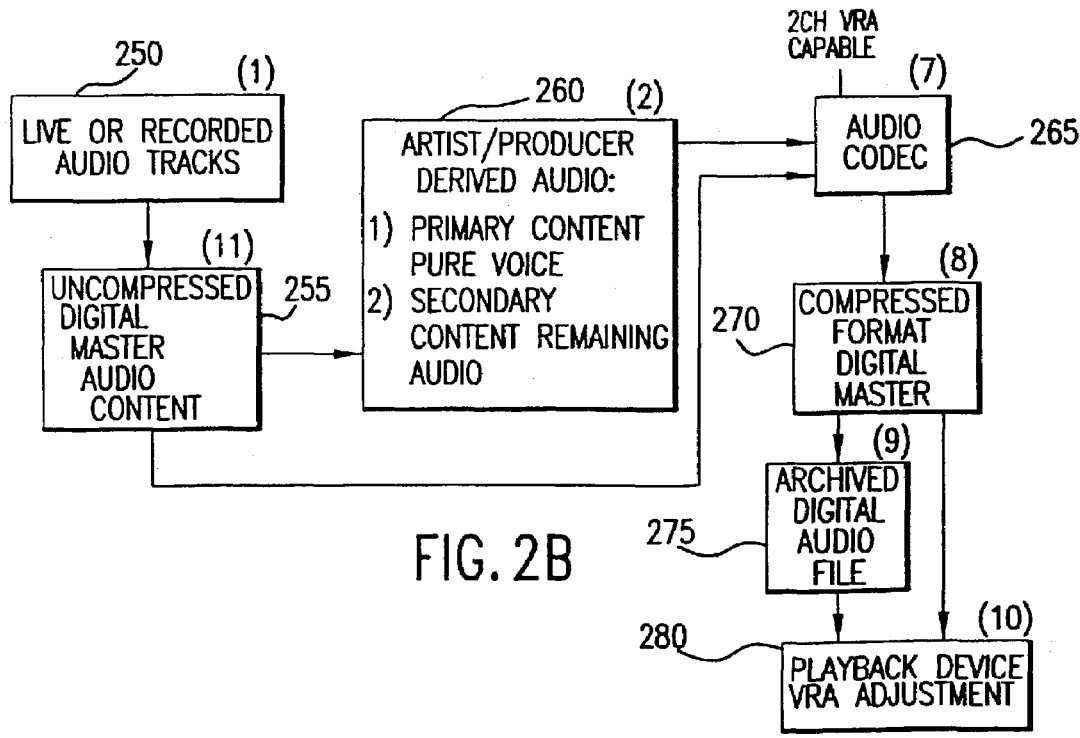
FIG. 2B is a diagram illustrating a post-mix embodiment for two channel VRA-capable digital master audio tapes.

The enabling steps required for creating different versions of VRA-capable digital master tapes or files of an audio program are shown in FIGS. 2A and 2B. "VRA-capable" refers to a digital master tape or file that includes the PCPV/PCA and SCRA signals explicitly or includes sufficient "VRA auxiliary data" such that one or both of those signals may be constructed at the decoder level by using the auxiliary data and other audio data copied from the digital master. Referring to FIG. 2A, note that all audio programs, whether they are musical, film, television programs, movies, or others, utilize microphones to transduce audio information of all types into real-time electrical signals (denoted as "live" in FIG. 2A) that are sent to speakers or stored as tracks of either analog or DAT recorders 205. That audio information can also be used, according to the plans of the artists and/or producers of the program 210, to derive the primary content audio signal (PCPV/PCA) 212 and the secondary content remaining audio signal (SCRA) 214.

The "derived audio" label implies an artistic process, as opposed to a hardware component, and may utilize one, two, or more of the audio tracks 205. In FIG. 2A, these two signals are then recombined with all of the separately available tracks from all audio sources (including those used to derive the PCPV/PCA and SCRA signals) at the input node 217 to a DAT recorder in order to create a two-channel, unmixed, uncompressed, VRA-capable digital master for the audio program 215. Note that input node 217 does not literally sum the signals together but simply combines them on the single digital master tape 215. The digital master 215 is preferably constructed using an uncompressed or relatively lossless compressed digital audio format, such as a linear PCM format or optimal PCM format, but not limited to those particular formats, in order to retain the quality of the original audio signals. (Linear PCM format is a well-known, uncompressed audio format used for digital audio files.)

An integral part of the digital mastering for VRA purposes is the creation of special "header" information that identifies the master tape as VRA-capable and special auxiliary data that defines certain details about the recording process, the types of channels included, labels for each channel, spatial playback instructions for the two signals, and other essential information required by the audio CODEC 230 and/or the decoder in the playback devices 225 and 245. The header information, and the VRA auxiliary data, are contributing features of this embodiment. The phrase "audio CODEC" refers to the encoding process where compression of the digital information occurs, some method of transmission is implied via a bitstreaming process to a decoder (usually MPEG-based ISO standards), and final decoding changes the compressed signal back into analog form for playback to audio speakers. For certain embodiments, it is possible that the VRA-header and auxiliary data information could be provided as a separate bitstream introduced at the compression encoding level, as opposed to creation and storage on the digital master. Embodiments of the auxiliary data, and header information, will be discussed in much greater detail in the following section.

Once the uncompressed version of the VRA-capable digital master in FIG. 2A is complete, the master tape's digital information can be copied for distribution as an uncompressed audio file format 220 before playback on a VRA-capable player 225 that can decode the uncompressed digitally formatted PCPV/PCA/SCRA signals for that audio program. For example, conventional CD audio uses uncompressed, linear PCM data files for playback. This may require that CD players be equipped to recognize whether the audio information is VRA-capable or not and be equipped to accommodate the PCPV/PCA/SCRA signals.

As a second alternative, the digital master file content can be compressed using any number of audio CODECs 230 that are used to minimize throughput rates and storage requirements. It is important to note that the output of the audio CODEC's encoder function might be used in an intermediate step where the compressed version of the audio file 235 is archived 240, as shown in FIG. 2A or reproduced in multiple copies. Again, for clarity, we note that current implementations of such compressed archived files from non-VRA-capable digital masters correspond to well-known media forms such as superCD or DVD audio.

Archived versions of the compressed VRA-capable digital master might also reside on CD media or DVD audio media. However, the inclusion of the PCPV/PCA and/or SCRA channels on archived versions of VRA-capable digital masters necessitates the features described in this invention in order to ensure proper playback of the voice and remaining audio signals. Specifically, the compressed, VRA-capable, archived file 240 can be made accessible to a specific VRA-capable playback device 245 that decodes the PCPV/PCA/SCRA audio signals and facilitates the VRA adjustment.

A second alternative, after compression by the encoding process of the CODEC, is for the information to be transmitted along a variety of broadcast means directly to a playback device configured to decode the VRA-capable digital audio information according to the specific compression algorithm used by the CODEC. For example, the transmission may be an ISDN transmission to a PC modem where the compatible VRA-aware decoder will receive the audio information and facilitate VRA adjustments.

FIG. 2B is a slightly different embodiment of the audio process required for VRA capability. The difference in this configuration is that the digital master 255 does not yet contain the PCPV/PCA or SCRA signals 260. Instead, the digital master 255 can consist of "n" recorded, unaltered audio tracks in the same way that is conventional at this time in the recording industry. The artist-producer derived PCPV/PCA and SCRA signals 260 are then created downstream of the ordinary (i.e., non VRA-capable) digital master 255 through a mixing process defined by the artistic merit and content of the audio program.

Implementation of the mixing for these signals will be implemented using a VRA-capable encoding process discussed in the following section. At that point, the unaltered tracks from the digital master 255 and the PCPV/PCA/SCRA signals 260 are encoded by the VRA-capable audio CODEC 265 and the playback device 280 will have access to these signals in the same way discussed for the FIG. 2A embodiment. For this embodiment, an uncompressed version of the VRA-capable digital master never exists. This approach might be preferred if the producer of the audio program wishes to pass along to a secondary provider the additional task of specifying and mixing the unique PCPV/PCA/SCRA signals.

Figure 3:
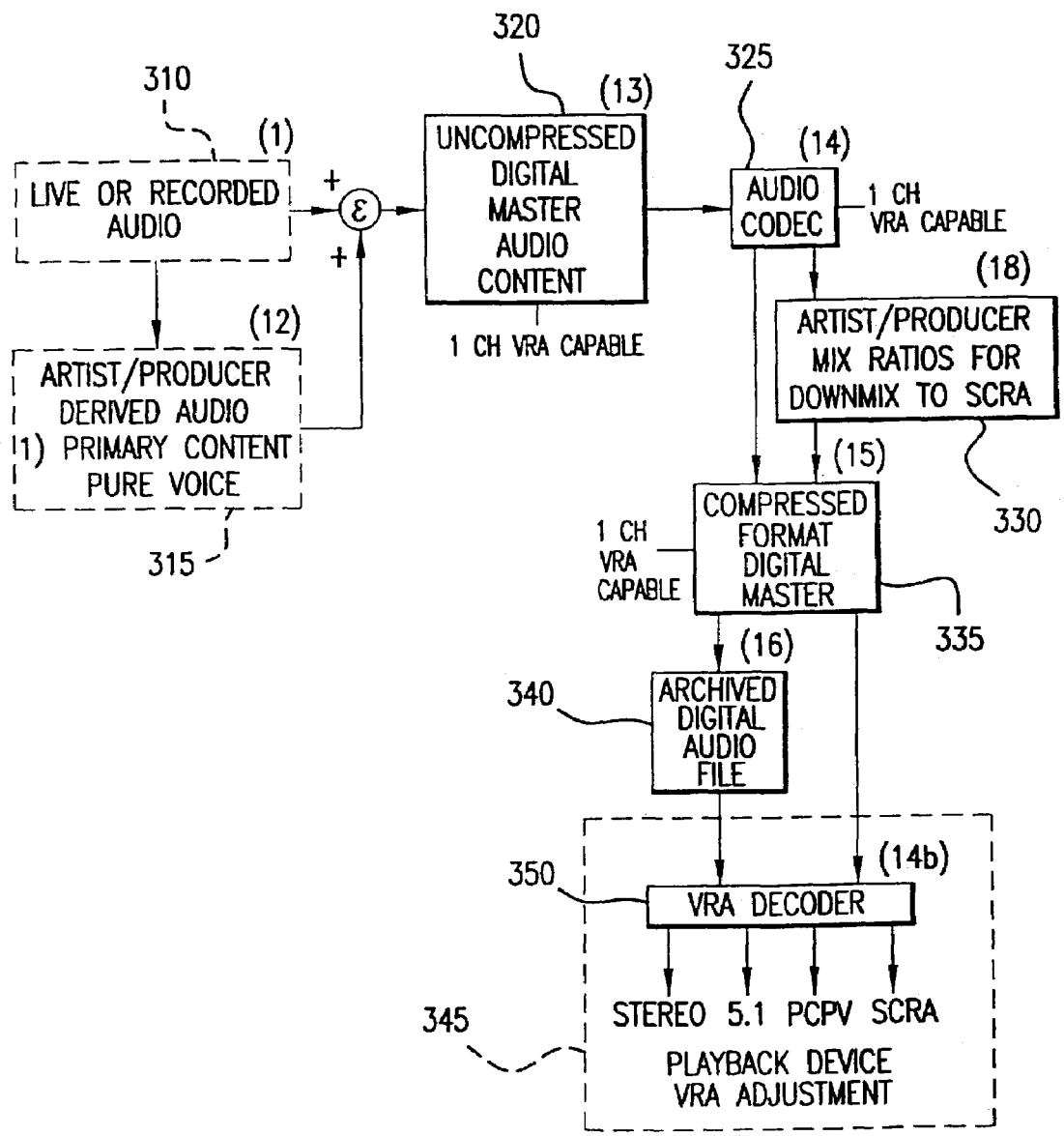
FIG. 3 is a diagram illustrating a pre-mix embodiment for one channel VRA-capable digital master audio tapes with SCRA down-mix parameters.

A third possible embodiment is motivated by the knowledge that it may be preferable to specify the contents of the SCRA signal as some combination of the non-PCPV/PCA channels that will be stored on the digital master. This is illustrated in FIG. 3. For this case, the PCPV/PCA signal only is created prior to creation of the uncompressed digital master and it is stored on the master along with the other audio information. For this embodiment, special VRA-auxiliary information (data) will also be included digitally on the master where that information specifies how to construct the SCRA channel from certain combinations of the non-PCPV/PCA audio channels stored on the digital master. That information will be provided to any downstream encoding process for transmission to a VRA-capable decoder. The VRA-capable decoder will then be responsible for the creation of the SCRA channel in real-time using downmix parameters specified in the auxiliary data. (There are a variety of ways to specify the SCRA channel fabrication and these will be discussed later in the section describing the features of VRA-enabling audio CODECs.) To conclude the discussion of FIG. 3, the uncompressed digital master audio content 320 then creates a "1-channel, VRA-capable" digital master.

For further clarification, it should be noted that the act of downmixing is clearly not new and is used every day in audio engineering. Instead, the innovation described herein is related to the creation and transmission of the VRA-auxiliary data that enables construction of a secondary content remaining audio, to be further combined with the PCPV/PCV signal, for an easy two-signal VRA adjustment.

FIG. 3 shows a different perspective of an embodiment of a VRA-capable digital audio master tape or file. Note that the audio data may be blended with video data on the same tape and therefore, the VRA-capable digital audio master tape should not be necessarily construed as an audio-only tape format. Therefore, the entire digital mastering discussion applies equally well to the digital master for films, pre-recorded television programs, or musical recordings.

The embodiment shown in FIG. 3 will be referred to as a "post-mix" VRA-capable digital master tape 315. As shown in this embodiment, the PCPV/PCA signal is created by blending audio content from any number of audio channels (which are considered as analog signals in the figure), and the SCRA signal is created by blending some other audio content considered to be "remaining audio" before the signals are digitized as separate channels, alongside the audio content that has been created for the left, right, left surround, right surround, center, and low frequency effects channels. The eight tracks of information are stored using an uncompressed audio format (for example, but not limited to linear PCM) on digital tape.

Another embodiment, shown in FIG. 3, is referred to as the "pre-mix" VRA-capable digital master tape 320. In this configuration, the fabrication of the VRA-capable digital master will only require that the PCPV/PCA and the SCRA signals are already mixed before the digital recording is mastered. As shown, there are now "n" channels, where "n" refers to an arbitrarily large number of audio channels that may reside on the digital master. This configuration may be necessary for certain types of digital masters that must be used later in downmixing processes used to create stereo or surround channel sounds for the audio program. The primary content pure voice and remaining audio, however, is mixed in advance and stored that way on the digital master.

It should be clear that there are numerous embodiments of VRA-capable digital master tapes (files) as shown in FIGS. 4A–E. All versions of VRA-capable digital masters will be equipped with a special header file that identifies the master as VRA-capable. The header format is discussed in the next section. A pre-mixed, uncompressed, n-channel VRA-capable digital master is shown in FIG. 4A. For this case, the digital master consists of "n" channels of audio that are recorded during the production. From some combination of those n-channels, it will be possible to specify the construction of a PCPV/PCA signal and a SCRA signal (FIGS. 4B and 4C).

To accomplish this, a VRA-auxiliary data channel can be created and stored on the master that provides those instructions at the decoding end of the production. Therefore, this digital master can be considered to be a "0-channel, uncompressed, pre-mixed, VRA-capable digital master." The term 0-channel refers to the fact that there is no track on the master that explicitly contains the PCPV/PCA or SCRA signals. The essential point here is that the tape has sufficient information to enable the ultimate VRA adjustment by the end-listener who is in control of the playback device, even without those signals explicitly stored.

General schematics of other possible embodiments are also shown in FIGS. 4A–E. The most obvious embodiments are shown in FIGS. 4D and 4E. Those versions of digital masters can be considered to be a "1-channel, post-mixed, uncompressed, VRA-capable digital master" (FIG. 4E) and "2-channel, post-mixed, uncompressed, VRA-capable digital master" (FIG. 4D), respectively. In the post-mixed version, we find the typical stereo signals, the 5.1 mixed channels, or 7.1 mixed channels, or higher numbers of spatial channels, in addition to either the PCPV/PCA signal alone (the 1-channel version) or both of the PCPV/PCA and SCRA signals. In this situation, there may also be a VRA-auxiliary data channel in order to instruct the decoder about special playback features that should be used to provide spatial positioning of either of the two signals as the audio program progresses.

FIGS. 4D and 4E are other embodiments that have only the PCPV/PCA signals stored, along with the VRA-auxiliary data. For this case, the auxiliary data will define how to construct the SCRA signal, playback the PCPV/PCA and the SCRA signals, and other functions described later.

To conclude this digital mastering discussion, it is clear that those skilled in digital audio may identify other embodiments than the ones shown explicitly in FIGS. 2A, 2B, 3, and 4A–E. For example, it is straightforward to consider compressed versions of all of the embodiments described above as directly defined by this invention. The important distinction is that all VRA-capable digital master versions also contain some kind of header that identifies the VRA-capable master contain an auxiliary data signal that defines certain properties, construction techniques, or playback techniques for the PCPV/PCA/SCRA signals. Therefore, the digital master formats shown in the figures are not to be construed as the only possible VRA-capable digital master configurations intended by this invention.

So far, the descriptions above had made it clear that the inclusive VRA-enabling process improves the digital audio processing art according to its wholistic merit, as well as in three distinct areas:

1) The process whereby a primary content pure voice audio signal is constructed in order to provide a signal that enables improved intelligibility and/or pleasure of the audio program's vocal content, with little or no loss in appreciation of the program's plot or lyrical meaning; said process also including construction of a secondary content remaining audio signal that enables improved appreciation for the artistic merit and/or enjoyment of the audio program but does not provide appreciable improvement in intelligibility or appreciation of the program's plot or lyrical meaning.

2) The creation of so-called 0-channel, 1-channel, and 2-channel "VRA-capable" digital mastering tapes, using uncompressed or lossless/relatively lossless compressed audio formatting, said formats applied in order to retain optimal voice quality and optimal remaining audio quality that may be degraded in the event of VRA-capable mastering and/or transmissions based on very compressed audio formats (>8:1) that sacrifice audio quality.

3) The accommodation of primary content pure voice and secondary content remaining audio channels, a VRA-header, and /or VRA-auxiliary data in any number of lossless and relatively lossless audio CODECs that are used to generate digital audio transmissions and/or archival audio file storage.

Now that the digital mastering process is defined, specific embodiments described below will focus on features that enables inclusion of the PCPV/PCA and SCRA signals in certain audio CODEC operations (to include encoding/compression and decoding) that are known to be lossless and relatively lossless compared to the losses that are associated with CODECs in the class of AC3.

Digital Mastering Features for VRA-Capable Audio Programs

The desire to provide VRA adjustment capability to end-listeners should ideally be compatible with the artistic goals for the audio content of the program. Therefore, one feature of this invention seeks to describe a process whereby both goals—providing VRA capability and allowing artists to retain artistic license over the audio program—are compatible. Retention of the artistic merit will almost certainly require some degree of planning for the primary and secondary contents, followed by varied mixing of certain audio signals as the program evolves chronologically. The specific mixing and recording of a customized primary content pure voice channel and secondary content remaining audio channel is unprecedented in audio programming of any type.

Therefore, this digital mastering aspect of the invention is concerned with the situation where there has been inclusion of PCPV/PCA/SCRA signals on a digital master and there needs to be corresponding mastering of special "header file" and/or "auxiliary data" content that describes the essential information (location, sampling rate, format, playback parameters, etc.) about such PCPV/PCA and SCRA channels on the VRA-capable digital master.

To date, the advent of digital audio has mostly been concerned with new directions in spatial positioning of sound that relies on increased numbers of channels. This multi-channel, surround sound use for digital audio has led to the storage and transmission of increased numbers of audio channels compared to the more conventional stereo transmissions of the past years. VRA-capable audio files and transmissions will boost the storage and transmission requirements even higher because of the extra channels required for PCPV/PCA and SCRA information. Innovative VRA-capable audio CODECs will be defined to minimize the extra throughput burden. In addition, the presence of VRA formats on a digital master will need to be "identified" as a VRA-capable audio file by any audio CODEC used to compress/transmit/decode the incoming bitstream delivered from the digitally recorded master. There are two essential reasons that the digital master must be flagged as VRA-capable. First, the PCPV/PCA channel will need to be played back at specific speaker locations, therefore that channel must be time aligned with auxiliary data that describes the exact temporal/spatial playback procedure. Second, it may be required, as shown in FIG. 3, that the SCRA channel be constructed by the decoder. The instructions for creating that signal will also be programmed into the VRA-auxiliary data. We note that there will also be inventive ways to accommodate the VRA-auxiliary data as it enters the decoding process. For example, it may be introduced as embedded information in an n-channel bitstream for VRA-capable audio files or sent as a distinct channel.

Accommodation of PCPV/PCA and/or SCRA Signals in Audio CODECs

The embodiments described below enable a primary content pure voice signal and a secondary content remaining audio signal to reach the end-listener using the audio information defined earlier for the "VRA-capable" digital master tape or file. The digital mastering discussion in the previous section described the storage and digital "tagging" of the PCPV/PCA and SCRA channels in uncompressed or compressed audio format. The uncompressed format and relatively lossless compression (compression ratios <8:1) of the audio stored on the master was necessary in order to maintain the fidelity of the original audio signal, without question, at the mastering end of the audio production process. It is well known that digital audio compression enables more efficient storage and transmission of audio data. The many forms of audio compression techniques offer a range of encoder and decoder complexity, compressed audio quality, and different amounts of data compression. Now, this aspect of the invention is concerned with three parts: encoding methods based on lossless compression and relatively lossless compression algorithms, uses of the auxiliary information supplied by the VRA-auxiliary data and the encoding of the header file (or so-called "digital tagging") that exists on the uncompressed VRA-capable digital master. The ISO MPEG-2 and MPEG-4 standards rely on a relatively lossless compression algorithm (i.e., <8:1), so the MPEG audio formats will be used to illustrate certain features that include a VRA-encoder and a VRA-decoder. It will also be made clear that the embodiments described in this section will be applicable to other audio formats also. It is also noted here that conventional techniques do not teach the use of VRA-encoding or VRA-decoding as defined by the existence and special data handling of the so-called PCPV/PCA, SCRA, and VRA signals described in detail earlier in this document.

The embodiments for compressed VRA-capable digital audio will be described for the general case of lossless compression. The term lossless compression refers to the fact that upon decoding of the received compressed signal, it is possible to recreate, with no data losses whatsoever, the original audio signals that resided on the uncompressed digital audio master. The conventional techniques do not include the existence of audio CODECs that are designed to recognize the presence of either PCPV/PCA or SCRA signals in the incoming PCM data stream nor are there existing audio CODECs that will take advantage of the low-bandwidth of a voice-only signal (i.e., the PCPV/PCA signal).

Therefore, the descriptions provided in the following embodiments offer numerous unique features, including: the use of CODECs with automatic recognition of VRA-capable uncompressed digital audio files; distinct treatment of the PCPV/PCA channel using audio compression algorithms designed specifically for speech signals, time synchronized with the other audio tracks that are compressed using more general audio compression algorithms and re-mixed at the decoder, compression of the VRA-capable digital audio information using lossless compression algorithms, compression of VRA-capable digital audio using lossy compression algorithms that retain more digital data than the AC3 algorithm (specified here to mean compression ratios less than or equal to 8:1), fabrication instructions for the SCRA channel in the event of a 1-channel VRA-capable digital master, playback location specifications used by the VRA-decoder for assignment of the PCPV/PCA and SCRA channel information to specific speakers, methods for any required spatial positioning of the PCPV/PCA signal, and specific features of VRA-capable encoders that will incorporate the PCPV/PCA and SCRA channels in a variety of already existing audio CODECs.

Figure 5:
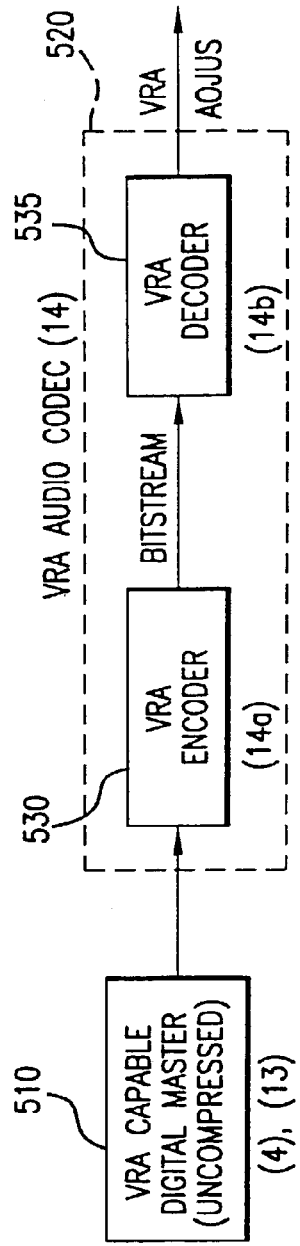
FIG. 5 is an exemplary diagram of a VRA CODEC.

FIG. 5 shows a basic block diagram that illustrates the key concept of this part of the invention based on a general, lossless compression algorithm. (One example of a lossless compression algorithm is the Meridian Lossless Packing (MLP) algorithm.) For this example, an uncompressed VRA-capable digital master 510 is used as input to the VRA audio CODEC 520. The distinction here is that there must be a VRA-capable encoder 530 and VRA-capable decoder 535 used at the encoding and decoding ends of the CODEC 520, respectively. The output of the VRA-capable decoder 535, and hence the output of the audio CODEC, will be the voice and remaining audio signal that can be independently adjusted by the end-listener. Next, the VRA-capable components in the audio CODEC 520 are discussed.

VRA-Capable Encoders

Figure 6:
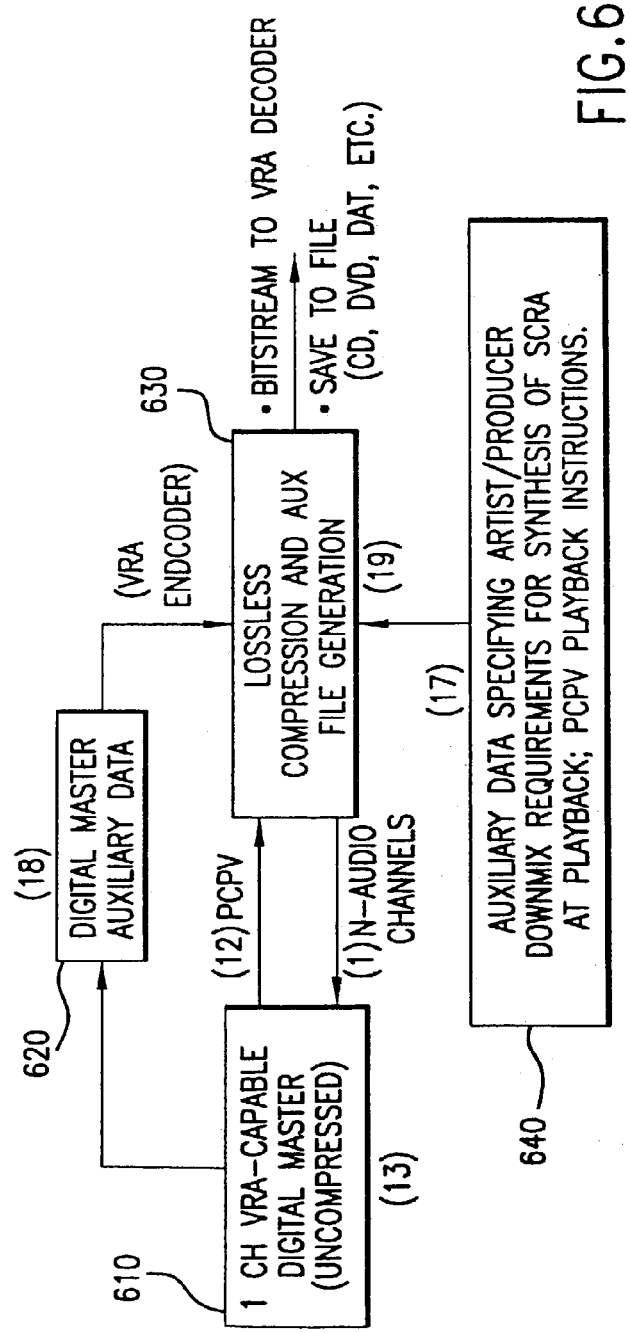
FIG. 6 is an exemplary diagram of a VRA encoder for a 1-channel VRA-capable, uncompressed digital master.

A conceptual embodiment of a VRA-capable encoder is illustrated in FIG. 6. This illustration relies on the previous description of a 1-channel, uncompressed, pre-mixed VRA-capable digital master 610. However, the essence of the description will remain the same no matter what format of VRA-capable digital master is introduced at the input to the audio CODEC. The diagram of FIG. 6 is intended to illustrate that the pre-mixed PCPV/PCA signal is sent into the encoder's lossless compression algorithm 630 alongside the "n-channels" of other audio information. Pre-recorded information residing in the VRA auxiliary data 620 may also be sent into the encoder. A software interface may also be used to create all or additional portions of the VRA-auxiliary data 640 at the mixing/encoding/compression stage in the production process. This feature will allow producers to pass along the VRA authoring task to secondary providers who may subcontract the task.

Figure 7:
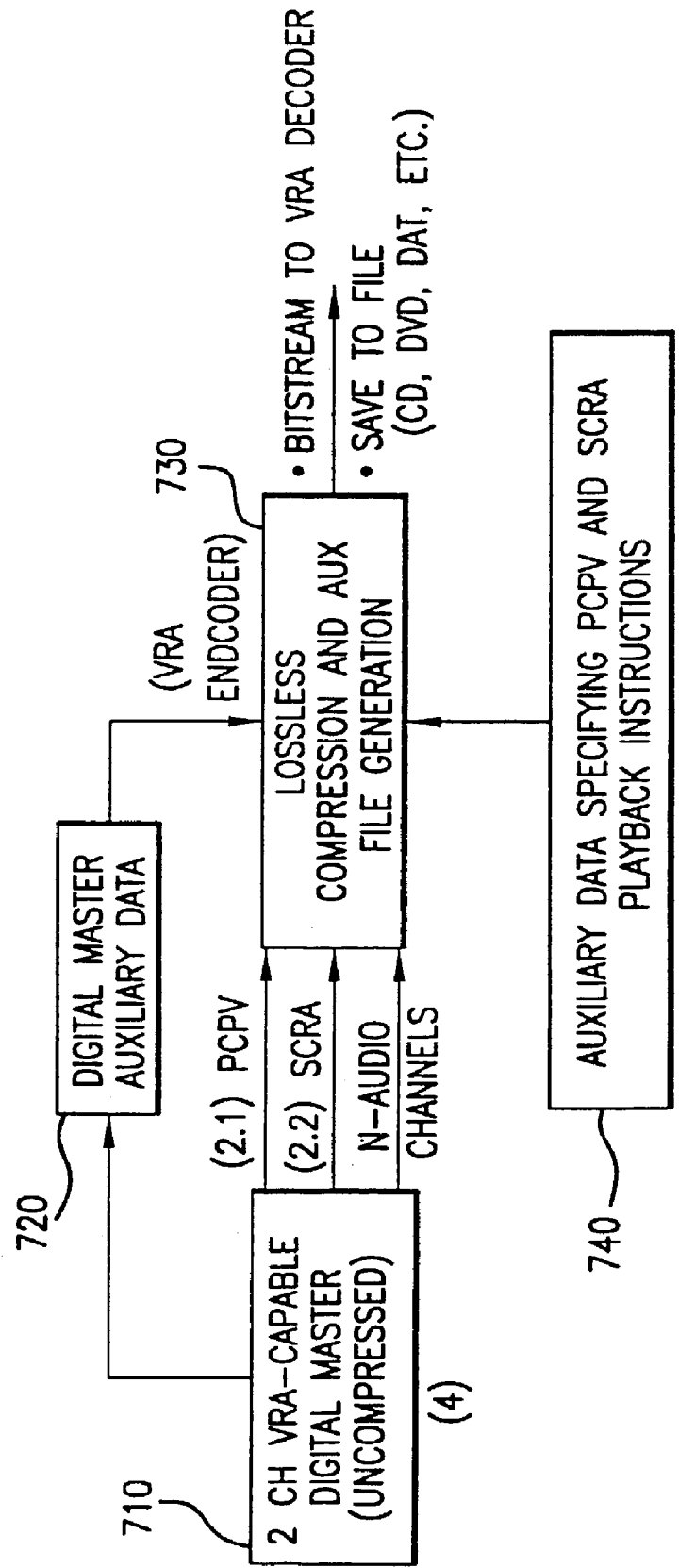
FIG. 7 is an exemplary diagram of a VRA encoder for a 2-channel VRA-capable, uncompressed digital master.

Finally, the compressed, and possibly mixed audio and auxiliary data is stored in the compressed format or transmitted to a decoder as an ISO bitstream created as part of the encoder process. The PCPV/PCA signal and the SCRA signal, should they be premixed at this stage, will be built into the MPEG-based bitstream standard in the manner that is currently practiced by anyone skilled in the art of digital audio. FIG. 7 is a similar illustration as shown in FIG. 6 (the description of the features will not be repeated). The exception is that the digital master is now a 2-channel VRA-capable format. Other than the presence of the SCRA signal at the input to the CODEC, the descriptive features are identical to those discussed for FIG. 6.

FIGS. 8–11 are specific configurations of four different embodiments for VRA-capable encoders that rely on some combination of the following: an algorithm for lossless or relatively lossless compression of general audio signals, a speech-only compression algorithm, accurate processing of the VRA header and auxiliary data information, and the input of some form of VRA-capable digital master. It is emphasized that various combinations of these various features are too numerous to mention here but are all consistent with the intent and overall VRA-capable audio production process outlined in this invention.

Figure 8:
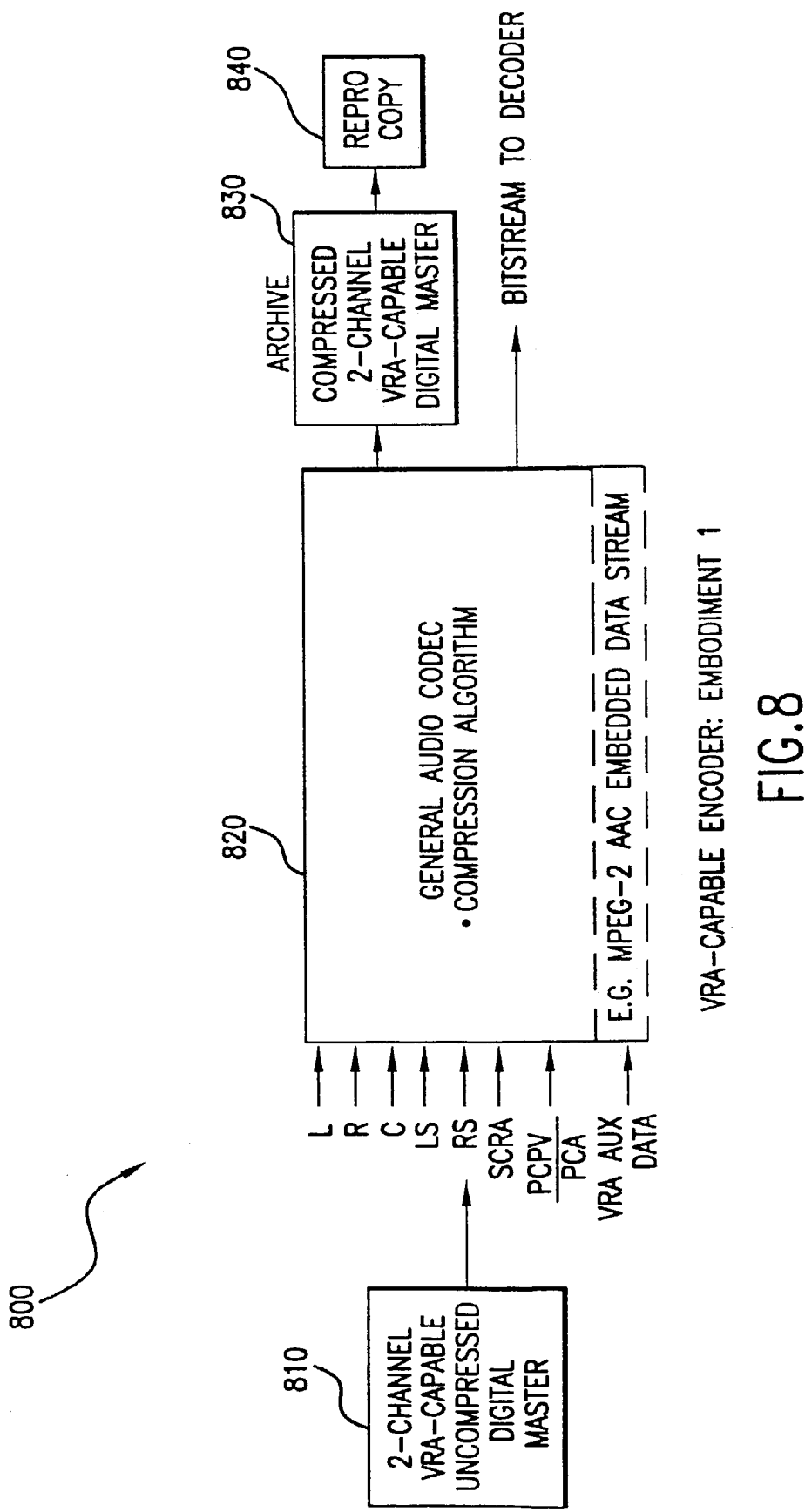
FIG. 8 is an exemplary diagram illustrating another possible embodiment of a VRA-capable encoder.

Referring first to FIG. 8, a 2-channel, post-mixed, uncompressed, VRA-capable digital master 810 is shown as the input to a VRA-capable encoder. The left, right, center, left surround, right surround, SCRA, and PCPV/PCA signals are already mixed for this format of digital master and are then compressed by a "general" audio CODEC's compression algorithm 820. The algorithm 820 may be perceptual-based, or redundancy-based, or any other technique that leads to compression without regard to bandwidth.

The VRA-auxiliary data is also operated on by the compression algorithm, then arranged into the ISO bitstream using standards-based procedures. For example, the MPEG-2 AAC (advanced audio CODEC, ISO/IEC 13818-7) may be used to deliver the VRA-auxiliary data via one of the fifteen embedded data streams that the standard supports. There are other ways to arrange the auxiliary data, and those ways are well-known to those skilled in the art. The output of the CODEC 800 can be used to store a compressed version of the 2-channel master and that master will then be used to create reproductions for distribution. Alternatively, the bitstream can be transmitted directly to a decoder in a playback device, such as a media player in a PC.

Figure 9:
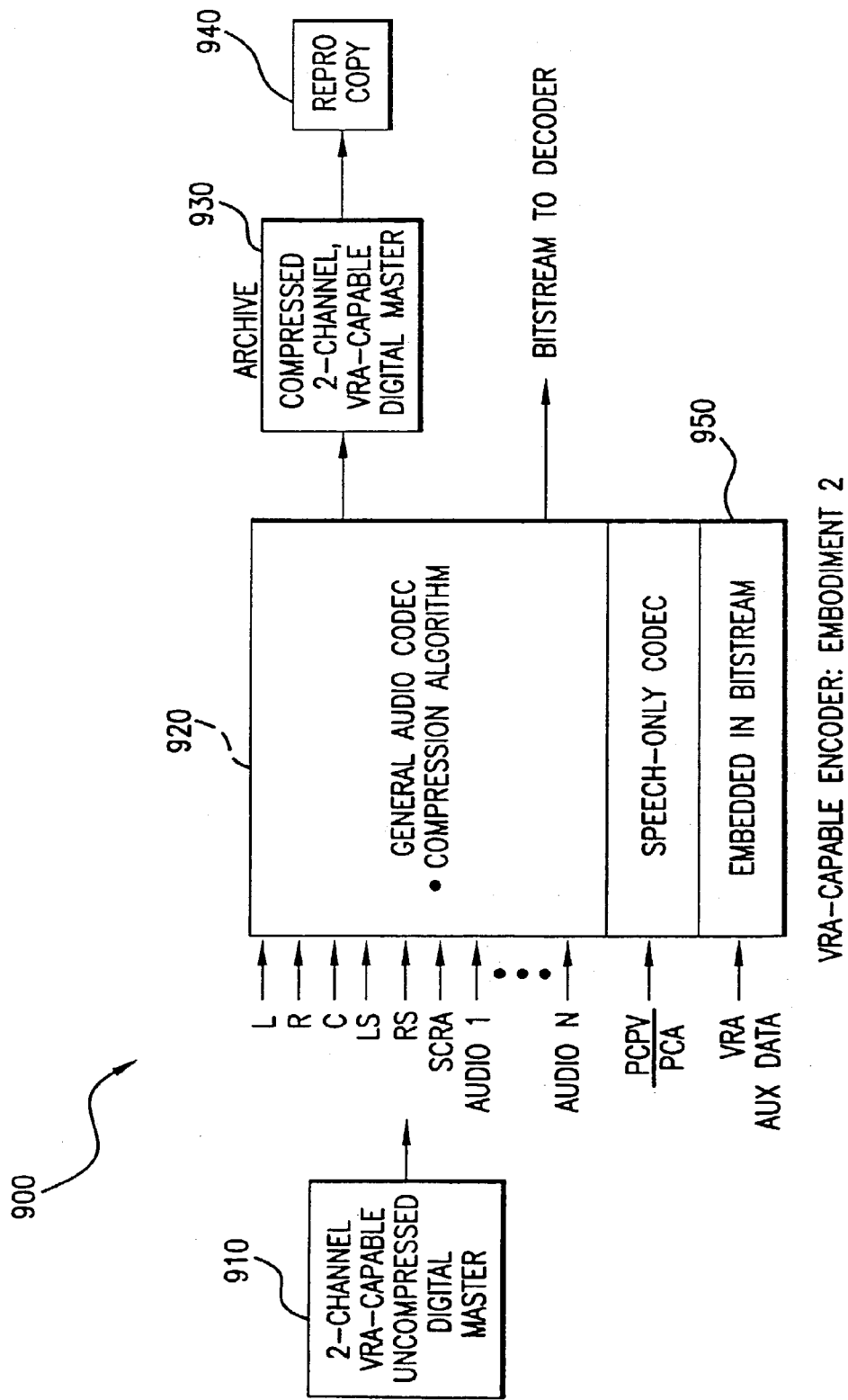
FIG. 9 is an exemplary diagram illustrating another possible embodiment of a VRA-capable encoder.

The process implied by FIG. 9 is similar to the previous one of FIG. 8 except for two distinctions. First, the PCPV/PCA signal is compressed with a speech-only CODEC 920 while the other audio signals are compressed using a general compression algorithm 820. Speech coding can be conducted using any one of several known speech CODECs such as a G.722 CODEC or the Code Excited Linear Predictive (CELP) CODEC. This distinction between compression of the PCPV/PCA signal using a speech-only CODEC 920 and compression of the other audio signals using a general CODEC will help to reduce the required bandwidth for VRA-capable bitstreaming and storage requirements.

It is to be noted that the VRA-capable encoder being disclosed is this manner in which the cumulative information (PCPV/PCA, SCRA, VRA-auxiliary data) is included, thereby making the audio format VRA-capable, as well as the two-tiered compression approach that reduces the bandwidth requirements for VRA-capable audio transmission. The second important distinction of this figure is the presence of the additional "n audio channels." This embodiment accommodates the situation where there may be a need for additional audio channels that will enhance the PCPV/PCA or SCRA signals upon playback. Those additional signals are compressed by the general compression algorithm and any special playback requirements will be defined by the auxiliary data stream.

Figure 10:
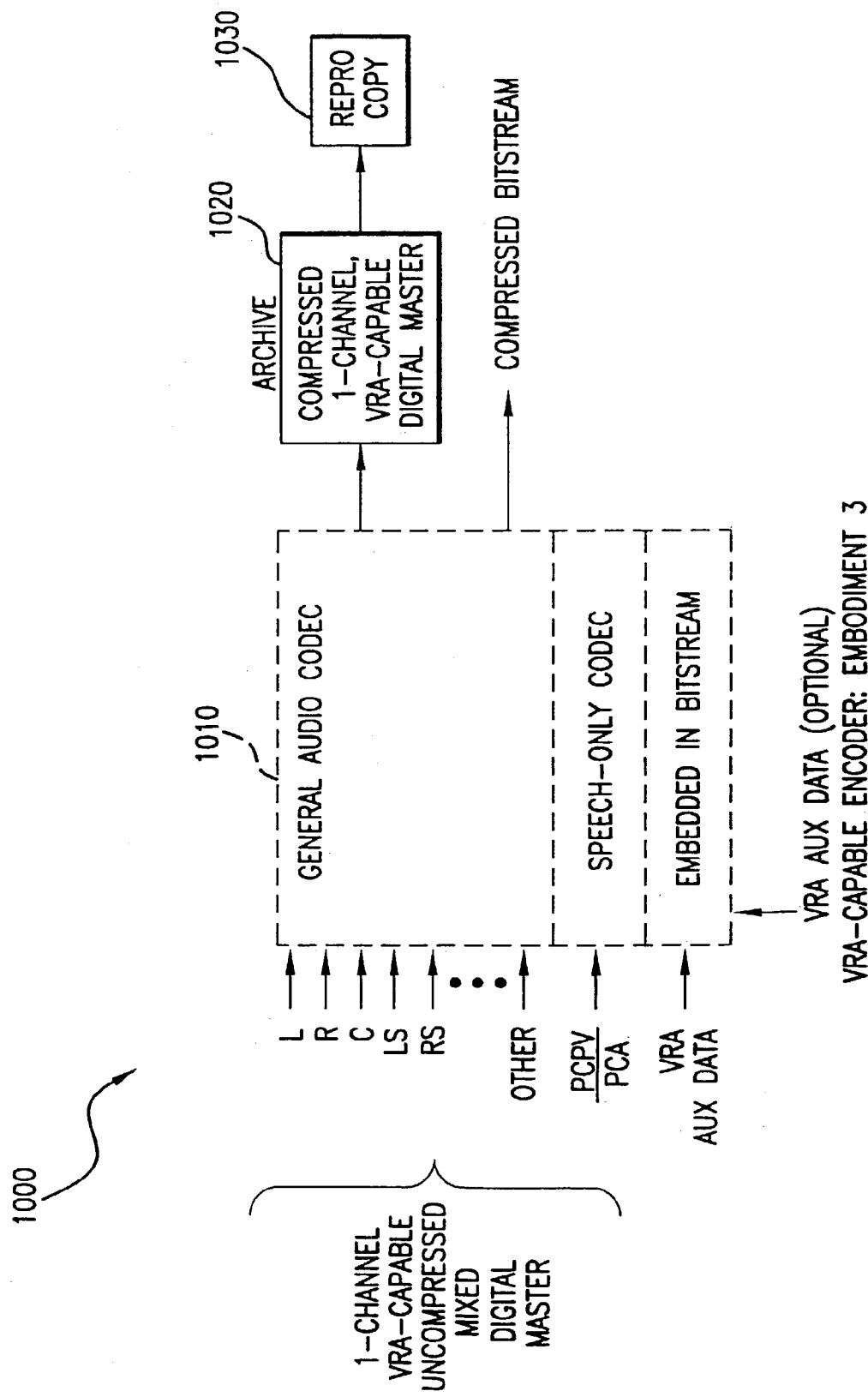
FIG. 10 is an exemplary diagram illustrating another possible embodiment of a VRA-capable encoder.
Figure 11:
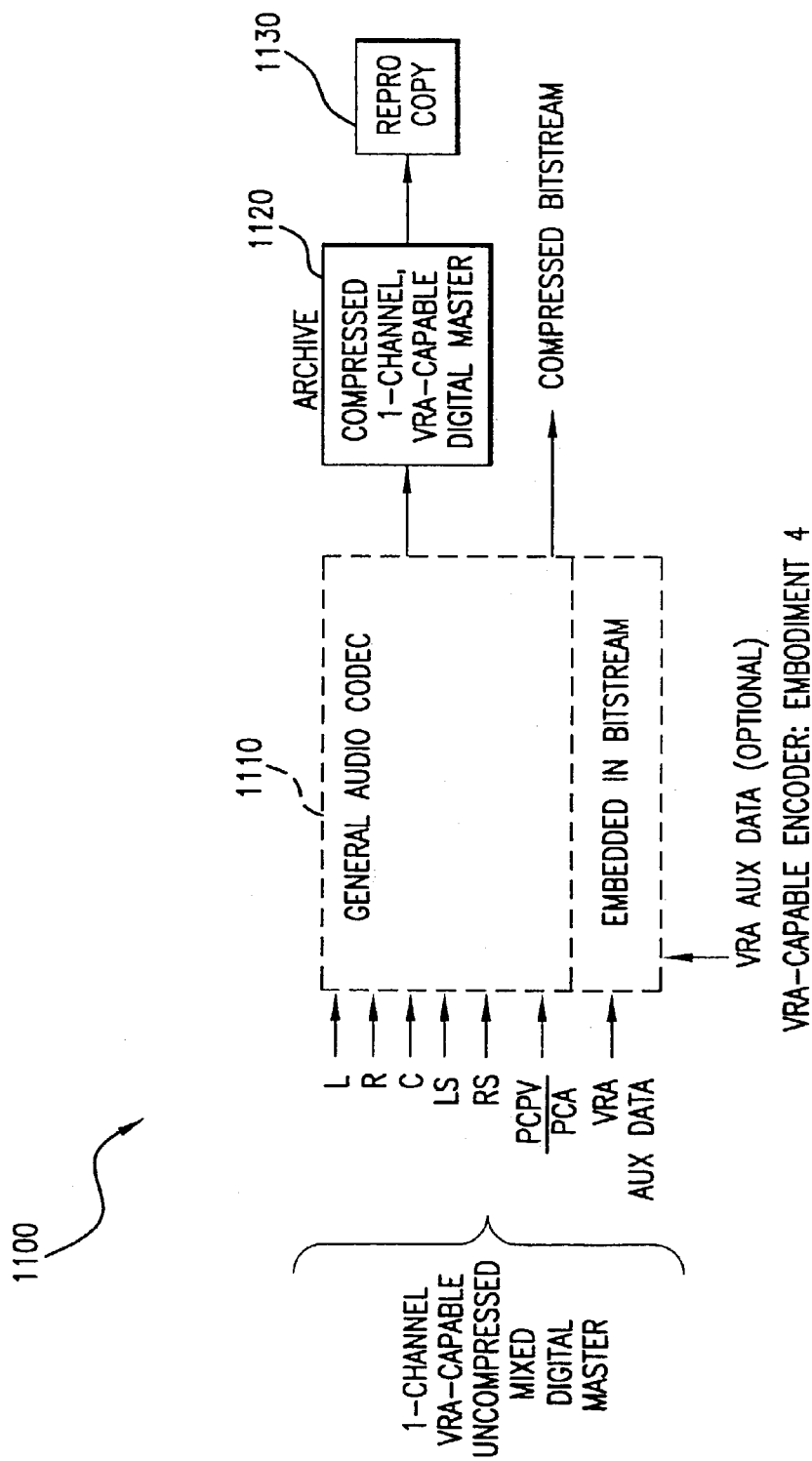
FIG. 11 is an exemplary diagram illustrating another possible embodiment of a VRA-capable encoder.

FIGS. 10 and 11 illustrate two VRA-capable encoder configurations that would lead to compression of a 1-channel, uncompressed, mixed, VRA-capable digital master. As before, it may be desirable to use a speech-only CODEC for the PCPV/PCA signal (see FIG. 10) or the encoder can be set-up to use a general audio compression algorithm for all signals as shown in FIG. 11.

Figure 12:
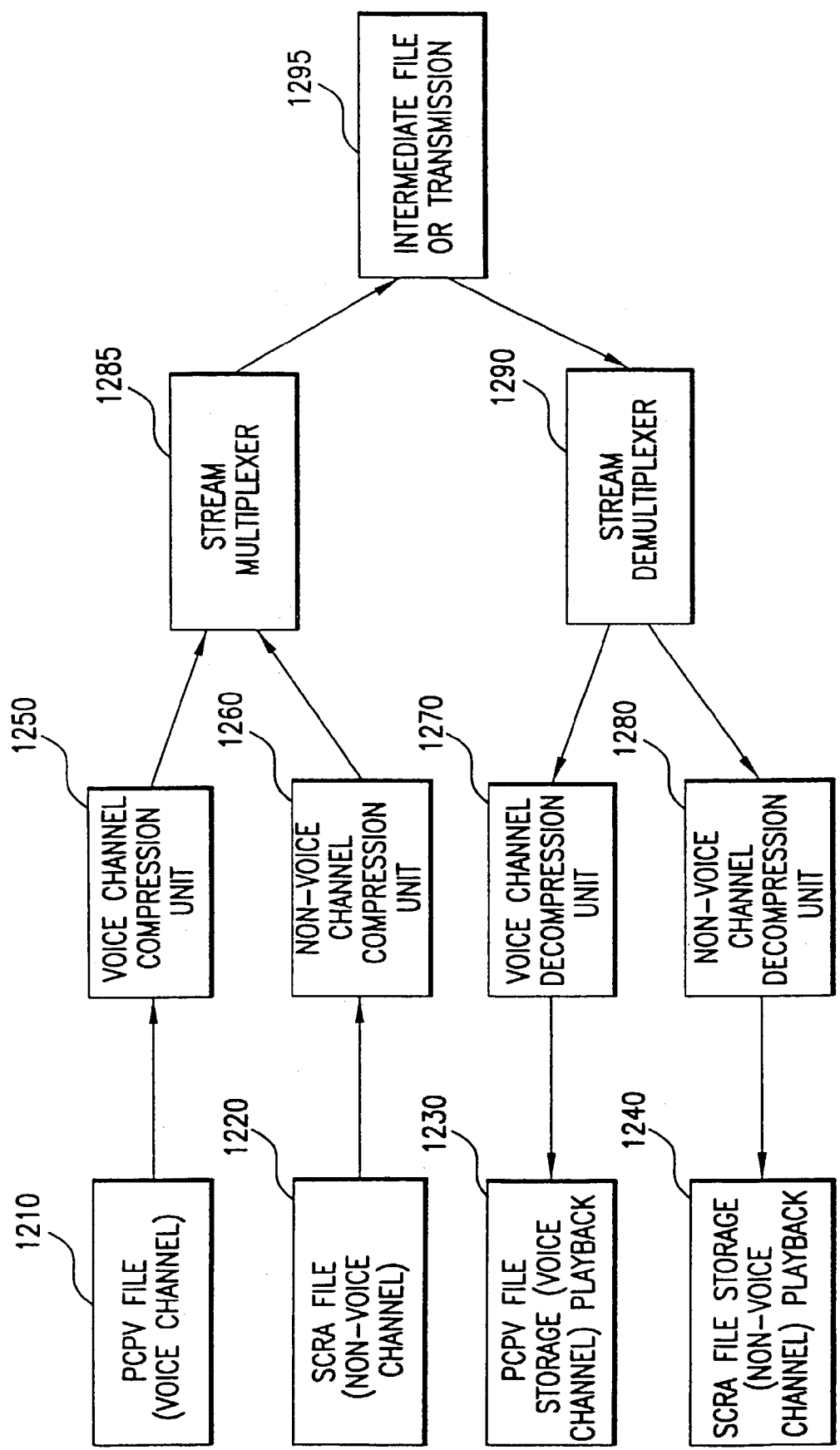
FIG. 12 is an exemplary diagram illustrating another possible embodiment of a VRA-capable encoder.

FIG. 12 shows a second representation of certain conceptual architecture for a VRA-capable CODEC. The essence of this representation is similar to the embodiments of FIGS. 9 and 10 in that the voice information residing in the PCPV/PCA signal(s) is compressed using a speech-only compression algorithm and the SCRA signal(s) is compressed using a more general, wider-bandwidth, audio compression algorithm. Referring to FIG. 12, elements 1210 and 1220 are the digital representations of the PCPV/PCA and SCRA signals (respectively) before compression and likely in the conventional LPCM format. Notice that the digital information might also be available as a.WAV file, as indicated, or some other form of uncompressed digital audio file. The two audio streams are considered to be in parallel at this stage, which is an important distinction over previous audio compression architectures.

By contrast, the conventional audio compression process would be to feed a serial, single-channel audio stream that has both voice and non-voice components into a compression algorithm. It is possible to recognize when the serial bitstream is primarily voice or primarily non-voice, and invoke varying sampling speeds and perhaps even different compression algorithms as the content of the serial bitstream varies between primarily voice and non-voice.

Thus, the conventional technique is quite different than the embodiment set forth in FIG. 12. In FIG. 12, the two parallel streams are fed into two distinct compression algorithms all of the time; as shown by the parallel arrangement of compression units 1250 and 1260. A speech-only compression unit 1250 includes any compression algorithm known to those skilled in the art. The PCPV/PCA information is input to that compression unit 1250 and the SCRA signal(s) residing in 1220 are input to a general audio compression unit 1260 in a manner that is exactly in parallel (time-synchronized between the PCPV/PCA and SCRA) with the voice-only compression of compression unit 1250.

The audio is also considered to be time-synchronized and video-frame synchronized with any related video content, for example, the corresponding video and audio content of a major motion picture. The outputs of compression units 1250 and 1260 are then multiplexed in a specific manner by 1285 so that the interlaced VRA audio can be stored as an intermediate file or transmitted over some digital medium 1295. The demultiplexing process 1290 unwraps the distinct PCPV/PCA information and SCRA information for respective decompression by decompression units 1270 and 1280, respectively. Finally, the decompressed PCPV/PCA and SCRA information may be archived if desired or more likely, at this stage, will be sent directly to the playback device for separate volume controls, similar to the description for FIG. 13 as discussed below.

Also in FIG. 12, a VRA CODEC is created that is compatible with virtually any other existing voice-only or general audio compression and decompression algorithms. We emphasize that compression units 1250 and 1260 can be use algorithms, in their respective classes of voice-only and general audio compression, due to the unique operation of the multiplexer 1285 that accommodates the parallel input architecture of the PCPV/PCA and SCRA signals. Furthermore, the multiplexer 1285 may also include an encryption unit or algorithm for either the PCPV/PCA signal and/or the SCRA signal, in order to provide for secure transmission of these parts. The encryption of the signals can be performed by any technique known to those skilled in the art.

Creation, Contents and Functionality of the VRA Auxiliary Data Channel

The auxiliary channel itself will consist of a variety of information about the primary content pure voice (PCPV) audio signal and the secondary content remaining audio (SCRA) signal. Those features, their functionality, and ways in which that data can be created are discussed in the following bullets:

Presence of VRA capable program—Likely to be included in the header file, this information can be expressed as a single bit indicating on or off. If the bit is one, a VRA capable program has been created using the VRA audio format described earlier (i.e., the PCPV/PCA and SCRA audio exist). This bit will be set by a software or hardware switch at the production level if the audio engineer uses the VRA production techniques. Otherwise, the audio program is considered to be based on conventional mixing practice.

Number of PCPV/PCA and SCRA channels—This information can be preceded by a flag that indicates more than one of each channel is present. If it is indicated so, then further information is provided as to the number of spatial channels that are available in each of the PCPV/PCA and SCRA programs. There is no specific limit set to this number herein, but will likely be dependent on the playback hardware (e.g., 5 speakers=5 available channels). These numbers tell the decoder how many audio channels will be present for decoding (for example 3 PCPV/PCA channels and 5.1 SCRA channels). The audio production engineer will specify the number of channels required for the decoder to construct each of the two audio programs (PCPV/PCA and SCRA) based on the artistic interpretation given to each scene. In order to conserve bandwidth, the digital word containing the PCPV/PCA and SCRA number of channels may vary as a function of time if the number of available audio channels changes within a program or between programs.

Production Mix Data—Both amplitude and spatial information about how to construct the PCPV/PCA and SCRA signals can be encoded as part of this data block. This information, combined upon playback with the decoded audio programs, will recreate the original production mix. (Although the ultimate purpose for this invention is to allow the end-listener to adjust the VRA, it will be required that nominal playback instructions be provided before adjustments by the user are applied. Stated otherwise, any adjustment by the end-user will operate on the production mix levels as a starting point.) Continuing, for example, if the preceding data (Number of PCPV/PCA and SCRA channels) instructed the decoder that one of each of the two programs was available (one PCPV/PCA channel and one SCRA channel), then the production mix data might indicate that both signals should be played back on the center speaker with the PCPV/PCA level of 1.0 and the SCRA at a level of 1.2 (for example).

Therefore, the producer's original intent is realized through the use of the actual volume levels and balance adjustments performed at the mixing stage of the production process. Alternatively, as a result of this invention the end listener now receives the ability to override the original production mix and create his own mix of voice to remaining audio. In order to seamlessly integrate this production mix data (which will include not only amplitude information for all PCPV/PCA and SCRA channels, but spatial information for all channels as well), it is possible to design a software algorithm that will detect the knob location of a spatial positioning control and an amplitude control and transfer that information directly into the VRA auxiliary data channel as a function of time.

Continuing with the previous example, the producer may lower the SCRA audio during a time in the program where the SCRA should be soft compared with the PCPV/PCA. This movement and subsequent new level is detected by the algorithm and recorded in a data file that is transformed into the VRA auxiliary data file format. The amplitude production mix data will also allow the user to establish uniformity among different programs automatically for both the PCPV/PCA and SCRA signals separately. This will allow the voice to remain at a constant SPL between commercials and programs as well as the remaining audio (which could obscure the voice if this information is not available).

It should also be noted that if the producer creates the PCPV/PCA and SCRA signals (multi-channel or not) so that when linearly added together the exact production mix is created, there is no need to transmit all of the amplification and spatial location information for recreation of the production mix at the decoder end. If this data is not included in the VRA auxiliary channel, the decoder will automatically default to a linear combination for the production mix, resulting in the exact production mix playback of the original program.

PCPV/PCA and SCRA Specific Metadata—There is a variety of metadata that can be used to further enhance the playback features available with dual program audio (PCPV/PCA and SCRA). First, in order to have the decoder regulate the level of both the PCPV/PCA and SCRA signal during playback, in the presence of transients, level information may be included. This would simply involve a signal strength detector translating its output to a data file that is time-synchronized with the actual audio of both the PCPV/PCA and SCRA signals. The decoding process can then utilize this data to automatically control the volume level of each of the signals with respect to one another so that the SCRA does not obscure the PCPV/PCA during certain types of program transients. Dynamic range information of both the PCPV/PCA and SCRA channels can also be encoded through a similar process. This would allow the user, upon playback, to control the dynamic range of each of the two signals (SCRA and PCPV/PCA) separately thereby allowing whispers to be loud enough to hear (expansion) or explosions to be soft enough to not disturb (compression). The key to this is that both signals can be controlled independently. Either the program provider will be responsible for entering this information as part of the auxiliary data bitstream during production or software driven algorithms can determining the signal strength over time and generate such data automatically.

Inclusion of the VRA Auxiliary Data Channel in Standard Metadata Bitstreams

The contents of the auxiliary data bitstream discussed in detail above may be included as a new part of the metadata in any conventional CODEC. Typically, commercial CODECs transmit two types of information: the audio and the metadata (information about the audio). In the embodiments discussed herein, the format of the audio and the format of the metadata required to reproduce that audio with VRA control capability are described in detail.

The method for including the VRA auxiliary data will be CODEC dependent. Literally countless CODECs exist and therefore there are countless specific ways in which the auxiliary data can be included in the metadata portion of a particular CODEC. However, since most metadata formats will have locations set aside for additional data, that is typically where the VRA auxiliary data will be stored. This therefore, implies that the decoder must be "VRA aware" and find the VRA auxiliary data in the predetermined vacant locations of the original CODEC's metadata stream. Therefore, another essential feature of the VRA-header data is the identification of the manner in which the VRA-auxiliary data has been placed in the metadata for the CODEC.

At this juncture, it is important to stress that the unique difference in the metadata for VRA-capable audio CODECs is that the information contained in the VRA auxiliary data channel teaches about the creation of two uniquely desirable, separate signals: the PCPV/PCA and the SCRA. Conventional techniques can only create metadata (dynamic range information for example) for an entire audio program that conforms to the prior art audio formats such as Dolby Pro-Logic or 5.1. However, it will be possible to utilize certain aspects of the conventional metadata structure in order to enable VRA-capable audio productions. For example, if the dynamic range information for the PCPV/PCA channel AND the SCRA channel were to be transmitted, it would be useful to include a flag that indicates that the SCRA dynamic range is located in the same location in the metadata file for dynamic range settings associated with conventional art audio formats. Then, only the dynamic range information for the PCPV/PCA needs to be secured in a vacant bit location of the original metadata channel.

Specific Compression Algorithms for Use in VRA-Capable Audio Codecs

Implementation of compression algorithms to minimize throughput and storage requirements is widely practiced by digital audio engineers and companies. For the VRA embodiments introduced earlier, it has already been discussed that it may be necessary to utilize compression algorithms that provide less lossy compression than the AC3 format. It has also been discussed that the embodiments introduced earlier are distinctly different than the Dolby HI Associated Service. A clarification is provided below.

Use of Generic CODEC in Conjunction with VRA Production Techniques with Special Application to the Dolby Digital® CODEC The primary embodiments disclosed herein are independent of the compression techniques of any specific CODEC. As an example, consider that a producer can generate a multi-channel surround program that includes two channels of surround audio, three channels of front audio, and a smaller bandwidth subwoofer channel. This is an audio format known as 5.1 surround sound. This program can be encoded by any CODEC, which may include Dolby Digital®, DTS®, MPEG, or any other coding/decoding scheme. The audio format itself is independent of the coding scheme. Likewise, a mono channel program can be encoding and decoded by any such CODEC.

The focus of this invention is not the CODEC itself but the audio format. All prior audio formats have been restricted to providing the end user with spatial information alone. The audio format proposed herein provides the user with the ability to adjust the ratio, frequency content, dynamic range, normalization, etc. of multi-channel voice to multi-channel remaining audio by including content information in the audio format in addition to spatial information.

There are two distinct differences in the existing technology described in the *Guide for Television Standard*, which discusses the Dolby Digital® (AC3) CODEC. Dolby Digital® (AC3) may also be used in DVD. Dolby Digital® is herein alternately referred to as Dolby Digital® or Dolby AC3. As an inherent part of that standard, a single channel voice is permitted to be transmitted in conjunction with the multi-channel remaining audio. As an additional embodiment, two channel voice and two channel remaining audio is also permitted. In practice, this is very limited for the producer and inevitably requires reproduction of the original program to locate all relevant voice to a single channel. In addition, the voice can only be played back on a single channel in this implementation. Most multi-channel programs require that both the secondary content remaining audio AND the primary content pure voice be multi-channel programs (since critical voice and remaining audio segments are not restricted to a single spatial position). Therefore, in light of the existing technology, it is evident that the embodiments disclosed herein have two distinct advantages:

Multi-channel capability—the VRA audio format permits multi-channel PCPV/PCA AND multi-channel SCRA allowing the producer to exercise all artistic license necessary while still allowing the user to select the desired ratio.

CODEC Independence—The VRA audio format has been designed to operate independent of any CODEC specifics and can thus be used with any CODEC. The hearing impaired associated service in the *Guide for Television Standard* can only work as laid out in the Dolby Digital® specification.

Therefore, the VRA audio format specified in this document can be used WITH Dolby Digital® as a CODEC. The specified VRA audio format includes the needed auxiliary data for playback of the multi-channel PCPV/PCA and multi-channel SCRA at the user's control. This auxiliary data can be included in the metadata portion of any audio CODEC (including but not limited to Dolby Digital®) and the audio information of PCPV/PCA and SCRA can be compressed, (or not) according to the CODEC specification itself, where for the AC3 compression scheme may result in large losses and high compression ratios depending on the audio program content.

The feature of CODEC independence is an important one for support of the VRA enabling features across software platforms. It is important to provide the end user with the ability to control the voice to remaining audio in a multi-channel setting. While AC3 includes a single channel mechanism for accomplishing this goal, other CODECs may not or do not. This invention allows the producer to "level the playing field" when choosing a CODEC to work with. The CODEC can be chosen based on the performance of the compression and decompression algorithm rather than the ability to perform VRA. This allows all CODECs to provide the VRA functionality to the end user.

Therefore, a VRA-capable CODEC could be made compatible with virtually any existing audio compression algorithms. Therefore, this invention includes the creation of numerous VRA-capable compression formats, based on the prerequisite VRA auxiliary data, PCPV/PCA signal, and possibly the SCRA signal. Based on this, it is clear that the following digital audio formats will support the generation of a VRA-capable version using the embodiments described earlier and may serve as the compression algorithm to be used as part of the VRA audio CODECs described above:

DTS-VRA-capable compression
Optimized PCM VRA-capable compression
Meridian Lossless Packing VRA-capable compression
MP3 compression with a speech-only CODEC accompaniment
Dolby Digital®, AC3 VRA-capable compression
MPEG-2 VRA-capable compression
MPEG-4 VRA-capable compression There are numerous other compression algorithms that may be used in VRA-capable CODECs and those are well-known by those skilled in the art. The accommodation of VRA-capability in those algorithms will have to be based on identification of the incoming VRA information, followed by special treatment of the VRA channels and the auxiliary data. There will be numerous ways to accomplish this at the standardized bit-streaming level but those methods are straightforward for anyone versed in the standards of digital audio. It is the inclusion of PCPV/PCA/SCRA signals and auxiliary data in any of these compression algorithms that is one of the many aspects of the invention disclosed herein.

VRA-Capable Decoders

There are a number of functional descriptions that illustrate the features that will be required for VRA-capable decoders at the playback end of the VRA-audio production process. Those descriptions are provided below.

VRA-header recognition: The decoder will be equipped to recognize the different bit patterns used for the VRA-header data. The particular value of the header will determine how the decoder accommodates the incoming VRA-capable bitstream. This feature can be implemented in various ways by those skilled in the art. For example, it is possible to use a bit masking technique, logic operations, or other methods to indicate VRA-capability of the incoming bitstream.

Mode-switching: The decoder will be programmed to toggle between conventional decoding software for multi-channel audio playback (e.g., 5.1 audio or 7.1 audio) or a VRA-playback mode where the PCPV/PCA and SCRA signals will be include the playback signals sent to the speakers attached to the playback device.

Signal Routing: The decoder will utilize the information in the VRA-auxiliary data to determine the appropriate spatio-temporal playback information for the PCPV/PCA and the SCRA signals.

Backwards Compatibility: The decoder will be able to accommodate the playback of non-VRA-capable audio programs also. This will be accomplished by using the logic output of the VRA-header recognition function discussed earlier.

More details about the decoding and playback features are described below.

End User Controls and Ultimate Functionality of the VRA Auxiliary Data, PCPV/PCA and SCRA Channels at the Playback Location As discussed in detail above, the VRA auxiliary data contains various information about the PCPV/PCA and SCRA channels being transmitted or recorded via the CODEC. In addition to the information being delivered to the end user in the auxiliary data, there are several decoder specific functions that can be implemented (that are not present in prior art) as a result of having the PCPV/PCA and SCRA channels delivered separately. The two types of functions (auxiliary data control and PCPV/PCA/SCRA decoder control) are detailed in the following items with specific reference to the operation of the decoder itself.

VRA Auxiliary Channel Identification—Existing as part of the VRA auxiliary channel header file, the decoder will recognize the existence of the VRA Auxiliary channel by polling the specified bit. If the bit is zero (off) then the decoder recognizes that there is no VRA auxiliary data and thus no separate PCPV/PCA or SCRA channels. The decoder can commence decoding another audio format (such as stereo). If the decoder recognizes that the identification bit is one (on) then the decoder can, if desired by the end user, decode the PCPV/PCA and SCRA channels separately and conforming to the specification provided by the CODEC used to record or broadcast the data originally. The identification bit simply makes the decoder aware that the incoming data is VRA capable (i.e., contains the PCPV/PCA and SCRA components) and can change for any programming.

Production/User Mix—This feature represents a user input rather than a piece of information contained in the VRA auxiliary data channel itself. The user has the option to select the production mix or the user mix. If the user mix is selected, a variety of audio control functions can be employed (discussed next). The production mix setting will likely be considered as the default setting on most decoder settings.

If the production mix is selected, the decoder will then collect the amplification data and the spatial location data on each of the PCPV/PCA and SCRA channels from their specified location in the VRA auxiliary channel embedded in the metadata portion of the CODEC. This amplification and spatial location data represents the audio production engineer's original intent in creating the audio program (and is created as discussed in the encoding features section). For each channel of spatial information and each of the two signals (PCPV/PCA and SCRA) the amplification data is applied through a multiplication operation.

If spatial positioning information is required (if for example there is a single voice track that can move from one speaker location to another), then that information is applied to the appropriate channel as a repositioning command. Since the amplification and position of the PCPV/PCA with respect to the SCRA will change with time (depending on the activity of the producer), the decoder will always poll the auxiliary channel data and continually update the settings applied to each of the PCPV/PCA and SCRA signals and associated channels.

It should also be noted that if the PCPV/PCA and SCRA channels are heavily produced so that a simple addition of the respective channels within each of the PCPV/PCA and SCRA signal results in the exact production mix, there is no need to transmit amplification or spatial location information in the VRA auxiliary data channel. If this data is not present, the decoder (when in the production mix mode) will default to a linear combination (of the respective channels) to achieve the production mix. The end user control of this function can be software driven through a soft menu (such as on screen) or hardware driven by a simple toggle switch that changes position between the production and user mix selections.

User Level/Spatial Mix—If the user mix toggle mentioned above is selected, the production mix is disabled and the end user now has complete control over the PCPV/PCA and SCRA signals. The most rudimentary adjustment (and perhaps the most useful) is the ability to control the level and spatial positioning of the PCPV/PCA and SCRA signals and their associated channels independently of one another.

Depending on the audio format, each of the PCPV/PCA and SCRA channels may contain a multitude of spatially dependent channels. Since all of the spatial channels are independent, and (in the VRA audio format) the PCPV/PCA and SCRA signals are independent, the user will be provided, via the decoder hardware and/or software, the ability to adjust the amplitude (through multiplication) and spatial position (through relocation) of each of the independent signals. Providing this functionality to the end user does not require any additional bandwidth, i.e., no auxiliary data is needed. The amplitude and spatial positioning is performed on the two signals (PCPV/PCA and SCRA) and their independent channels as part of the playback hardware or software (volume knobs and position adjustments), not the decoder itself. This hardware may be included with the encoder as a single unit, or it may operate as an additional unit separate from the decoder.

The above descriptions represent the most general sets of adjustments that may be made by and end user whose desire it is to control the entire spatial location and amplitudes of each of the multiple channels within each of the two signals (PCPV/PCA and SCRA). However, the most general adjustment capabilities will likely be far too complicated for the standard user. It is for this reason that another embodiment is described, that permits end user adjustment of the ratio of voice to remaining audio via an easy (user friendly) mechanism that will be made available as an integral part to any VRA capable consumer electronics device.

Figure 13:
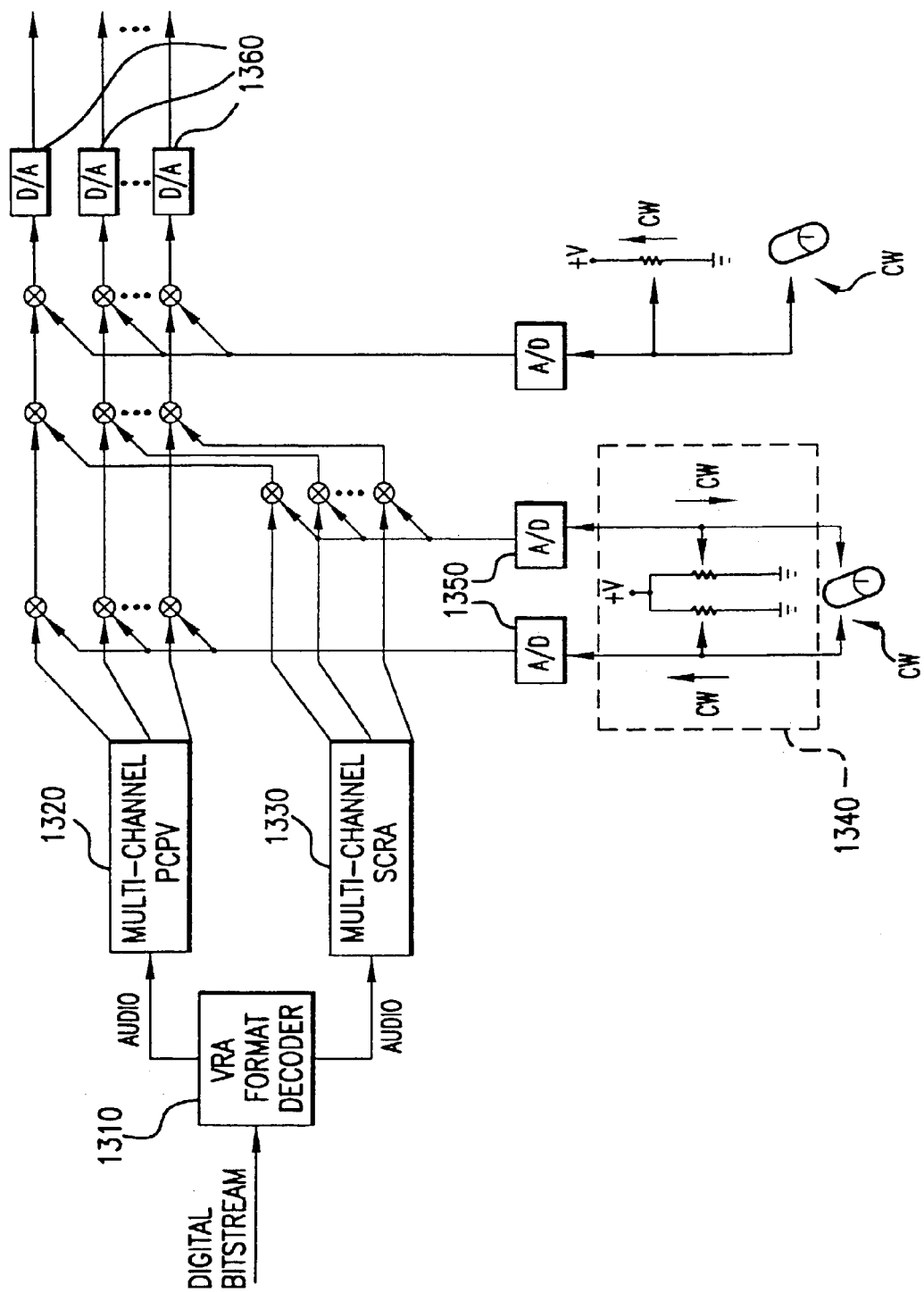
FIG. 13 is a diagram illustrating a VRA format decoder that receives the digital bitstream and decodes the signal into two audio parts.

FIG. 13 illustrates the VRA format decoder 1310 receiving the digital bitstream and decoding the signal into its two audio parts: the PCPV/PCA 1320 and SCRA 1330 signals. As noted earlier, each of these signals contains multiple channels that after end user adjustment, are added together to form the total program. The embodiment in the preceding paragraph discusses end user adjustment of each of those multiple channels.

Alternatively, the embodiment shown in FIG. 13 shows a single adjustment mechanism 1340 that will control the overall level of all PCPV/PCA channels and all SCRA channels, thereby effecting the desired VRA ratio. This is done in the digital domain by first using a balance style analog potentiometer to generate two voltages that represent the desired levels of the voice and remaining audio.

For example, when the knob is turned clockwise, the variable resistor (connected to the knob) on the left moves upward toward the supply voltage and away from signal ground. This causes the wiper voltage to increase. The analog to digital converter 1350 reads the voltage and assigns a digital value to it, which is then multiplied to all of the PCPV/PCA signals (regardless of how many have been decoded). Likewise, when the potentiometer is moved counter clockwise the variable resistor on the right moves toward the supply voltage (and away from ground) to yield an increase it the voltage on the wiper.

This voltage is converted to a digital value and multiplied to all of the decoded remaining audio (SCRA) signals. This arrangement using a single knob allows the user to simply and easily control the independent levels of the voice and the remaining audio thereby achieving the desired listening ratio. After multiplication, each of the PCPV/PCA channels is added to each of the SCRA (in a respective manner where the centers are added, the lefts are added etc.) to form the total audio program in as many channels as have been decoded. Finally, a further level adjustment can be applied to the total audio signal in a similar fashion but by using only a single potentiometer (main volume control) before the adjusted total program audio is sent to the amplifier and speaker through the digital to analog converters 1360 for each spatial channel.

User Equalization Control—A more advanced feature that will provide further end user adjustment of the PCPV/PCA and SCRA signals is the ability to separately adjust the frequency weighting of the PCPV/PCA and SCRA signals. This may be useful for a person with a specific type of hearing impairment that attenuates high frequencies. Simple level adjustment of the PCPV/PCA (voice) signal may not provide the needed increase in intelligibility before the ear begins saturating at the lower frequencies. By allowing a frequency dependent adjustment (also known as equalization) of the PCPV/PCA signal improved intelligibility may be achieved for certain types of programming. In addition, very low frequency information in the SCRA signal (such as an explosion) may be obscuring the speech formats in the PCPV/PCA channel. Frequency dependent level control of the SCRA signal (independent from the PCPV/PCA signal) may retain critical mid-frequency audio components in the SCRA channel while improving speech intelligibility. Again, this can be performed in hardware that is separate from the decoding process as long as the PCPV/PCA and SCRA channel have been encoded and decoded using the VRA audio format, thus requiring no extra information to be transmitted in the auxiliary channel.

PCPV/PCA and SCRA Specific Metadata—There is a variety of metadata that was included in the encoder discussion that can be used to further enhance the playback features available with dual program audio (PCPV/PCA and SCRA). Unlike the level, spatial, and equalization adjustments discussed above, these features do require that encoded VRA auxiliary data be present in the metadata as part of the bitstream. These features include signal level, dynamic range compression, and normalization.

The signal level transmitted as part of the encoding process will provide data (at the decoding location) about the level of the PCPV/PCA and SCRA channels independently and as a function of time. This data can then be used to control the levels of the PCPV/PCA and SCRA channels independently and simultaneously in order to maintain the user selected VRA ratio in the presence of audio transients. For example, the signal level data of the SCRA channel may indicate that an explosion will overpower the PCPV/PCA (voice) during a certain segment, and by division, will indicate by how much.

Therefore, the decoding process can use that information with the playback hardware to automatically adjust the signal level of the SCRA by the appropriate amount so as to retain the user selected VRA ratio. This prevents the user from always adjusting the relative levels throughout the entire program.

Next, dynamic range information present in the bitstream will allow the user to select different playback ranges for both the PCPV/PCA and SCRA signals independently. The user selects the desired compression or expansion as a function of 100% of the full dynamic range and that is applied to each signal prior to their combination.

Finally, the normalization information, which is slightly different from the level information, provides a RMS or signal strength gauge of both the PCPV/PCA and SCRA signals from program to program. This data may only be transmitted as part of the auxiliary data header file and will apply to the entire program. If the user chooses, this information can be used to normalize the PCPV signals across all programs as well as normalizing the levels of the SCRA signals across programs. This ensures that A) dialog (PCPV) heard from one program to the next will remain at a constant level (SPL) and B) explosions (SCRA) heard from one program to the next will remain at a constant level (SPL).

All of this functionality is only possible for the PCPV and SCRA signals when encoded using the VRA audio format. The same effects cannot be realized if they are applied to the production mix alone because the production mix contains the PCPV (voice) and SCRA (remaining audio) completely integrated and not separable.

Archival Embodiments

The embodiments described below are presented in order to illustrate the wide range of archival configurations that can be used to store the VRA information in such a way that the end-user will ultimately benefit from the VRA adjustment. The common theme of all the archival embodiments listed here is that each one represents a form of archived digital audio media that does not currently accommodate the storage of the PCPV/PCA signals and/or the SCRA signal and/or the VRA-header and/or the VRA-auxiliary data but all of the media listed have the potential for modification so that they can become VRA-capable archived digital audio media. For the archived media described below, the label of "VRA-capable soundtrack" refers to a soundtrack that has the PCPV/PCA/SCRA signals stored as particular channels and/or has sufficient VRA-auxiliary data such that one or both of those signals can be constructed and played back using the VRA decoder features introduced earlier. Again, we note that the definition of such VRA-capable soundtracks is an invention in itself, and is underlain by the various embodiments that are required for implementation described earlier.

CD with LPCM versions of the PCPV/PCA and SCRA signals stored as two separate tracks on the CD. Note that this embodiment will sacrifice the stereo positioning.

CD with Optimized LPCM versions of the PCPV/PCA signal stored in addition to the conventional stereo signals found on CD media.

DVD movies with DTS VRA-capable soundtrack.

DVD movies with LPCM VRA-capable soundtrack.

DVD movies with MLP VRA-capable soundtrack.

DVD movies with MPEG-4 VRA-capable soundtrack.

DVD movies with MPEG-2 VRA-capable soundtrack.

DVD movies with Dolby Digital® VRA-capable soundtrack.

DVD-audio discs with VRA-capable formatting.

SuperAudio CD with VRA-capable formatting.

Re-Authoring of Existing Audio Master Tapes for Production of VRA-Capable Versions One expected benefit of providing the VRA adjustment for movies or other audio programs with significant vocal content is the improvement of speech intelligibility by the listener. This will be particularly true for hearing impaired individuals. At this time, there are literally thousands of films that exist in analog formats versus digital formats. It is also true that none of these films were created to be VRA-capable. Therefore, there is a need for "re-authoring" of these non-VRA-capable, analog soundtracks so that the PCPV/PCA/SCRA signals are generated, along with the corresponding VRA-auxiliary data. That new information can then be stored in any of the VRA-capable digital master formats presented above. This invention will result in a wider range of VRA-capable films available to the hearing impaired community.

Video-on-Demand VRA-Capable Soundtrack Archives and Database

The advent of digital audio and streaming video/audio has enabled a new opportunity called "video-on-demand." Video-on-demand (VOD) systems allow a user to download a movie or other program of his/her choice via an ISDN line, or modem, for one-time playback on the user's digital television (or using an analog television with a set-top converter box). At this time, there are no films in the VOD data bases that have VRA-capable soundtracks. As the VRA adjustment hardware becomes integrated in future consumer electronics devices, VOD users will probably prefer to order the VRA-capable soundtracks. Therefore, these embodiments are concerned with meeting that expected need. The first invention is a VOD database that includes of films that have VRA-capable soundtracks. These VRA-capable videos can then be downloaded by hearing-impaired listeners, or other viewers who enjoy using the VRA adjustment.

Another related aspect of the invention is the creation of a new archive of audio soundtracks, without the corresponding video information, where the new archive consists of VRA-capable soundtrack audio only. Archival of the audio-only portion for a VRA-capable movie will provide a huge savings in storage requirements for the VOD database. The VRA-capable soundtracks (without video) will be created in the same manner as discussed earlier for embodiments that enable the VRA-capable systems, in addition to one other feature. These VRA-capable soundtracks will be time synchronized to the audio content of the original motion picture or program using cross-correlation signal processing techniques and/or time synchronization methods if the non-VRA-capable soundtrack has time marks available. Both methods will serve to correlate the VRA-capable audio information with the non-VRA-capable audio information that resides on the original film. After the correlation is optimized, the film can be played with the original soundtrack muted and the VRA-capable soundtrack on.

MP3 VRA-Capable Music Archives

The use of MPEG-2 Layer III (MP3) has become very popular for music recordings that are streamed from an archived database to some Internet media playback device. The previous definitions of system components that enable VRA-capable digital audio files apply equally well to MP3 formats. Therefore, this invention is concerned with the creation of VRA-capable MP3 recordings that reside in a special data base for downloading by a listener (commercially or otherwise).

Figure 14:
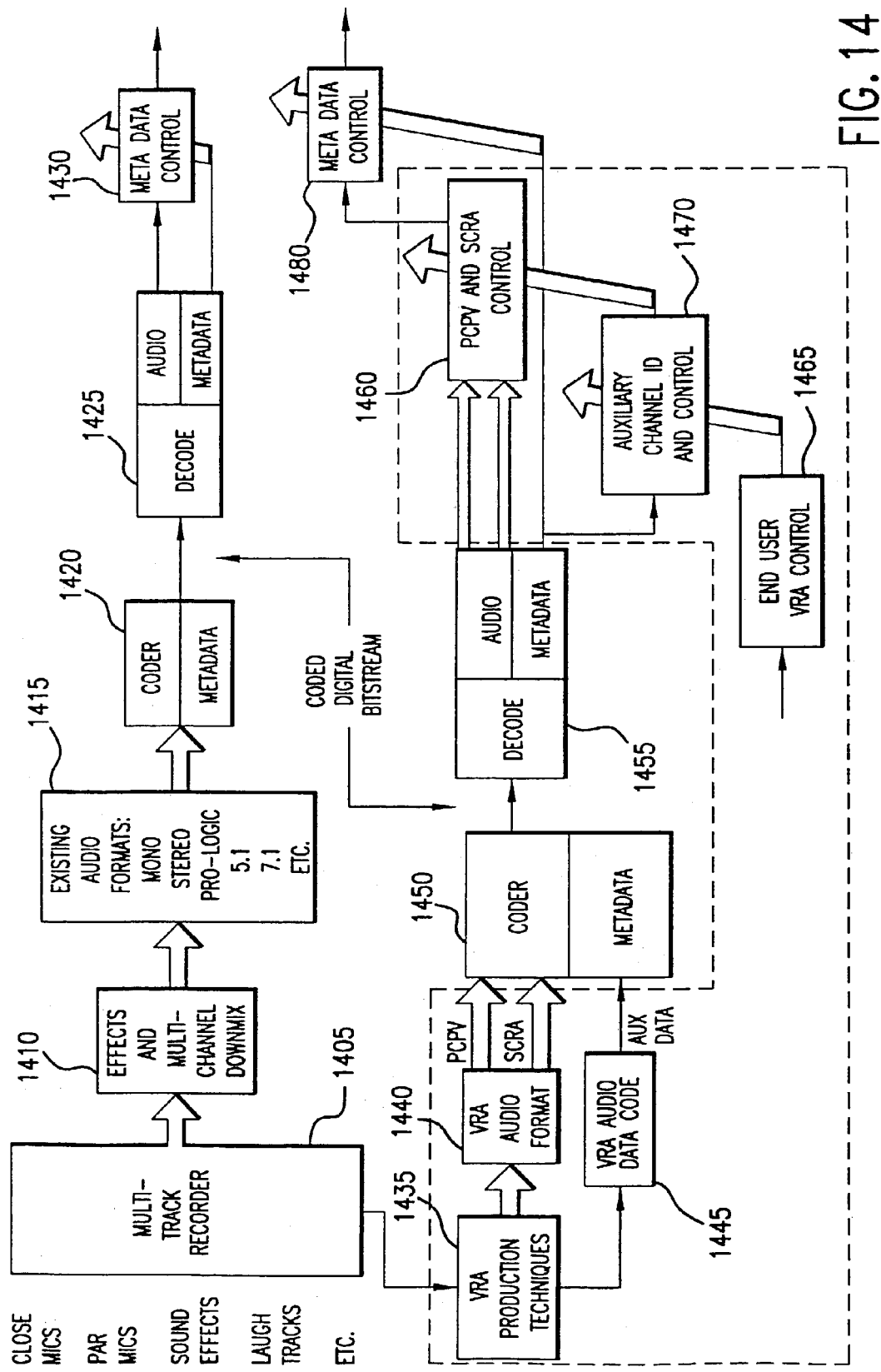
FIG. 14 is a diagram of an exemplary audio signal processing system of the invention.

In FIG. 14, the upper segments of the block diagram show the current state of the art to deliver audio programming from producer to user. During pre- and post-production, a variety of audio segments are available to the engineer in a multi-track recorded format 1405 that may include close microphone recordings, far microphone sounds, sound effects, laugh tracks, and any other possible sounds that may go into forming the entire audio program. The sound engineer then takes each of these components adds, effects, spatially locates and/or combines the sound components in order to conform to an existing audio format 1415. These existing audio formats 1415 may include mono, stereo, Pro-Logic, 5.1, 7.1 or any other audio format that the engineer is conforming to.

Once the program has been produced in the desired format, it is passed into a coding scheme 1420, which may include metadata. Any number of coding schemes will be employed at this stage that may include uncompressed, lossless compression, or lossy compression techniques. Some common coding schemes include Dolby Digital®, MPEG-2 Layer 3 (for audio), Meridian Lossless Packing, or DTS. The output of such a coder is a digital bitstream which is either broadcast or recorded for playback or broadcast. Upon reception of the digital bitstream, the decoder 1425 will generate audio and if used, metadata. Note that the combination of the coder 1420 and the decoder 1425 is often referred to in the literature and in this document as the CODEC (i.e., coder-decoder). The metadata 1430 is considered to be data about the audio data and may include such features as dynamic range information, the number of separate channels that are available, and the type of compression that is used on the audio data.

The lower portion of FIG. 14 represents the embodiments of the invention discussed herein. Beginning with the multi-track recording, VRA production techniques 1435 are utilized (conforming to the specifications disclosed herein) to form a new audio format that is distinctly different from all preceding ones. The VRA format itself has its own metadata shown in the figure as the VRA audio data code 1445.

In addition, preceding formats have focused on spatiality for generating audio channels from audio tracks, whereas this new format focuses on generating both CONTENT and SPATIAL channel from the master audio tracks at the production level. Among many other things, the desired production mix (driven by the sound engineer) of the content portions into spatial location at the playback site is retained and controlled by the creation of the auxiliary data stream via the VRA production techniques. At this point the auxiliary data, the PCPV (primary content pure voice) and SCRA (secondary content remaining audio) are used by any standard CODEC, similar to the conventional techniques. The CODEC 1450, 1455 makes no specification on the content and format of the audio and/or information contained in the metadata, but rather codes any data it receives and likewise decodes it at the reproduction location. Once the audio data (PCPV and SCRA) and auxiliary data (via CODEC metadata) are received and decoded, the end user controls the auxiliary channel identification 1470 and control data 1465 (if it is present and recognized) and the PCPV and SCRA channels are then controlled by those end user adjustments 1460. If present and required by the original CODEC, additional metadata can be used to further control the playback 1480 without affecting the performance of the VRA audio format and associated reproduction.

Although various embodiments are specifically illustrated and described herein, it will be appreciated that modifications and variations of the present invention are covered by the above teachings and within the purview of the appended claims without departing from the spirit and intended scope of the invention. In particular, the invention may include:

A VRA-capable CODEC that: accepts a parallel input configuration of the PCPV/PCA signal(s) and the SCRA signal(s), compresses the PCPV/PCA signal(s) using any speech-only compression algorithm, compresses the SCRA signal(s) using any general audio compression algorithm, without loss of the original time-alignment and video-frame synchronization between the two audio signal and any accompanying video, multiplexes the two compressed bitstreams, along with corresponding associated data that defines the specific compression algorithms and syntaxing methods used for the signals, said multiplexed bitstream either stored as a VRA-capable file or transmitted to a corresponding demultiplexer that separates the PCPV/PCA and SCRA signals, routes them to the appropriate decompression algorithms and then sends the two signals to a storage medium or to the appropriate volume control and playback devices that enable the VRA-adjustment for an end-listener.

A VRA CODEC that is independent of the specific voice-only compression and general audio compression algorithms used to compress the PCPV/PCA and SCRA signals.

A VRA-encoding process that recognizes the data header of a VRA-capable digital master or VRA-capable archived audio file and automatically proceeds with the parallel compression of the PCPV/PCA and SCRA signals, using the voice-only compression and general audio compression.

Numerous available "speech-only" compression and "general audio" compression algorithms VRA-capable decoder that recognizes the incoming VRA-multiplexer associated data and acts to demultiplex and decompress the VRA bitstream into the separated PCPV/PCA and SCRA signals.

A VRA-capable decoder that is programmed to toggle between conventional decoding software for multiple-channel playback and a VRA-playback mode where the PCPV/PCA and SCRA signals comprise the playback signals sent to the speakers attached to the playback device.

A VRA-capable decoder that utilizes VRA auxiliary data information to determine the appropriate spatio-temporal playback information for the PCPV/PCA and SCRA signals.

A VRA-capable decoder that recognizes the existence of the VRA auxiliary data by specifying the identification bit (on or off) to determine if the incoming audio is VRA-capable (or not).

A VRA-capable CODEC as described above where the PCPV/PCA and SCRA signals are encrypted after the audio compression step, and un-encrypted before the decompression step.

A VRA-capable CODEC that utilizes VRA auxiliary data and/or auxiliary data channel, said VRA auxiliary data created in such a manner as to identify the CODEC as VRA-capable through a specific bit pattern in the auxiliary data; identify the number of PCPV/PCA and SCRA channels that are to be used in a spatial audio playback configuration, said spatial playback for multiple channels being changeable at varying locations in the auxiliary data to indicate different spatial playback at different timings of the audio program; identify the production mix data so as to facilitate the VRA playback and volume adjustment process by the end-listener; include PCPV/PCA and SCRA specific metadata.

The VRA auxiliary data may be introduced as part of the metadata in any other CODEC, without loss of specificity of the purpose for the VRA auxiliary data defined here.

The creation of VRA auxiliary data that is compatible with the specific compression algorithms used in conjunction with the VRA-capable CODEC.

The use of VRA auxiliary data in conjunction with the AC3 television audio format in order to enable multiple channel and/or spatially distributed playback of the PCPV signal(s) and multiple channel and/or spatially distributed playback of the SCRA signal(s).

Re-authoring of existing film, movie, and television soundtracks' audio master tapes to create VRA-capable versions of the soundtracks.

VRA-capable means PCPV signal resides as separate audio information in the soundtrack storage medium.

VRA-capable means SCRA signal resides as separate audio information in the soundtrack storage medium.

Re-authoring means to combine some artistic combination of one or more vocal tracks existing on the original soundtrack audio master tape in such a way as to create the primary content pure voice track for subsequent adjustment by a VRA-capable playback device.

Re-authoring means to combine some artistic combination of one or more non-vocal tracks existing on the original soundtrack audio master tape in such a way as to create the secondary content remaining audio track for subsequent adjustment by a VRA-capable playback device.

Re-authoring means to take the newly created PCPV and SCRA information and construct a VRA-capable digital master audio storage medium as disclosed in the archiving claims.

Creation of a digital database, or archiving system, consisting of VRA-capable film soundtracks for the purposes of transmitting VRA-capable movies, films, or television programs via satellite, internet, or other digital transmission means to VRA-capable playback devices.

Digital databases to include video-on-demand film, movie, web-tv, digital television, or other programs.

Digital database may consist of a single film entity where the corresponding soundtrack is VRA-capable, using means disclosed elsewhere in this document.

Digital database may consist of only the VRA-capable audio soundtrack, with appropriate time-synchronization and video-frame synchronization, so that the VRA-capable soundtrack can be sent independently of the original program soundtrack for substitution as the soundtrack of choice at the time of audio playback.

Creation of a digital database, or archiving system, consisting of VRA-capable music audio (e.g., .WAV, .MP3, or others), said VRA-capable music audio created with some blend of vocal tracks designated as the primary content pure voice audio, and some blend of instruments designated as the secondary content remaining audio.

Digital database may consist of only the designated PCPV audio information, time-synchronized the original musical recording or digital file, to facilitate substitution of the PCPV vocals at the time of playback.

A recording medium contains or have recorded thereon, any of the features discussed herein.

DVD and other Digital Audio File Formats

The creation of VRA-capable digital masters, and subsequent archiving/storage of the VRA audio tracks, is valid for virtually any audio storage media. Examples of digital audio formats that could successfully host VRA soundtracks include DVD, CD, super CD, MP3, wave files (.wav), direct satellite broadcasts and numerous other digital audio file formats. It is clear that new functionality must be identified for both the transmission techniques for VRA audio and the respective playback devices for a selected audio file format (i.e., DVD players, CD players, MP3 players, etc.). In this section, preferred embodiments using DVD media are presented but it will be obvious to those skilled in the art that the concepts discussed below are relevant to all other digital audio implementations where one wishes to provide PCPV and SCRA signals to an end-listener. Furthermore, while embodiments are presented in terms of DVD, those of skill in the art will recognize that DVD represents one method of optical data storage and other forms or methods of data storage on optical media are equally applicable. The DVD-Video disc is currently the most popular media format of choice for home movie viewing; described herein are certain preferred embodiments for the provision of the authoring, editing, and playing of a VRA-capable DVD video disc on a VRA-capable DVD player. (Of course, a DVD-video or DVD-audio disc is an optical storage medium that is used as a carrier of, for example, data, sound, and/or images.) Such embodiments may find application, for example, in consumer products for home use or laptop computers or commercial products that could be used for training, sales, or educational programs, among others. Of course, the applications listed above are exemplary and are not meant to be limiting. The embodiments and identification of features for playing back the VRA soundtrack of a movie in a DVD application will be consistent with VRA features in virtually any other digital audio playback hardware. Therefore, the following discussion should not be construed to be limited strictly to DVD-Video disc playback, but rather to any digital audio storage medium and playback hardware, in general.

To ensure that the VRA-soundtracks can be realized within the motion picture industry, it is important to establish methods of VRA-soundtrack production, encoding, decoding, and playback that can be accomplished within the framework of industry standards. Detailed technical specifications about the required and allowable digital data on a DVD-video disc, for example, must be conforming to a governing body for DVD media. Licensure is currently required for the application or disclosure of the DVD specifications in certain products including discs or playback equipment; therefore, those specifications will not be introduced here. For other digital audio applications, there are other standards that will guide the precise implementation of the VRA embodiments. For example, movies have recently been created using MP3 audio compression, where the smaller resulting audio files are better suited for transmission over ISDN lines. The embodiments disclosed herein for VRA audio media can, however, be presented without any reliance or reference to standards. In other words, knowledge of those standards is not required for one of ordinary skill to practice the invention disclosed herein. Furthermore, it is clear that the overall methods and apparatus required to author a VRA soundtrack for digital playback (i.e., DVD, video-on-demand, etc.) are the same for any storage media; therefore, the methods and apparatus described herein are valid, for example, for all digital movie viewing applications. For ease of explanation, much of the discussion will focus on DVD as the movie storage and playback format. However, the digital soundtrack authoring and playback embodiments described will also be easily adapted to the other digital media specifications used for non-DVD audio and audio/visual delivery (e.g., direct satellite broadcast, Internet delivery, cellular transmission).

VRA Audio Encoding

The audio encoding processes for DVD Video disc formats will be very similar to encoding processes that satisfy the transmission of VRA audio on other digital audio media such as direct satellite broadcast, MP3, WAV, etc. Although movies are largely viewed today in theatres or at home on VHS and DVD media, there are other situations that will allow the playback of VRA-capable movie soundtracks. Internet delivery has started to become popular, which requires the use of other types of audio compression algorithms, such as MP3, Real Audio, WAV, etc. The user will download the movie, then the playback software will decode the movie's video and audio streams for viewing either on the computer monitor or perhaps sending the video/audio signals to a nearby television screen using wireless techniques (e.g., BlueTooth® technologies). Another situation that occurs is the reception of direct satellite broadcasts by aircraft, passing the signal to monitors that the passengers can view. In a noise aircraft cabin, there would be great benefit in providing VRA to the passengers. In that environment, as in others, VRA can allow a user to adjust voice-to-remaining audio to a ratio best suited for the individual user.

Figure 15:
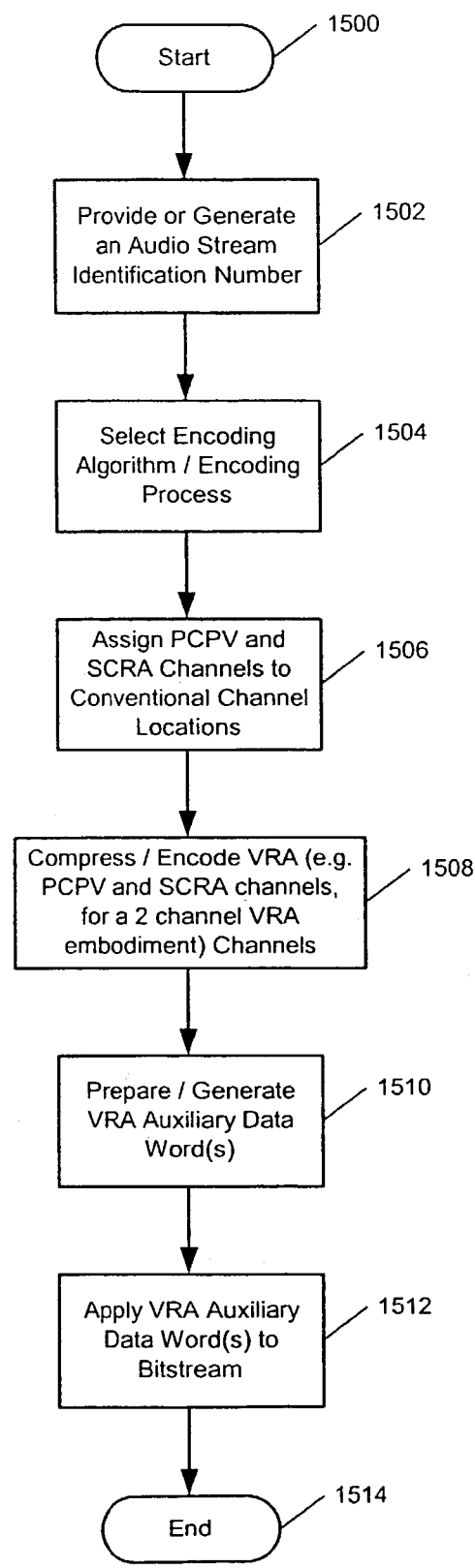
FIG. 15 illustrates the post-production method for provision of VRA-capable soundtracks in any digital audio delivery and playback process, including, for example digital audio delivery and playback processes for movies, in accordance with an embodiment of the invention.

Currently, the authoring of movies for these non-DVD formats does not allow the authoring of VRA movies. FIG. 15 illustrates the post-production method for provision of VRA-capable soundtracks in any digital audio delivery and playback process, including, for example digital audio delivery and playback processes for movies, in accordance with an embodiment of the invention. The method may start at 1500. At 1502 an audio stream identification number that identifies the audio as a VRA audio stream (e.g., a private stream identification number for the DVD Video disc format) is provided or generated. At 1504, an encoding algorithm/encoding process is selected. The encoding algorithm may be one that is sanctioned within the standards defined for the specific audio transmission path of interest. At 1506, the PCPV and SCRA channels are assigned to conventional channel locations for the selected encoding process. At 1508, the VRA (e.g., the PCPV and SCRA channels, for a 2 channel VRA embodiment) are compressed or encoded. At 1510, a VRA auxiliary data word or words are prepared or generated. The VRA auxiliary data word or words inform a playback process of, for example, the number and location of each of the PCPV and SCRA channels in the audio program. At 1512, the VRA auxiliary data word or words are applied to the bitstream of, for example, a DVD video disc in the case of a bitstream that will be stored on a storage medium, or transmitted with other data in the case of a bitstream the is broadcast by satellite or Internet. The VRA auxiliary word may be applied at a specific location in the bitstream. The VRA auxiliary data word can be used to interpret the VRA soundtrack. Such interpretation may be made, for example, by post-processors or computers in future generations of VRA-capable players for the respective audio media. As illustrated, the method may stop at 1514.

VRA-Capable DVD Video Discs and VRA-Capable DVD Players

As disclosed herein, VRA encompasses the creation, storage, transmission, and playback of the PCPV (primarily voice or speech signals), SCRA (non-voice remaining audio), metadata, and auxiliary data channels, where the PCPV and SCRA audio data can be presented in any variety of spatial dimensions including mono, stereo, and/or surround variants. The specific embodiments described below are for VRA audio soundtracks that have been mastered in the studio according to previously disclosed methods and are to be played back as the audio content of current and future generations of DVD-Video discs. The fundamental issues that must be addressed to make VRA-capable DVD movies playable from a DVD-video disc are concerned with the disc authoring, including the audio encoding process, and the hardware embodiments to accommodate playback of the VRA-capable DVD video discs on either existing players or future generations of VRA-capable DVD players. The digital authoring of VRA movies is described next, followed by a description of VRA hardware features.

Disc Authoring

Figure 16:
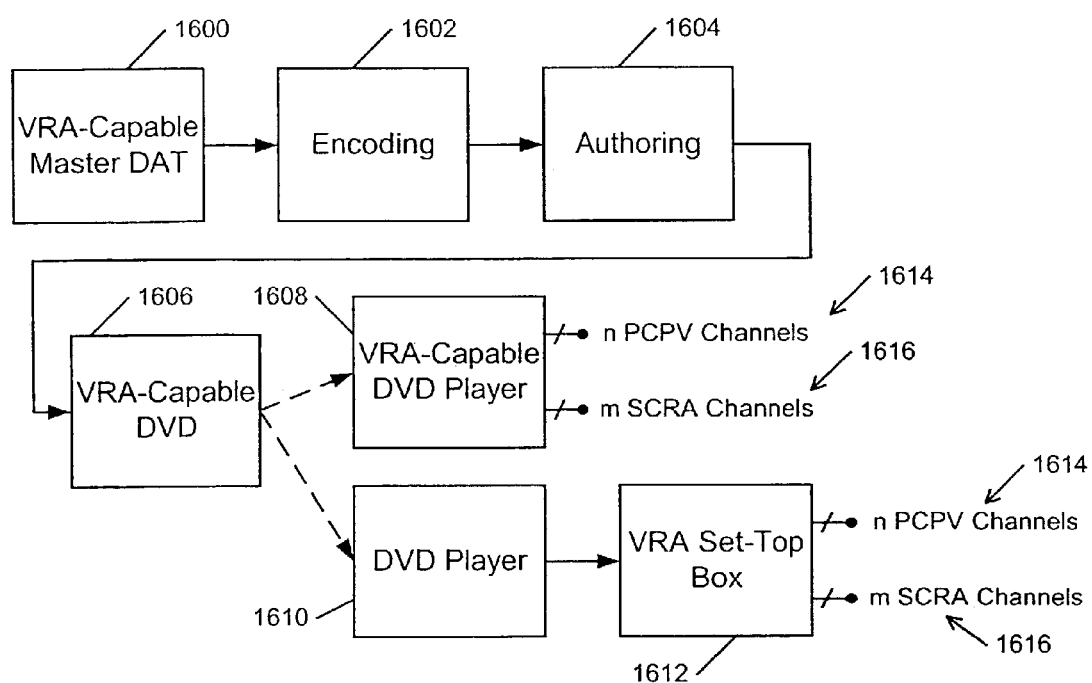
FIG. 16 illustrates the system components for provision of a VRA movie soundtrack via a VRA-capable DVD disc, in accordance with an embodiment of the invention.

To create VRA-capable DVD discs, there are inventive steps required in the digital encoding and authoring process, as well as in the CODEC and DSP-based post-processor that each player manufacturer integrates to their particular DVD player model. FIG. 16 illustrates the system components for provision of a VRA movie soundtrack via a VRA-capable DVD disc, in accordance with an embodiment of the invention. The VRA-capable master 1600 was discussed in detail previously. The encoding 1602 and authoring 1604 processes will be discussed for the VRA DVD reproduction process, leading to the VRA-capable DVD master disc 1606 to be copied for distribution. Manufacturers will then need to prepare VRA-capable post-processing algorithms for use in VRA-capable DVD players 1608. When the DVD player is not VRA-capable, for example an existing DVD player today 1610, embodiments will be described that provide for the PCPV and SCRA signals to be routed directly to VRA set-top box hardware units 1612. Both the VRA-capable DVD player 1608 and the VRA set-top box 1612 may be used to, among other things, adjust the PCPV volume, adjust the SCRA volume, and output an adjusted set of PCPV channels 1614 and SCRA channels 1616 to speakers (not shown). In upcoming generations of hardware, it will be possible to manufacture VRA-capable DVD players that accommodate the playback of the VRA audio information directly to speakers attached to the player. The inventions associated with each component illustrated in FIG. 16 will be discussed in the following sections.

Encoding

Storage of a VRA soundtrack on a DVD distribution copy begins with the creation of the VRA-capable master audio tape (analog or digital). Given the storage capacity of DVD media, there are limitations on the specific audio layout that the sound engineer may choose for the VRA format that is encoded on the DVD from the VRA-master. For example, it is well known that the DVD audio must include stereo Linear Pulse Code Modulation (LPCM) and either Dolby® AC3 or MPEG audio. (Current practice in DVD authoring typically favors the inclusion of Dolby Digital®, particularly in the United States.) These audio requirements basically constrain the number of uncompressed LPCM audio channels that can fit into the audio space of the disc to stereo (2) channels only. As a result, surround sound in LPCM is not practiced today and is not practical within existing storage limits on the DVD video discs. This ultimately constrains the spatial content of LPCM VRA audio soundtracks to mono PCPV and mono SCRA, which would be acceptable, but not ideal, for a certain segment of the listening audience. For the more appealing qualities associated with spatial surround sound VRA audio soundtracks, it is necessary to define methods that are achievable within the framework of favored audio compression methods that are commonly used for DVD authoring. A very brief review of the favored audio compression methods (i.e., audio encoding methods) is provided as background for features that may be used in VRA audio encoding. These audio compression methods are known today within the confines of existing encoders; it will be understood that recitation of the following audio compression methods is not meant to limit the number or type of audio compression methods available for use in VRA audio encoding.

While the only video formats allowable on DVD video discs are MPEG-1 and MPEG-2, based on ISO/IEC 11172-2 and 13818-2 respectively, a variety of audio formats are available for use in conjunction with these video formats. The following presents a summary of a selected group of audio formats, namely Dolby®, MPEG, and DTS. Explanations of some commonly used features and aspects of each format are also presented.

Dolby® Audio

Dolby Digital® is an advanced form of digital audio coding that makes it possible to store and transmit high-quality digital sound far more efficiently than was possible for analog audio. First used in movie theatres in 1992, it is the result of decades of experience by Dolby Laboratories in developing signal processing systems that are based on exploiting the characteristics of human hearing. Certain features of Dolby Digital® will be defined to facilitate discussion of VRA audio encoding.

Metadata—Metadata provides a number of key parameters that are specifically intended to change the sound of the program delivered to the consumers' listening environment. These metadata parameters are dialogue level, dynamic range control, and downmixing. Although technically not an individual metadata parameter, downmixing with the consumer's decoder is affected by specific metadata parameters. None of these parameters are sufficient for the separate adjustment of dialogue and remaining audio content.

Dialogue Normalization—automatically adjusts the volume when you change Dolby Digital® programs so that the level of dialogue remains constant. It does not alter the dynamic range nor is it able to adjust only the dialogue versus the music and effects. It simply adjusts the overall playback level based on data about the average soundtrack loudness that is coded into the program signal. The term dialogue normalization was developed in the film industry. Films are mixed with the dialogue set to a specific level (specified by the producer, not the end-listener) and all other audio elements are subordinate to the dialogue. Additionally in the film world, dialogue emanates from the center speaker, giving the film mixer a simple method of measuring this level. This feature of Dolby Digital® illustrates precisely why the practice of VRA-audio sound, where the end-listener can separately adjust the PCPV and SCRA audio, is desired and inventive.

Dynamic Range Control—Dolby Digital® soundtracks can have a very wide dynamic range between soft and loud sounds, providing a truly theatrical experience. Late at night, however, the loud sound effects could disturb your neighbors. Simply turning down the volume would make the dialogue hard to hear. The dynamic range control feature turns down the volume on just the loud effects, turns it up on quiet sounds, and keeps the dialogue at the same level. Some Dolby Digital® decoders let you select various amounts of the available compression (e.g., 50%, 75%, 100%), while others provide only 100% when the compression mode is selected. Again, it is important to note that the dialogue levels and the "other" sounds are not each separately adjustable by the end-listener as will be the case for VRA audio streams.

Down Mixing—All Dolby Digital® decoders, whether 5.1-channel or two-channel, have a unique feature called "downmixing" that assures full compatibility with any playback system. On 5.1-channel programs, the decoders can create several types of mixes "on the fly." These include a two-channel, Dolby Surround-encoded mix, a two-channel stereo mix for regular stereo and headphone playback, or a mono mix for playback over a mono TV set. The decoder in the playback system automatically conforms the signal to the particular playback circumstances.

Hearing Impaired Mode—This is typically a single-channel program identified in the specification for digital television (see AS/52 documentation) and is intended to convey audio that has been processed for increased speech intelligibility and decoded along with the Main Audio Service. The HI service may also be a complete mix of all program channels, comprising up to six channels. The HI associated service is not implemented in the audio configurations used for DVD video discs and is distinctly different than VRA-audio.

Dolby Surround Pro Logic—Dolby Surround encodes four sound channels (left, center, right, surround) onto the two tracks of a conventional stereo program source, either analog or digital. Dolby Surround sources include regularly scheduled TV programs, plus sports and special events. Dolby Surround Pro Logic is also used on DVD video disc audio.

Virtual Dolby Surround—This process starts by decoding the original four or 5.1 channels of the program material. The center channel is then divided equally between the left and right speakers to create a phantom center image, while a "virtualizer" circuit processes the surround signals and mixes them with the left and right channel signals. The virtualizer processor adds cues to the surround signals based on how we identify a sound's directionality. Virtual surround can be used on DVD video disc audio.

Dolby Digital® Surround EX®—adds a new center rear surround channel. It is currently not available on DVD.

MPEG Audio

While some players support MPEG audio decoding, this is generally because they will also support VCD; output interface options are extremely limited even in those players that have the capability. It is public knowledge that the DVD video specifications define the permissible choices of audio coding, where the disc audio must contain either Linear PCM and Dolby AC3 or Linear PCM and MPEG audio. In reality, it may be concluded that in large-part:

MPEG-1 is supported in some US players but MPEG-2 audio is not at this time

DVD players that do not support VCD do not support MPEG-1 layer-2 audio

The use of only MPEG audio in region 1 (U.S.) players is a violation of the DVD specification.

MPEG-1 ISO/IEC 11172-3—provides variable compression factor, different complexity layers, compact disc quality at compression factor of 6:1, and is used in many applications, including broadcasting, telecom, recording, etc. The reproduced signal quality must be subjectively indistinguishable from the quality obtained with a 16 bits PCM system sampled at 44.1 kHz (compact disc) in the majority of normal use programs.

MPEG-2 ISO/IEC 13818-3—allows compact disc quality, environment sonority reconstruction, sonorous sources location, multilingual transmission, and ancillary services. The Reference System: 3/2+1 has 3 frontal and 2 surround plus a subwoofer channel. Ancillary services include 5 vocal quality channels for multilingual commentary, a picture commentary channel for blind people, 1 channel with dialogues without environment noise, and other data related to audio. An MPEG-1 receiver must be able to decode a stereo signal from a multi-channel MPEG-2 stream. There is an optional extension to 7.1 channel coding.

MPEG-2 AAC—a new, state of the art audio standard that provides very high audio quality at a rate of 64 kb/s/channel for multichannel operation. It provides a capability of up to 48 main audio channels, 16 low frequency effects channels, 16 overdub/multilingual channels, and 16 data streams. Up to 16 programs can be described, each consisting of any number of the audio and data elements. ISO/IEC 13818-4,5 for MPEG-2 AAC were finalized in September 1998.

DTS®

The DTS Digital Surround® algorithm (hereinafter "DTS" or "DTS algorithm") is designed to encode the 5.1 channels of 20-bit audio with considerably less data-compression than any other competing system. In the encoding process, the DTS algorithm encrypts 6 channels of digital audio information in the space previously allotted for only 2 channels of 16-bit linear PCM. DTS uses Coherent Acoustics, which is a highly flexible algorithm that uses sampling rates up to 192 kHz and up to 24-bit resolution. A DTS-encoded disc can be played back on any player with a built-in digital output connector. The digital bitstream from this output is fed directly to any surround processor that incorporates the DTS decoding chip. DTS uses less compression than Dolby Digital® (3.5 to 1 vs. Dolby's 12 to 1) and has a higher data rate (1.5 Mbits/sec vs. Dolby's 384 kbits/sec).

VRA Audio Encoding and Stream Control

VRA-audio programs may be encoded using any audio format, including those mentioned above. Today, the most widely accepted formats include LPCM, Dolby Digital®, MPEG-2, MPEG-2 AAC, and DTS. An embodiment is now described wherein VRA audio is encoded for a DVD video disc application.

The audio encoding process for a DVD video disc may take place using external hardware encoders (i.e., external to the authoring software) or software encoders embedded in the authoring software. Many aspects of the precise treatment of the audio stream control will be required to follow certain specifications by the DVD Forum, a consortium of corporations responsible for licensing DVD technologies. The DVD Video Specification document is proprietary; however, there is a great deal of public domain information about DVD Technical Specifications available. For example, the web site www.pioneer.co.jp/crdl/tech/dvd/4-e.html discusses the physical format of DVD video discs, including video format and audio format information in some detail. While precise DVD specifications must be strictly followed by any encoding processes and DVD playback processes, the fundamental inventions required for encoding VRA-capable DVD video can be easily framed by those skilled in the art to satisfy any specifications or definitions put in place by standardizing committees. Therefore, it is appreciated that anyone versed in the DVD video specification requirements will be able to accomplish the VRA audio encoding embodiments described next.

Enabling the encoding of VRA-audio tracks inside any of the commonly used encoding algorithms will vary in specific implementation; however, there are common inventive steps that are equivalent for all of the encoders that might be chosen. The choice of audio compression format (i.e., LPCM, Dolby Digital®, MPEG-2, etc.) is up to the producer of the motion picture. That choice is made based on perceived sound quality, number of desired spatial channels, bandwidth limitations, disc storage limitations, and other reasons. Current authoring software menus only offer selection choices for AC3, MPEG, or LPCM. Future versions will be able to offer selection of a VRA encoding process that provides more direction as to where the PCPV and SCRA signals are to be routed. Once the encoder is selected, the embodiments described below offer an inventive method of encoding the VRA audio in such ways that the PCPV and SCRA channels can be successfully identified for playback from a DVD player or an attached set-top VRA playback device.

There are numerous embodiments that can be developed for encoding the PCPV and SCRA audio tracks within a typical Dolby Digital® audio stream. Given the current DVD specifications, it will be necessary to implement new functions within the DVD post-processing algorithms in order to play back the encoded VRA information described next. The postprocessor functionality in set-top boxes and VRA-capable DVD players will be addressed after the preferred encoding/authoring embodiments have been described.

The VRA audio encoding configurations discussed next are intended to be compatible with the encoders that exist today. The first will be referred to as a 2/2 VRA channel assignment during the encoding process. The first number of the VRA channel assignment refers to the number of PCPV signals while the second number defines the number of SCRA signals. For example, the 2/2 VRA channel assignment refers to stereo left and stereo right channels of PCPV and stereo left and stereo right channels of SCRA. These four channels can then utilize four channels of a 5.1 surround sound lineup for encoding the VRA audio on the DVD video disc. Note the surround sound lineup refers to conventional channel assignments of left (L), right (R), center front (C), left surround (Ls), right surround (Rs), and low frequency effects (LFE), where the LFE channel is a reduced bandwidth, hence the 0.1 part of the 5.1 designation. Through the use of VRA data words, illustrated in FIGS. 17 and 18 and described more fully below, it is possible for these four channels of VRA audio can be placed on any combination of the L, R, Ls, Rs and C channels normally reserved for conventional audio.

Figure 17:
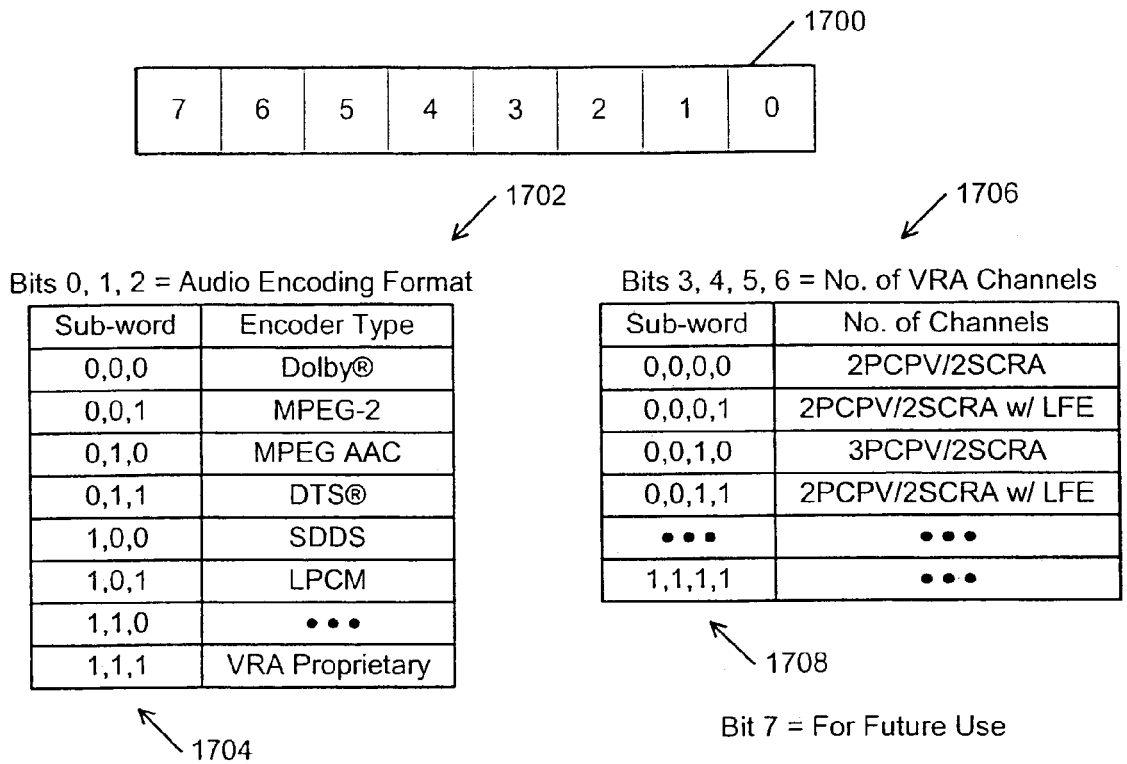
FIG. 17 illustrates one possible embodiment of a VRA data word, in accordance with an embodiment of the invention.

Using the 2/2 VRA channel assignment as an example, during the encoding process, each of the four VRA signals can be applied to the encoder utilizing any four of the five conventional full audio bandwidth channels (i.e., L, R, C, Ls, and Rs). A VRA-capable authoring system can utilize modified encoder software, or software designed specifically for the VRA-capable authoring system, to interact with the sound engineer, or any person operating the VRA-capable authoring system, in order to cause that person to enter the specific VRA channel assignment (2/2 for this example) and the specific compression algorithm that is used to compress the VRA audio (Dolby AC3 for example), and the mapping data that identifies which VRA audio channel was applied to which conventional channel. When this data is entered during the encoding process, the encoder will generate one or more VRA data words, or even one or more sub-words for inclusion in unrelated data words, for eventual use in player decoding and identification of VRA audio channel assignments (e.g., PCPV right, PCPV left, SCRA right, and SCRA left). FIG. 17 illustrates one possible embodiment of a VRA data word 1700 in accordance with an embodiment of the invention. The VRA data word 1700 includes 8 bits, although it will be understood that any number of bits could be used so long as the desired data was represented. The data included in the VRA data word 1700 may include the type of audio format chosen for VRA audio channel compression 1702. Thus, the type of CODEC used for encoding the VRA audio is implicitly referenced in the VRA data word 1700. In FIG. 17, the audio encoding format is represented by a three-bit sub-word 1704 in the VRA data word 1700. The data included in the VRA data word 1700 may also include the number of VRA channels that were encoded 1706 using the format identified by the three-bit sub-word 1704. The number of channels encoded 1706 is represented by a four bit sub-word 1708 in FIG. 17. Those of skill in the art will recognize that the VRA data word 1700 is exemplary only; other combinations of bits, attribution of additional or other information to bits, or even elimination of sub-words, are all within the scope of the invention described herein.

Figure 18:
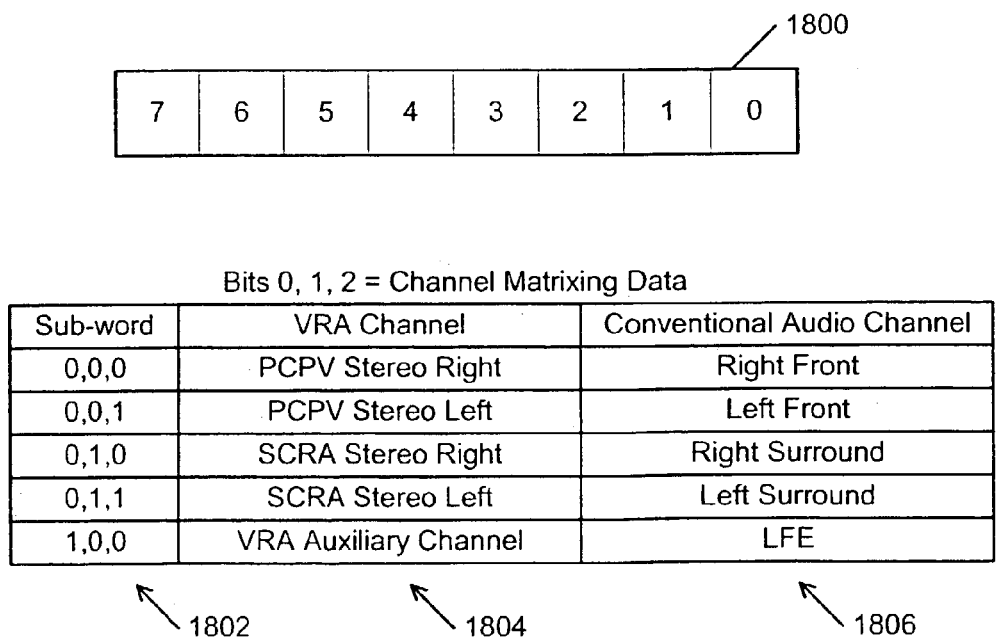
FIG. 18 illustrates one possible embodiment of the channel matrixing data word 1800, in accordance with an embodiment of the invention.

The VRA data word 1700 may be complemented by additional bits or a second data word referred to as a channel matrixing data word. FIG. 18 illustrates one possible embodiment of the channel matrixing data word 1800, in accordance with an embodiment of the invention. The channel matrixing data word 1800 provides data to indicate precisely where each VRA audio channel and VRA auxiliary channel has been placed on the surround sound lineup. That is, the channel matrixing data word 1800 maps each VRA channel designator 1804 to a conventional channel designator 1806, such as R, L, Rs, Ls, and LFE. Using the 2/2 VRA channel assignment as an example, it is possible to place the left stereo PCPV signal on any one of the L, R, C, Ls, or Rs channel locations normally reserved for conventional signals of the same spatial orientation as the channel designator (i.e., L would hold the left front signal, R would hold the right front signal, etc.). This approach allows VRA to proceed without requirements for specification by the industry, because the channel matrixing data word 1800 will reflect the precise channel assignment that the audio engineer, or person operating the VRA-capable authoring system, selects for the VRA audio signals. As illustrated in the exemplary embodiment of FIG. 18, such channel assignment could be represented by using a three-bit subword 1802 of an eight-bit word if a first set of five channels were to be mapped onto a second set of five channels, as in the 2/2 VRA channel assignment example just presented (the fifth channel being the VRA auxiliary channel). Of course, if one desired to represent a channel matrixing data word where any one of say four VRA audio channels and a VRA auxiliary channel could be mapped to any one of say five conventional channels, then one would need a five-bit word to represent the 25 possible combinations of VRA channels mapped to conventional channels. It will readily be understood that the mapping of a VRA channel 1804 to a conventional channel 1806 is not limited to the five-channel example given above. Any number of VRA audio channels and VRA auxiliary data channels could be mapped to any number of conventional channels. It will also be readily understood that while reference has been made to a VRA channel matrixing data word 1800, (or sub-word 1802) that the data in this exemplary embodiment could be included in any data word, so long as sufficient space existed to represent a unique mapping assignment. Thus, the channel matrixing information could be included in the VRA data word 1700 of FIG. 17, or it could be included in any spare, unassigned, or unused portions of data words in, for example, a bitstream that makes up metadata for a DVD disc.

In addition to the mapping of channel assignments, the VRA encoding method may also include the "labeling" of the VRA audio stream using one of the available private audio stream identification numbers on the DVD media. Once a private audio stream identification number is associated with the VRA audio information (similar to the association of a stream identification number with Dolby®, or DTS®, or SDDS, etc.), then DVD post-processors that have been programmed to recognize this private audio stream identification number could be further programmed to designate a unique channel lineup (prearranged for that private audio stream identification number) that is different from other channel lineups, for example, different from the channel lineup for a Dolby Digital®stream. The exact referencing mapping of each channel can be passed to the post-processor in any number of ways known to those in the art. For example, it will be possible, if desired, to place the low-bandwidth VRA auxiliary data on the LF channel that is not being used for the 2/2 VRA configuration channel assignment. The post processing algorithm of a DVD capable player must then provide instructions for the processor to access the LF data and interpret the previously discussed words of the auxiliary data.

It should be clear at this juncture that it will also be possible to accommodate a 3/2 channel assignment of VRA audio or a 2/3 channel assignment of VRA audio using the same methodology as just discussed for the 2/2 VRA channel assignment. The only difference will be in the actual bit settings that reflect the 2/3 or 3/2 assignment versus the 2/2 assignment. The 3/2 VRA channel assignment may refer to left stereo, center, and right stereo PCPV signals and left stereo and right stereo SCRA signals. Conversely, the 2/3 VRA channel assignment may refer to left and right stereo PCPV signals, as well as left stereo, center, and right stereo SCRA signals. Note that these channel assignments can be defined for any DVD sanctioned CODEC (e.g., DTS®, SDDS), not just Dolby®.

Other possibilities exist for encoding VRA audio on DVD media. For example, the relatively new MPEG-2 AAC audio coding is capable of encoding 10.2 channels of audio. Therefore, future DVD players that include post-processing for the MPEG-2 AAC audio CODEC will be able to accommodate 10.2 channels of VRA audio in the same manner as just described. The VRA data words (1700 and 1800, FIGS. 17 and 18, respectively) can be set to reflect the use of the MPEG-2 AAC CODEC and to reflect where each 5.1 PCPV and 5.1 SCRA spatial signal is assigned on the 10.2 surround sound channels handled by the CODEC.

Yet another encoding possibility is the design of a special purpose VRA audio encoding method that is labeled using some other private stream identification number that exists on DVD video disc media. The VRA CODEC would be unique from other CODECs in that there will be two spatial signals (i.e., left stereo PCPV and left stereo SCRA) that are different in audio content. Identification of a VRA CODEC will eliminate the need for the VRA data words (1700 and 1800, FIGS. 17 and 18, respectively) because the CODEC will define precise channel assignments that are consistent with the VRA audio program. The decoding of this type of CODEC will simply proceed to route the various VRA audio channels to the individual volume adjustments for PCPV and SCRA, as indicated in a later discussion on playing back the encoded VRA audio.

Authoring Steps for Navigation and Audio Management on VRA-Capable DVD Discs

The encoding methods described above are one part of the so-called "authoring" process. The remaining post-production steps used to author VRA-capable DVD's can be accomplished with modifications to existing DVD authoring programs. There are numerous DVD authoring system software suites, such as Scenarist® SGI, Scenarist® NT, Sonic Creator/Fusion, and others. Scenarist® SGI is one of the only authoring systems that offers complete access to all of the functions defined in the DVD specification and will be used as an example for this discussion. Scenarist® SGI is manufactured by Daikin industries, Ltd. Corporation, Osaka, Japan. While it is possible to use a hardware encoder to prepare the VRA audio files, the authoring software may also include software encoders that produce the audio tracks before importing and linking (via, for example a Data Editor in Scenarist® SGI) to the video data. Encoding methods for VRA audio were identified in a previous section. In Scenarist® SGI, the encoded video and encoded audio files are linked together in a Data Previewer, with up to eight different tracks allowed to be linked to the video track. The VRA audio track, then, must be defined at this step in the authoring process. After the engineer/operator sets data bits that identify the presence of the VRA soundtrack (by setting a private stream identification number that may be assigned by the DVD forum), the navigation and audio stream management of the VRA audio and other audio media is built.

For example, if Scenarist® SGI were the authoring system, the Video Manager portion of the DVD embedded software is what is first accessed when the disc is inserted and this controls navigation. Within the Video Manager, the Video Title Set (VTS) Title area is where all the video assets go and the VTS Menu area is where the menus go. Precommands can be used to automatically select which default audio track will be played for a particular video sequence, as well as other functions. Post commands are used to determine where the disc readout will go after a video sequence is played. In the video manager, commands and defaults that apply to the entire disc are set, such as the default language (e.g., English), the region codes for the disc (e.g., 1 for the United States), parental information, etc. Certain navigation features are controlled by the engineer building the navigation and certain navigation features are given to the viewer for control, through the use of buttons on the viewing screen. FIG. 6 is an example of the typical button selections for navigation that are seen upon startup of a DVD video disc. FIG. 7 is a second example menu (language selection) that shows how the navigation features can offer selection of the VRA audio track to the DVD user. In the previewer environment, it is also possible to set the default language and default audio soundtrack. Thus, the Scenarist® SGI system can be used to accommodate new VRA soundtrack settings inside the Video Manager software of the authoring system, where such settings will allow a VRA soundtrack to be either the default soundtrack upon startup or a user-selected soundtrack for DVD viewing. Of course, those skilled in the art will recognize that other authoring systems can be modified to allow a VRA soundtrack to be either the default soundtrack upon startup or a user-selected soundtrack for DVD viewing.

A DVD includes what is referred to as a video title set. The video title set includes one video manager and a video manager menu. Current standards allow for a single DVD to contain up to 99 individual titles within the video set. In the parlance of DVD, a "title" may be, for example, a film, a video, or material for an album. Each title can further include multiple menus and, currently, each title can be further subdivided into ten chapters. Each video title set has its own software screen where the postproduction engineer can set default parameters such as language for the title set. For example, there is a language code extension field that allows the default choice of a director's commentary to be set as a default value for a particular video title set. In accordance with this invention, the language code extension field may be modified to allow VRA audio to be the default choice for some particular video title set. In Scenearist SGI®, the language code extension field is explicitly set in the program chain editor window. For example, the main program chain's default audio stream can be linked to the VRA soundtrack, allowing the VRA track to be chosen without user intervention. In accordance with this invention, a VRA authoring system may set the appropriate language code extension bits such that the DVD video disc can be offered as a hearing impaired DVD video disc whose audio soundtrack defaults to a VRA audio program. In summary, the inventive steps described above will make many of the specific authoring selections tied to playback of a VRA-capable movie easy to understand by the post-production engineer, thereby allowing a DVD menu to be built in a way that is also easy to navigate by, for example, a home viewer who wishes to access the VRA audio soundtrack.

VRA-Capable Playback Hardware

Figure 19:
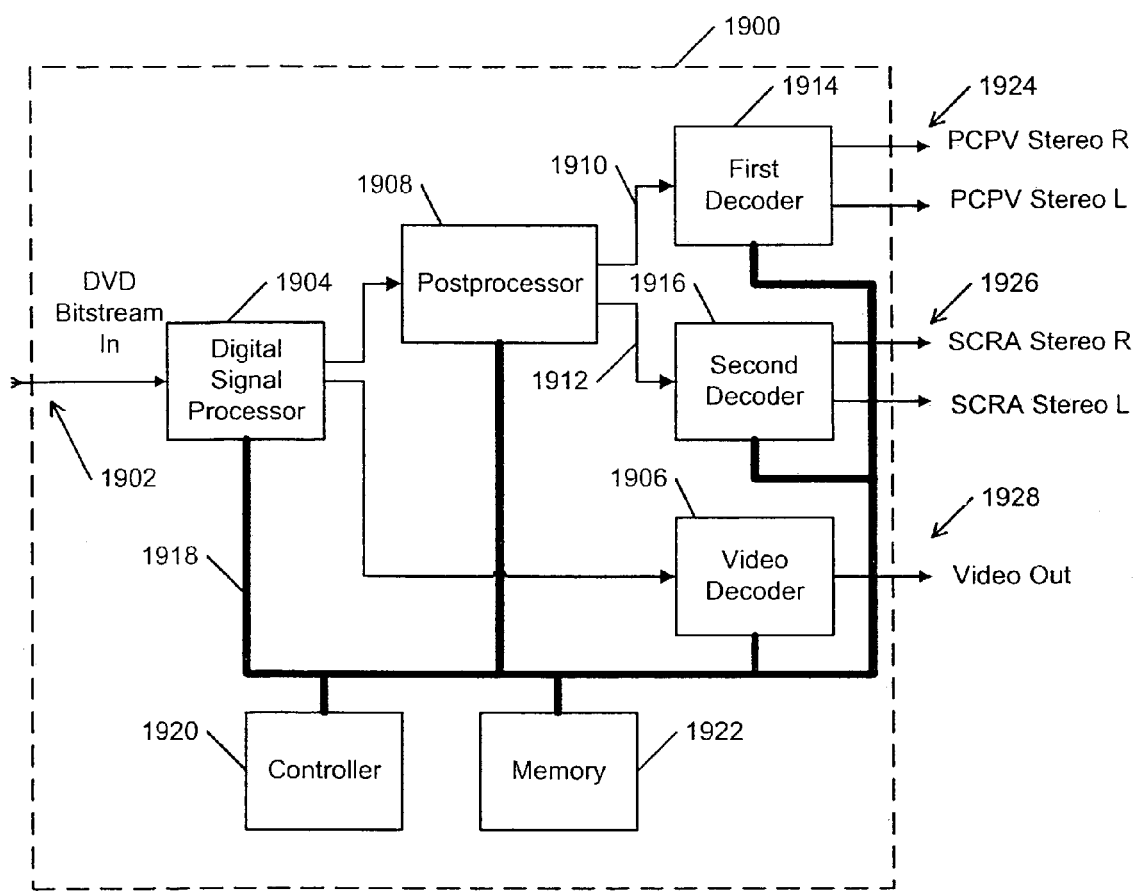
FIG. 19 illustrates a DVD player having two decoders 1900 to simultaneously decode VRA audio channels while maintaining synchronization with a video stream, in accordance with an embodiment of the invention.

It is not currently possible to provide simultaneous, video-synchronized, decoding of two distinct audio streams in current DVD player designs. In one embodiment therefore, a DVD player may be provided with two decoders in parallel such that PCPV and SCRA 5.1 or 7.1 or other surround streams can be simultaneously decoded while maintaining synchronization with the video stream, as illustrated in FIG. 19. This can be accomplished, for example, by extending the capability of the system target decoder built into the DVD playback framework. The system target decoder instructs a system pointer where to go to do audio decoding. The extended capability of the system target decoder may make use of at least two pointers in decoding two distinct audio streams. A first pointer could locate or point to a first surround sound audio stream (e.g., a PCPV stream) and a second pointer could locate or point to a second surround sound audio stream (e.g., an SCRA stream).

FIG. 19 illustrates a DVD player having two decoders 1900 to simultaneously decode VRA audio channels while maintaining synchronization with a video stream, in accordance with an embodiment of the invention. In FIG. 19, a DVD bitstream 1902 is acquired, in accordance with processes not disclosed herein, and applied to an iput of a digital signal processor 1904. The digital signal processor 1904 identifies and separates video data from audio data. The digital signal processor 1904 applies the video data to a video decoder 1906 and applies the audio signal to a postprocessor 1908. The post processor 1908 interprets the audio stream and recognizes the audio stream a a VRA compatible audio stream. The postprocessor 1908 identifies and PCPV audio stream 1910 and an SCRA audio stream 1912. The postprocessor 1908 couples the PCPV audio stream 1910 to a first decoder 1914. The postprocessor 1908 couples the SCRA audio stream 1912 to a second decoder 1916. The first decoder 1914 and second decoder 1916 receive data via control bus 1918 which identifies an audio format and therefore, an audio decoding algorithm, that is to be executed using the data from the PCPV audio stream 1910 and SCRA audio stream 1912, respectively. The control bus 1918 functionally interconnects the first decoder 1914, second decoder 1916, video decoder 1906, digital signal processor 1904, and postprocessor 1908, with a controller 1920 and memory 1922. The first decoder generates a first decompressed audio signal from the PCPV data stream 1910. The second decoder 1916 generates a second decompressed audio signal from the SCRA data stream 1912. The first decoder 1914 and the second decoder 1916 are arranged to separately accept the PCPV data stream 1910 and the SCRA data stream 1912 in a parallel input configuration. In this configuration, the first decoder 1914 and the second decoder 1916 process the PCPV data stream 1910 and the SCRA data stream 1912 without loss of any time-alignment and video-frame synchronization between the PCPV data stream 1910, the SCRA data stream 1912, and accompanying video data stream applied to video decoder 1906. This results in, for example, the generation of PCPV right and left signals 1924, SCRA right and left signals 1926, all synchronized to video output 1928.

Post-production of the digital audio media (e.g., DVD) for inclusion of a VRA soundtrack with various degrees of spatial playback capability has now been described, the embodiments of post-production thus explained allow for enabling primary content and secondary content remaining audio in a movie soundtrack. The post-production methods described herein could be used in formats other than movies, as will be appreciated by those of skill in the art. The post-production encoding and authoring embodiments leading to VRA soundtrack digital media form were discussed above. Once the media form (e.g., DVD video disc, Video-on-Demand data base, etc.) is created to be VRA-capable, it is also essential that playback hardware decoders and post-processors have inventive features that enable the selection and playback of the VRA movie within the respective viewing/listening device. Such playback hardware finds application in both consumer (e.g., home single player apparatus) and commercial (e.g., movie theatre, hotel, and airline player apparatus). The viewing device, in consumer and many commercial applications, is typically a television set; however, the viewing device may also be a computer monitor, or, for example, any LCD display that is connected to a microprocessor or digital signal processing chip. It will be understood that any viewing devices falls within the scope of this invention.

No existing DVD players, set-top boxes, or other players that reproduce digital motion picture video and audio are currently designed to allow playback of a VRA-motion picture soundtrack. Currently, there are no default or user-interface settings in existing players that will provide the ability to playback a VRA soundtrack, thus the need for a VRA-capable DVD player exists.

Figure 20:
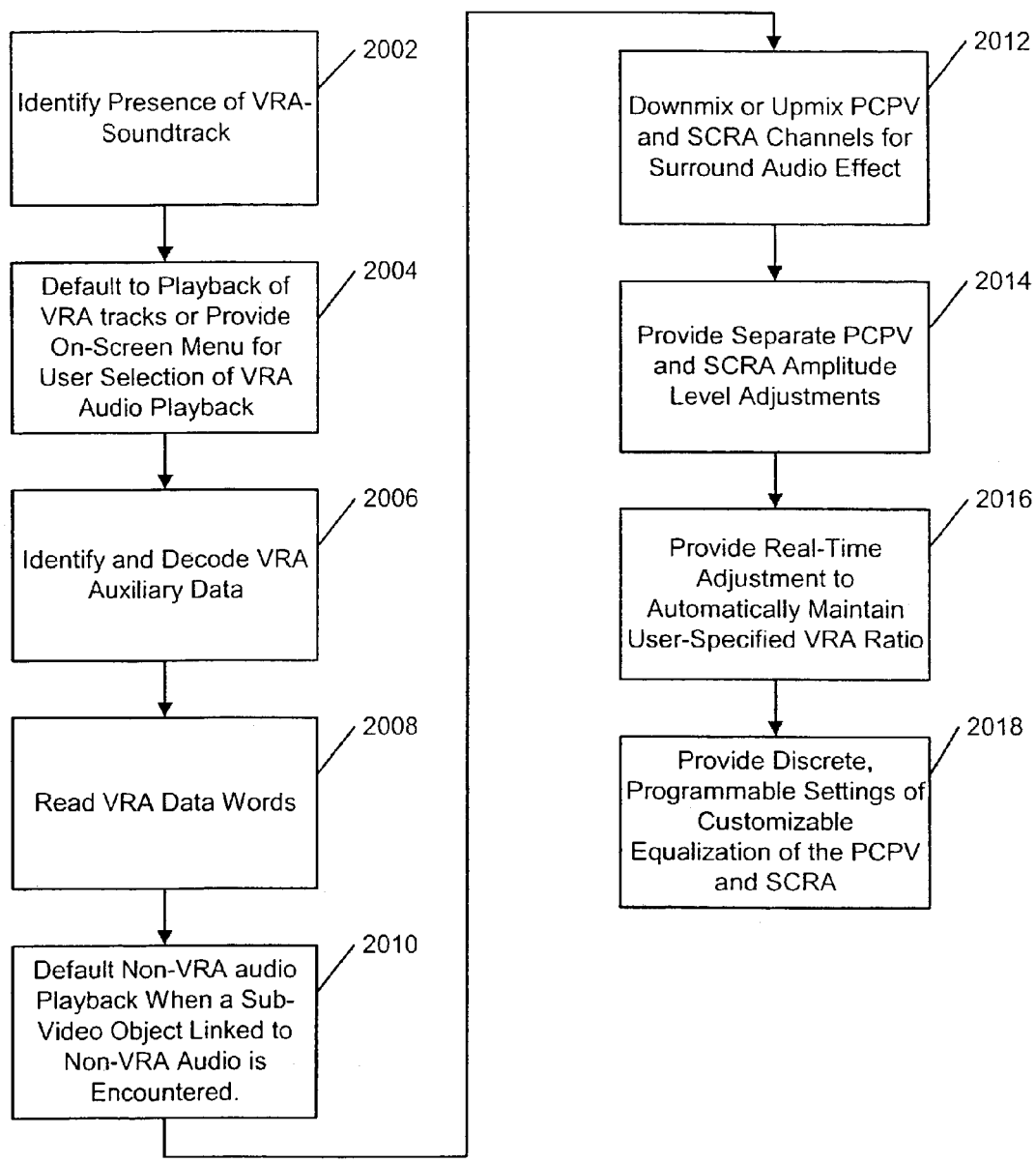
FIG. 20 illustrates a method of operation of a VRA-capable playback device, in accordance with an embodiment of the invention.

There are current obstacles that must be overcome in order to play back VRA soundtracks. First, the VRA audio media must be created according to the embodiments described above. Additionally, it is necessary to define certain new functionality of the playback hardware that enables the playback of VRA-capable motion picture soundtracks. Those functions, described next, will become part of a player's DSP memory space, to be called at appropriate times for implementation. The playback hardware can then run unique VRA-capable software that calls VRA-capable playback features, including either default values set during the authoring process by the film studio or user-selectable features, programmed, for example, by the player manufacturer, and made available to the viewer through modifications to existing DSP post-processing algorithms found on the DVD's DSP post-processor system. FIG. 20 illustrates one method of operation of a VRA-capable playback device in accordance with an embodiment of the invention. At 2002, the playback device may identify the presence of a VRA-soundtrack. At 2004, the playback device may default to the playback of the VRA tracks (based on assignment by the Video Manager portion of the DVD media) or provide an on-screen menu for the user to select playback of the VRA audio. At 2006, the playback device may identify and decode the audio stream content that provides the VRA auxiliary data guiding possible data about playback parameters. At 2008, the playback device may read the VRA data words (1700 and 1800, FIGS. 17 and 18, respectively) in order to identify and decode the appropriate channels that comprise the PCPV and SCRA content laid down by the encoding process, once a default or selected command for VRA audio is encountered. At 2010, the playback device may default back to normal (i.e., non-VRA) audio playback when a sub-video object linked to non-VRA audio is encountered (e.g., a trailer or a director's commentary that has not been produced using VRA audio).

Additionally, at 2012, the playback device may downmix or upmix of PCPV and SCRA channels for surround audio effect (e.g., stereo to virtual surround), depending on the channel assignments and number of attached playback speakers. At 2014, the playback device may provide separate PCPV and SCRA amplitude level adjustments (volume) for a user to adjust the Voice-to-Remaining audio ratio according to the user's preference. Such adjustment may be provided via either software or hardware implementations. Furthermore, at 2016, the playback device could provide online, real-time adjustment to automatically maintain the user-specified Voice-to-Remaining audio ratio in the presence of disproportionate changes in PCPV and SCRA channel volume levels and, at 2018 the playback device could provide discrete, programmable settings of customizable equalization of the PCPV and SCRA audio content to further enhance the speech intelligibility of the dialogue content of the subject video or film, for hearing impaired users.

It is immediately recognized that DVD players already in existence will not have the embodiments required to accommodate the VRA playback features described above. Therefore, it is helpful to distinguish between the VRA audio DVD playback for the case of already marketed non-VRA-capable players and new designs of VRA-capable players.

Playback of VRA Soundtracks Using Non-VRA-Capable DVD Players

Existing DVD players cannot perform the functions listed in the previous section because the current generations of DVD decoders and post-processors have not considered the embodiments described above for this invention. An existing DVD post-processor will, however, be able to display the voice-to-remaining audio button on a language or audio set-up screen, because it will have been created during the authoring process. Therefore, already existing non-VRA capable players will need to be able to accommodate the insertion of a VRA-capable DVD video disc, and the selection of the VRA button on the set-up screen, without crashing the playback process. The performance of existing DVD players must not be adversely affected in any way by the selection of a VRA soundtrack button, or at the least, simply default to the normal audio playback even if the user selects this button. Furthermore, it will be desirable for owners of non-VRA capable DVD players to pass-through the VRA audio channels to a VRA-capable "Set-top Box" that provides the playback and separate PCPV/SCRA volume adjustment before the VRA audio channels are sent to the speakers, and video is presented to the monitor.

The first requirement of accommodating selection of the VRA Audio in a non-VRA-capable DVD player without crashing the playback process is straightforward and can be controlled during the authoring process. Quite simply, a VRA audio soundtrack should cause the player to default to any allowable audio playback process in the event that the user attempts to exceed the audio playback possibilities built into the player's post-processor.

Figure 21:
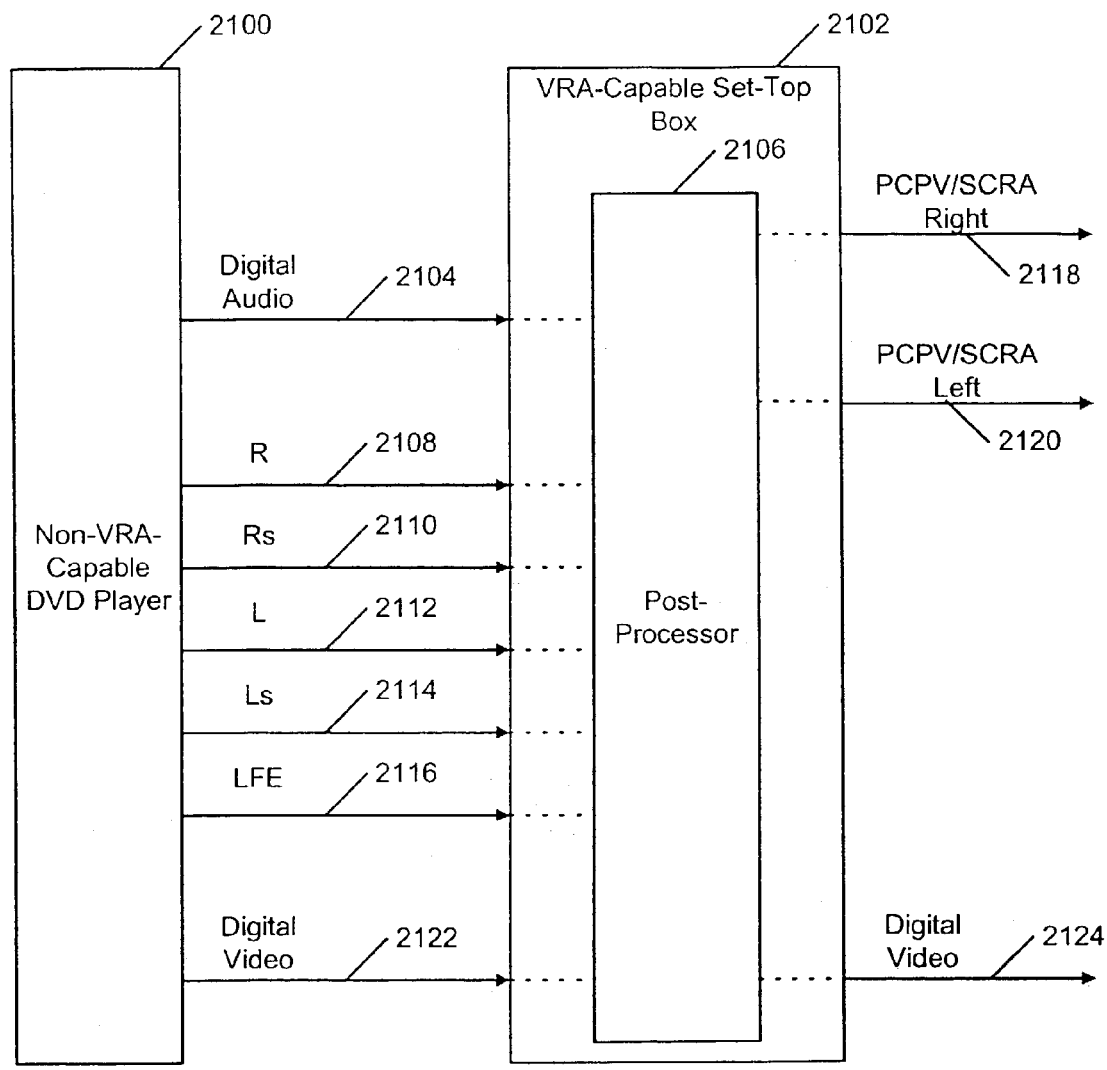
FIG. 21 illustrates how a non-VRA-capable DVD player 2100 could be coupled to a VRA set-top box 2102, in accordance with an embodiment of the invention.

The playback of VRA audio for non-VRA-capable DVD players can also be accomplished by inventive features. VRA playback using existing (non-VRA-capable) DVD players is possible when an additional playback system component such as a Set-Top Box is made available. FIG. 21 illustrates how a non-VRA-capable DVD player 2100 could be coupled to a VRA set-top box 2102, in accordance with one embodiment of the invention. The set-top box 2102 may receive an encoded digital output signal 2104 from the non-VRA capable DVD player 2100. The encoded digital signal may be processed by a decoder/processor 2106 (collectively referred to in FIG. 21 as post-processor 2106) inside the set-top box 2102. The VRA-capable set-top box 2102 can be designed to accept the digital audio output 2104 that is a standard output on many DVD players 2100. Signals from the non-VRA-capable DVD player 2100 may also be coupled to the VRA set-top box 2102 via any analog outputs of the non-VRA-capable DVD player 2100. For example, FIG. 21 also illustrates the coupling of the R 2108, Rs 2110, L 2112, Ls 2114, and LFE 2116 analog outputs of the non-VRA-capable DVD player 2100 to the VRA set-top box 2102. Any coupling that provides the VRA audio to the set-top box is within the scope of this invention. The set-top box 2102 may include at least a decoder (not shown) and a DSP processor 2106 that is designed to manage the VRA audio stream that was encoded using one of the compression algorithms discussed earlier. For example, if the auxiliary data indicates that the VRA audio stream was encoded using the L, R, Ls, and Rs (i.e., the so-called 2/2 VRA channel assignment configuration intended for stereo playback), the post-processor 2106 may be programmed to:

decode each signal in the normal decoding operation;

route the signals to a digital amplifier (not shown);

adjust the L and R (i.e., stereo PCPV signals) volume in response to a user's input (e.g., using analog dials on the set-top box or digital inputs from a remote control);

adjust the Ls and Rs (i.e., the stereo SCRA signals) volume in response to a user's input (e.g., using analog dials on the set-top box or digital inputs from a remote control);

sum the R and Rs volume adjusted signals to create a PVPC/SCRA right signal 2118;

sum the L and Ls volume adjusted signals to create a PVPC/SCRA left signal 2120; and route the summed signals (i.e., the resulting stereo VRA audio signals) to the left and right speakers (not shown), respectively using analog R and analog L outputs (not shown) on the set-top box 2102.

Note that the digital video signal 2122 from the non-VRA capable DVD player 2100 may be passed through the set-top box 2102 with or without any additional processing. The output digital video signal 2124 may be applied to a video monitor (not shown). While a digital video signal has been illustrated, an analog video signal is also within the scope of the invention.

Figure 22:
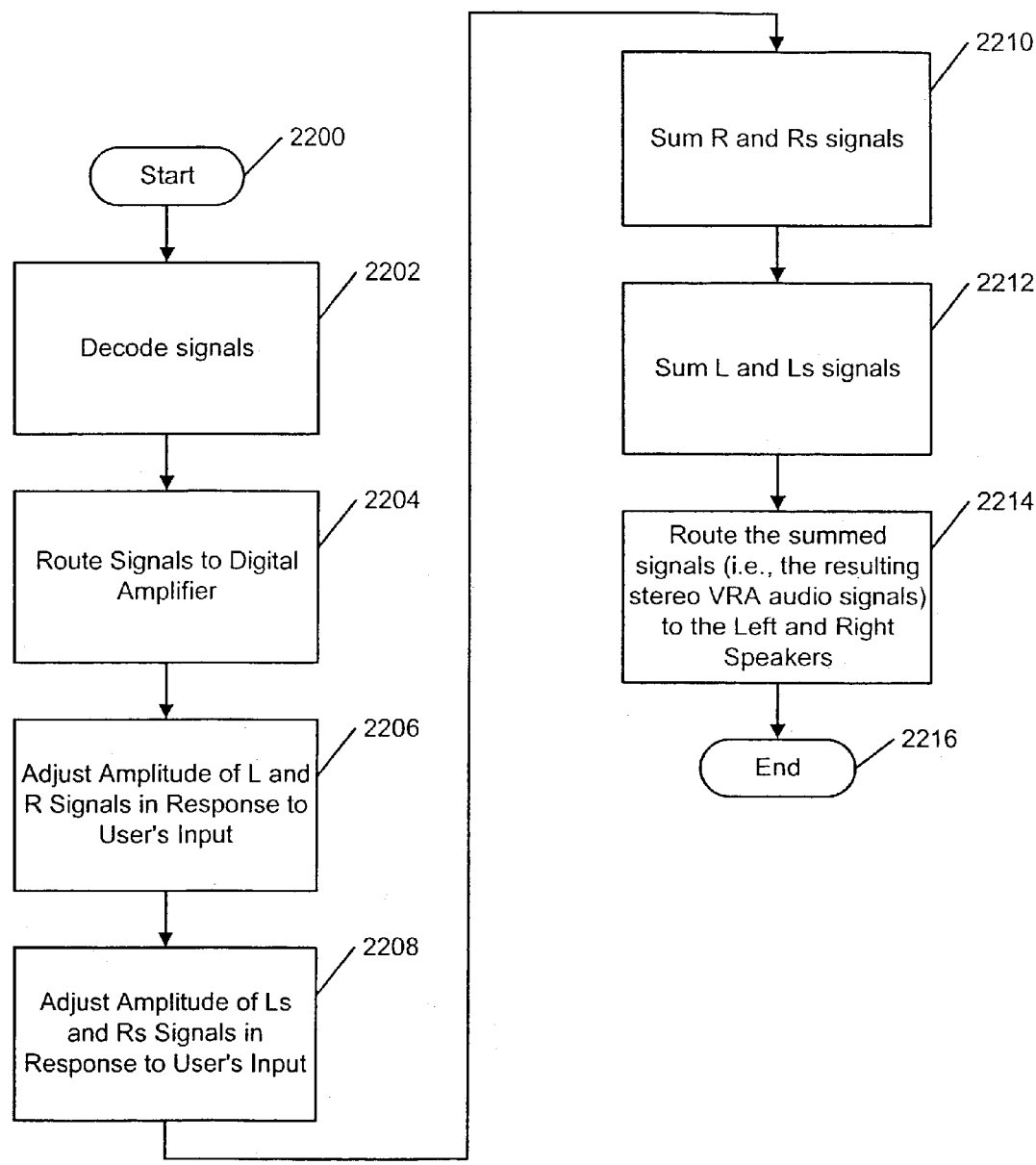
FIG. 22 is a method of use of a set-top box, or a VRA-capable DVD player, in accordance with an embodiment of the invention.

This method described with relation to FIG. 21 is illustrated in FIG. 22. FIG. 22 is a method of use of a set-top box, or a VRA-capable DVD player, in accordance with one embodiment of the invention. The process may start at step 2200. At 2202, the post-processor may decode each signal in the normal decoding operation. At 2204, the post-processor may then route the signals to a digital amplifier. At 2206, the post-processor may adjust the amplitude of the L and R (i.e., stereo PCPV signals) signals in response to a user's input (e.g., using analog dials on the set-top box or digital inputs from a remote control). At 2208, the post-processor may adjust the amplitude of the Ls and Rs (i.e., the stereo SCRA signals) in response to a user's input (e.g., using analog dials on the set-top box or digital inputs from a remote control). At 2210, the post-processor may sum then the R and Rs volume adjusted signals (i.e., sum the right PVPC and SCRA signals). At 2212, the post-processor may sum the L and Ls volume adjusted signals (i.e., sum the left PVPC and SCRA signals). At 2214, the post-processor may route the summed signals (i.e., the resulting stereo VRA audio signals) to the left and right speakers, respectively using analog L and analog R outputs on the set-top box 2102. Digital outputs would, of course, also be within the scope of this invention. The method may end at 2216.

Therefore, it is within the scope of this invention to identify any VRA channel assignment to be programmed into the DSP post-processor algorithms for VRA in a set-top box, that is connected to a non-VRA-capable DVD player using the digital audio signal output, such that a VRA-capable soundtrack can be played with VRA adjustment by the owner of the set-top box. It is important to note that the selection of the VRA audio stream on the language selection or audio selection DVD menu will ensure that the digital audio output signal does in fact provide the VRA audio stream. This is ensured because any DVD player will simply read the video object that controls the language selection menu and the selection of that stream identification number will be enabled according to the DVD fundamental functions.

It is also possible that one simpler version of a set-top box 2102 may be used in conjunction with a non-VRA-capable player 2100. If a standardized method of VRA encoding would be adopted, for example, the VRA 2/2 channel assignment, then it would be possible to attach the L, R, Ls, and Rs analog signals out of the non-VRA-capable DVD player directly to the VRA set-top box 2102 and the box's 2102 functions for this scenario would include only separate volume adjustment operation by the user (as described above) and the summing operation on the L, Ls and R, Rs signals would be completed before the summed stereo outputs were output to the L and R speakers.

Those of skill in the art will recognize that it is within the scope of this invention to allow for spatial surround versions of the PCPV and the SCRA, as discussed in the encoding section (see, for example, MPEG-2 AAC discussions above). If this case were standardized as the industry method for implementing VRA soundtracks, then the VRA-capable set-top box 2102 would have 5.1 inputs for the PCPV signals and 5.1 inputs for the SCRA signals. The respective spatial signals would be summed for the PCPV and SCRA streams (i.e., L/PCPC with L/SCRA, R/PCPV with R/SCRA, etc.) after individual volume adjustment, then output to the respective speakers for the surround sound audio.

These examples illustrate how a VRA-capable set-top box can be used to provide VRA audio to a viewer even for existing or future DVD players that are non-VRA-capable. There are numerous other encoding possibilities that have not been specifically included in this discussion (e.g., VRA 3/2, VRA 1/1, etc.) but the use of other specific VRA encoding schemes in conjunction with the VRA-capable set-top box 2102 is within the scope of the overall invention described herein.

Playback of VRA Soundtracks Using VRA-Capable DVD Players

Another embodiment of the invention may be realized in a VRA-capable DVD player that can playback either non-VRA-capable DVD video discs or VRA-capable video discs. Most of the embodiments described above for the VRA-capable set-top box will be identical for the VRA-capable DVD player, with the only difference being that the steps of VRA audio identification, decoding, post-processing, individual PCPV/SCRA volume adjustment, and spatial PCPV/SCRA summing—may be performed on the DSP processor that is inside the DVD player. This implies that manufacturers will program DSP-based post-processors in VRA-capable DVD players with VRA functionality. The method of post-processing for the VRA set-top box and VRA VRA-capable DVD player are similar. Thus, the method described FIG. 22 is equally applicable to a VRA set-top box as to a VRA-capable DVD player.

Therefore, it is within the scope of this invention to identify steps by which the player can playback any VRA channel assignment, as a result of programming the DSP post-processor algorithms with the identified sequence of operations, such that a VRA-capable soundtrack can be played with VRA adjustment by the owner of the DVD player.

The disclosed embodiments are illustrative of the various ways in which the present invention may be practiced. Other embodiments can be implemented by those skilled in the art without departing from the spirit and scope of the present invention.

What is claimed is:

1. An apparatus for use with a voice-to-remaining-audio-capable (VRA-capable) optical medium, comprising:
   a first audio decoder that decodes a first compressed audio signal read from the optical medium; and
   a second audio decoder that decodes a second compressed audio signal read from the optical medium, the first audio decoder and the second audio decoder being arranged to separately accept the first compressed audio signal and the second compressed audio signal in a parallel input configuration, wherein the first audio decoder and the second audio decoder decode the first compressed audio signal and the second compressed audio signal without loss of time alignment and video frame synchronization between the first compressed audio signal read from the optical disc, the second compressed audio signal read from the optical medium, and accompanying video data read from the optical medium.

2. The apparatus of claim 1, wherein the first compressed audio signal is a primary content pure voice (PCPV/PCA) contextual audio signal, wherein the PCPV/PCA contextual audio signal comprises substantially vocal information and the second compressed audio signal is a secondary content remaining audio (SCRA) contextual audio signal, wherein the SCRA contextual audio signal comprises audio information substantially other than that included in the PCPV/PCA contextual audio signal.

3. The apparatus of claim 2, wherein each of the PCPV/PCA and SCRA contextual audio signals retain spatial information.

4. The apparatus of claim 1, wherein the optical medium is one of a DVD and a fiber optic medium.

5. A method of playback of a bitstream, comprising:
   determining whether the bitstream comprises a voice-to-remaining-audio-capable (VRA-capable) audio program, the VRA-capable audio program comprising at least one of a PCPV/PCA channel and an SCRA channel; and
   if the bitstream comprises a VRA-capable audio program:
      identifying and decoding VRA auxiliary data in the bitstream;
      identifying the at least one of the PCPV/PCA channel and the SCRA channel in the bitstream; and
      decoding the at least one of the PCPV/PCA and the SCRA channels according to an audio compression format specified in the bitstream.

6. The method of claim 5, wherein the VRA auxiliary data includes playback parameters of the VRA-capable audio program.

7. The method of claim 6, wherein the playback parameters include parameters for one of language, amplitude, and dynamic range.

8. The method of claim 5, wherein the audio compression format is one of an LPCM format, a Dolby Digital format, a DTS format, a PCM format, an MPEG-1 format, an MPEG-2 format, and MPEG-2 AAC format, and a VRA format.

9. The method of claim 5, wherein the bitstream is one of: read from an optical recording medium, read from a fiber optic interface, and received via a wireless transmission.

10. The method of claim 9, wherein the optical recording medium is a DVD.

11. An authoring system, comprising:
    a memory; and
    a processor adapted to execute instructions stored in the memory, the instructions including instructions to perform the method of claim 5.

12. A method of encoding a voice-to-remaining-audio-capable (VRA-capable) audio program having at least a plurality of context specific audio tracks and a VRA auxiliary track, comprising:
    selecting an audio compression format used for compression of a fixed number of spatial specific audio tracks, wherein the fixed number of spatial specific audio tracks is greater than or equal to the sum of the number of the plurality of context specific audio tracks plus one and wherein the spatial specific audio tracks have a predefined assignment as specified by the selected audio compression format; and
    assigning each of the plurality of context specific audio tracks and the VRA auxiliary track, respectively, to one of the spatial specific audio tracks.

13. The method of claim 12, wherein the plurality of context specific audio tracks includes n primary content pure voice (PCPV/PCA) tracks and m secondary content remaining audio (SCRA) tracks, wherein n and m are integers each having a value equal to or greater than one and wherein n and m are one of equal and not equal.

14. The method of claim 12, further comprising:
generating a series of bits that identify:
- a number representative of the number of context specific audio tracks,
- the selected audio compression format; and
- the assignment of each of the plurality of context specific audio tracks with reference to the spatial specific audio tracks.

15. The method of claim 12, further comprising:
encoding, according to the selected audio compression format:
- at least a first track comprising a PCPV/PCA audio signal, wherein the PCPV/PCA audio signal comprises substantially vocal information;
- at least a second track comprising an SCRA audio signal, wherein the SCRA audio signal comprises audio information substantially other than that included in the PCPV/PCA audio signal; and
- the VRA auxiliary track.

16. The method of claim 15, wherein the VRA auxiliary track comprises a series of bits to identify:
- the VRA-capable audio program as VRA-capable,
- playback parameters of the PCPV/PCA signal, and
- playback parameters of the SCRA signal.

17. The method of claim 16, wherein the playback parameters include parameters for one of language, amplitude, and dynamic range.

18. The method of claim 12, wherein the spatial specific audio tracks are defined by at least a right track and a left track.

19. The method of claim 12, wherein the spatial specific audio tracks are defined by at least a right front (R), a left front (L), a right surround (Rs), a left surround (Ls), and a low frequency effect (LFE) track.

20. The method of claim 15, further comprising:
storing the encoded at least first track, at least second track, and the VRA auxiliary track on an optical storage medium.

21. The method of claim 20, wherein the optical storage medium is a DVD.

22. The method of claim 15, further comprising:
broadcasting the encoded at least first track, at least second track, and the VRA auxiliary track via one of a terrestrial transmitter and a satellite.

23. An authoring system, comprising:
a memory; and
a processor adapted to execute instructions stored in the memory, the instructions including instructions to:
- identify a VRA audio program;
- identify a recording format used on the VRA audio program;
- encode at least two VRA audio channels, wherein the VRA audio channels are comprised of a PCPV/PCA channel and an SCRA channel; and
- encode a VRA auxiliary data channel.

24. The authoring system of claim 23, wherein the VRA audio program is identified by a bit in a header file of a set of data stored on a recording medium.

25. The authoring system of claim 24, wherein the recording medium is a DVD.

26. The authoring system of claim 23, wherein the recording format is one of a zero-channel format, a one-channel premixed format, a one-channel postmixed format, a two channel premixed format, and a two-channel postmixed format.

27. The authoring system of claim 23, wherein:
- the PCPV/PCA channel is comprised of a first 2-channel stereo signal; and
- the SCRA channel is comprised of a second 2-channel stereo signal.

28. The authoring system of claim 27, wherein the first and second 2-channel stereo signals are encoded using Dolby AC3, wherein the PCPV/PCA channel can be stored on any of five available channel locations in the Dolby AC3 format and wherein the SCRA channel can be stored on any of the channels not used for storage of the PCPV/PCA channel in the Dolby AC3 format.

29. The authoring system of claim 23, wherein the at least two VRA audio channels are encoded using one of an AC3, a DTS, a PCM, an MPEG1, and an MPEG2 (AAC) format.

30. The authoring system of claim 23, further including instructions to:
- import the VRA audio channels and VRA auxiliary data channel into the authoring system via a data editor;
- link the VRA audio channels, VRA auxiliary data channel, and a corresponding video file in a data previewer while maintaining a time synchronization between the VRA audio channels, VRA auxiliary data channel, and the corresponding video file; and
- construct a title set for a VRA-capable DVD.

31. The authoring system of claim 30, wherein the title set is constructed to include navigation features that allow a blend of automatic selection and user navigation of PCPV/PCA and SCRA channels for playback on a VRA-capable DVD.

* * * * *